US012628024B2

(12) United States Patent
Kumar et al.

(10) Patent No.: US 12,628,024 B2
(45) Date of Patent: May 12, 2026

(54) QUALITY OF EXPERIENCE MEASUREMENTS FOR MOBILITY ROBUSTNESS

(71) Applicant: QUALCOMM Incorporated, San Diego, CA (US)

(72) Inventors: Rajeev Kumar, San Diego, CA (US); Xipeng Zhu, San Diego, CA (US); Shankar Krishnan, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 18/507,529

(22) Filed: Nov. 13, 2023

(65) Prior Publication Data

US 2024/0098545 A1 Mar. 21, 2024

Related U.S. Application Data

(62) Division of application No. 17/382,688, filed on Jul. 22, 2021, now Pat. No. 11,864,015.

(Continued)

(51) Int. Cl.
*H04W 24/02* (2009.01)
*H04L 12/26* (2006.01)

(Continued)

(52) U.S. Cl.
CPC .................................. *H04W 24/10* (2013.01)

(58) Field of Classification Search
CPC ... H04W 24/10; H04W 36/08; H04W 36/165; H04W 24/06; H04W 24/08; H04W 36/24;

(Continued)

(56) References Cited

U.S. PATENT DOCUMENTS 6,285,681 B1 * 9/2001 Kolze .................. H04L 1/0018 370/395.5
9,241,293 B2 * 1/2016 Huang .................. H04W 36/08

(Continued)

FOREIGN PATENT DOCUMENTS

CN 104205734 A 12/2014
WO WO-2019030737 A1 2/2019

OTHER PUBLICATIONS

International Search Report and Written Opinion—PCT/US2021/042971—ISA/EPO—Feb. 18, 2022.

(Continued)

*Primary Examiner* — Steven Hieu D Nguyen
*Assistant Examiner* — Vanneilian Lalchinthang
(74) *Attorney, Agent, or Firm* — Holland & Hart LLP

(57) ABSTRACT

Methods, systems, and devices for wireless communications are described. A communication link between the UE and a serving base station may be established. The UE may measure, at an application layer of the UE, a set of quality of experience variables associated with different service types. The UE may measure, at an access stratum of the UE, a set of radio resource management variables associated with the communication link between the UE and the serving base station and a communication link between the UE and a corresponding set of one or more neighboring base stations associated with the communication links. The UE may transmit a measurement report to the serving base station indicating information associated with the quality of experience variables and the radio resource management variables in a multi-layer readable format.

20 Claims, 22 Drawing Sheets

Related U.S. Application Data

(60) Provisional application No. 63/059,150, filed on Jul. 30, 2020.

(51) Int. Cl.
*H04L 41/5067* (2022.01)
*H04N 21/24* (2011.01)
*H04W 4/00* (2018.01)
*H04W 24/10* (2009.01)

(58) Field of Classification Search
CPC ............. H04W 36/304; H04W 36/322; H04W 84/042; H04W 24/02; H04B 1/024; H04B 17/345; Y02D 30/70; H04L 41/5003; H04L 41/5006; H04L 41/5009; H04L 41/5019; H04L 41/5096; H04L 41/5067; H04N 21/24
USPC .......................................................... 370/252
See application file for complete search history.

(56) References Cited

U.S. PATENT DOCUMENTS 9,398,559 B2 * 7/2016 Davydov ............. H04B 7/0456
10,602,388 B1 * 3/2020 Rengarajan ......... H04L 43/0852
11,042,362 B2 * 6/2021 Stump .............. G05B 19/41835
2012/0042032 A1 * 2/2012 Fredette .............. H04L 43/0858 709/214
2013/0128756 A1 * 5/2013 Zhang ..................... H04W 4/06 370/252
2013/0286868 A1 * 10/2013 Oyman ............. H04W 36/0094 370/252
2013/0326551 A1 * 12/2013 Chatterjee ............. H04L 5/0035 725/9
2015/0003420 A1 * 1/2015 Vangala ................ H04W 36/22 370/333
2017/0295508 A1 * 10/2017 Stirling-Gallacher ....................... H04L 5/0096
2022/0038934 A1 2/2022 Kumar et al.
2023/0007527 A1 * 1/2023 Baek ..................... H04W 80/06

OTHER PUBLICATIONS

Partial International Search Report - PCT/US2021/042971—ISA/EPO—Nov. 17, 2021.
Huawei: "Addition of QoE Metrics Definition and Reporting Format As Conformance Requirements for Test Cases in 8.4.1.53 and 8.4.1.55", 3GPP TSG-RAN Meeting #77, R5-177045, 3GPP tsg_ran\WG5_Test_ex-T1, Reno, US, Nov. 27, 2017-Dec. 1, 2017, Dec. 2, 2017, 16 Pages.

* cited by examiner

Communication Link Manager

1110

RRM Variable Manager

1120

QoE Indication Manager

1130

Measurement Request Manager

1140

Handover Manager

1150

Access Stratum Manager

1160

QoE Variable Manager

1115

Measurement Report Manager

1125

QoE Summary Indication Manager

1135

Communication Link Adjustment Manager

1145

Communication Parameter Manager

1155

1105

1100

Establish a communication link between the UE and a serving base station

1705

Measure, at an application layer of the UE, a set of quality of experience variables associated with different service types

1710

Measure, at an access stratum of the UE, a set of radio resource management variables associated with the communication link between the UE and the serving base station and a communication link between the UE and a corresponding set of one or more neighboring base stations associated with the communication links

1715

Transmit a measurement report to the serving base station indicating information associated with the quality of experience variables and the radio resource management variables in a multi-layer readable format

1720

1700

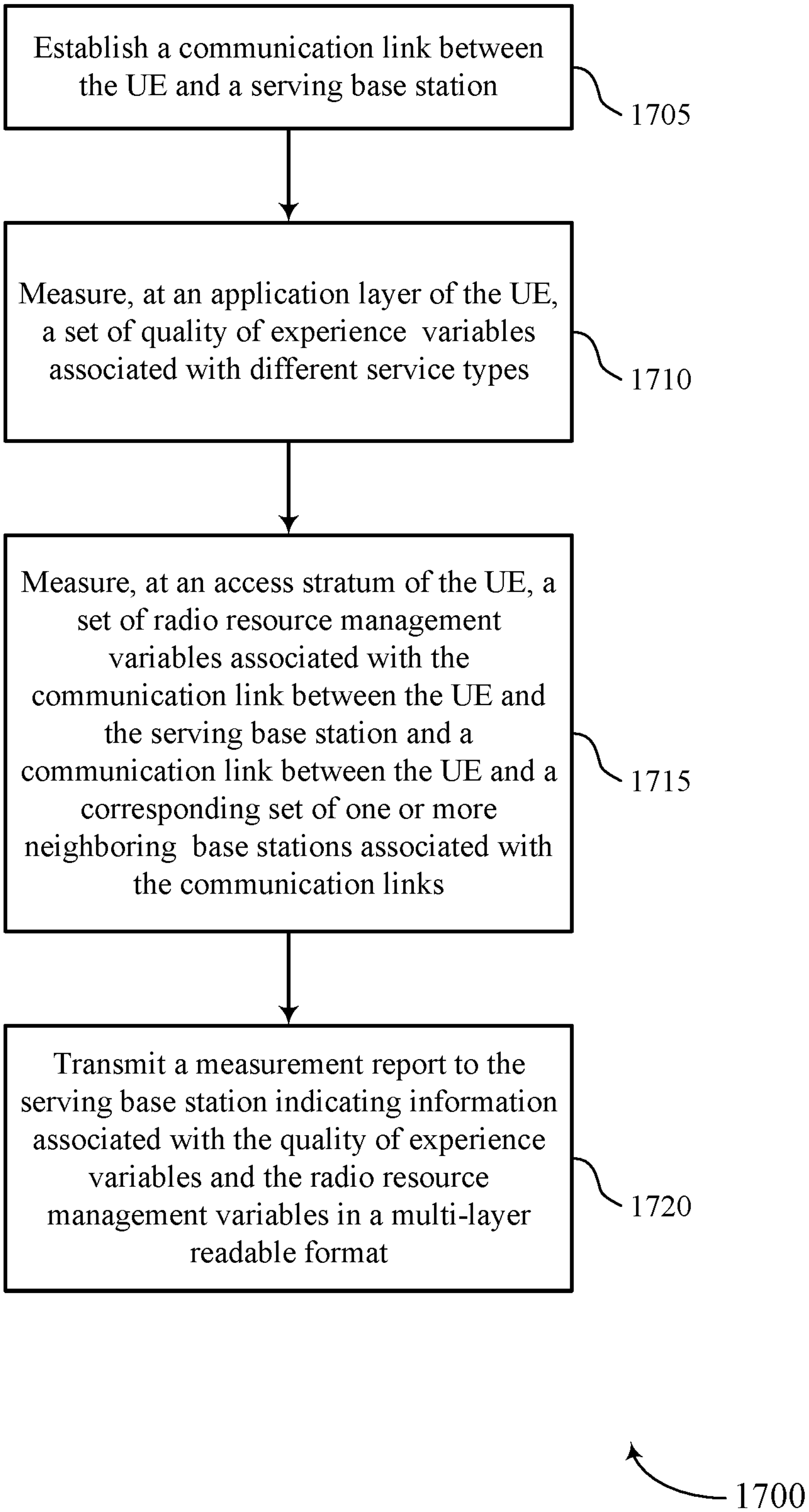

FIG. 17

Establish a communication link between the UE and a serving base station
�404 1805

Measure, at an application layer of the UE, a set of quality of experience variables associated with different service types
1810

Transfer, from the application layer of the UE to the access stratum of the UE, the set of quality of experience variables in a format readable by the radio access network
1815

Measure, at an access stratum of the UE, a set of radio resource management variables associated with the communication link between the UE and the serving base station and a communication link between the UE and a corresponding set of one or more neighboring base stations associated with the communication links
1820

Transmit a measurement report to the serving base station indicating information associated with the quality of experience variables and the radio resource management variables in a multi-layer readable format
1825

1800

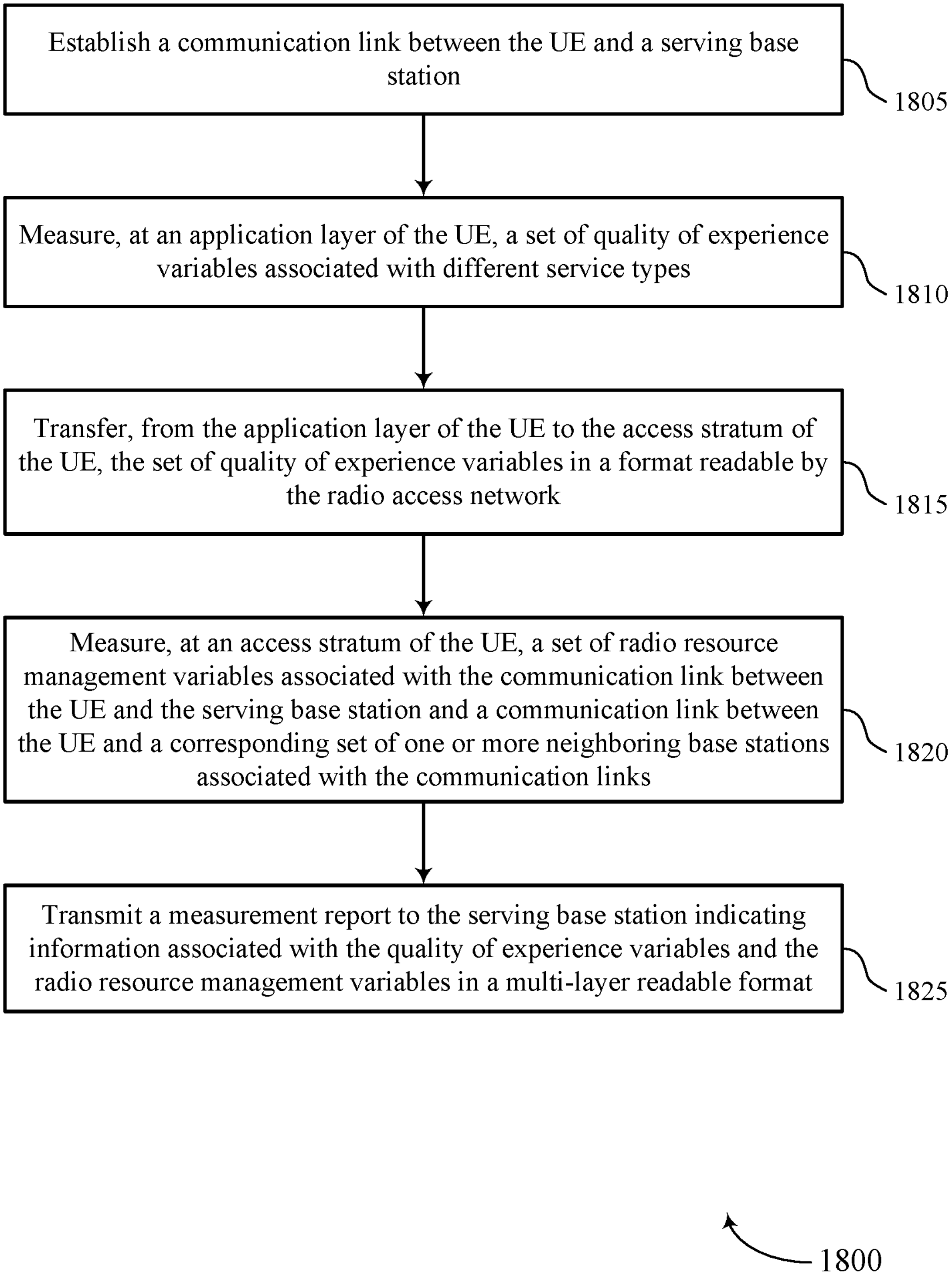

FIG. 18

Establish a communication link with a UE
~2005

Receive a measurement report from the UE indicating information associated with a set of quality of experience variables and a set of radio resource management variables in a multi-layer readable format
~2010

Adjust, in response to the measurement report, the communication link between the UE and the serving base station
~2015

2000

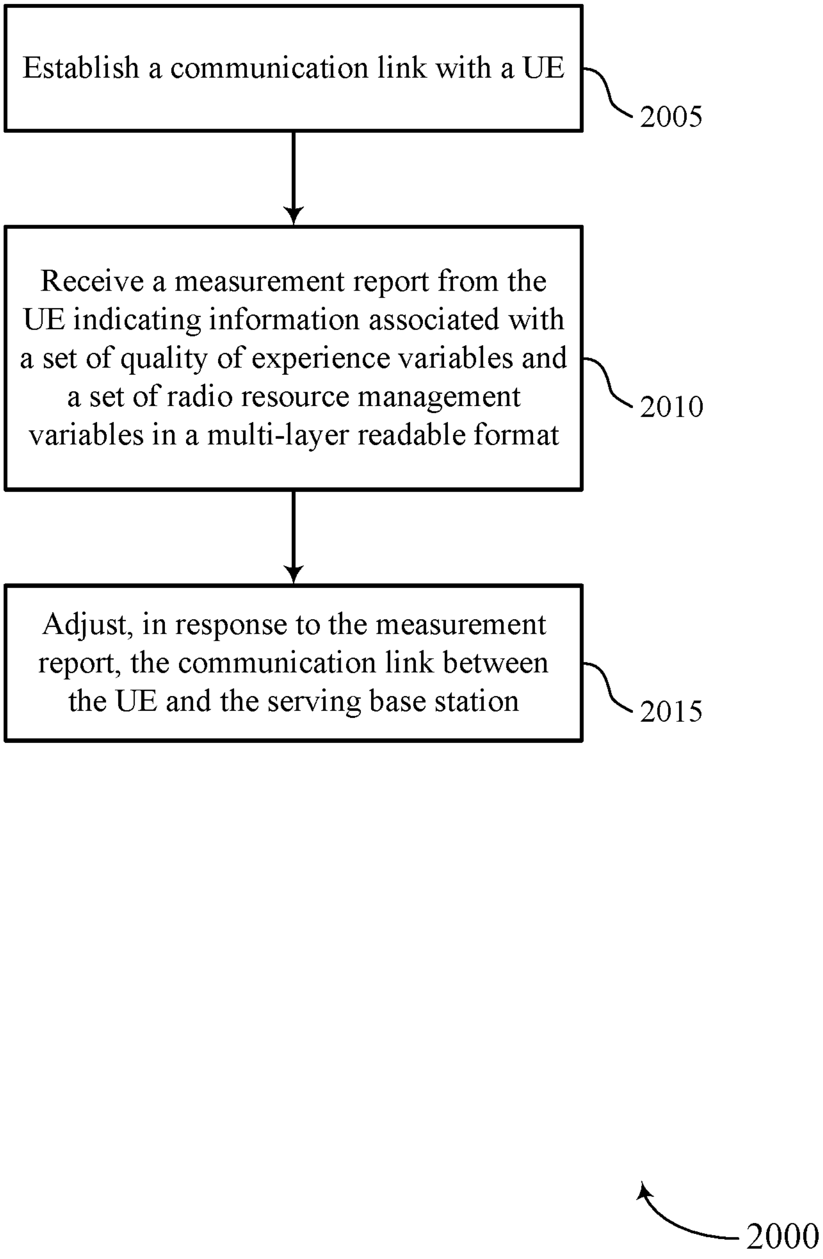

FIG. 20

Establish a communication link with a UE — 2105

Receive a measurement report from the UE indicating information associated with a set of quality of experience variables and a set of radio resource management variables in a multi-layer readable format — 2110

Adjust, in response to the measurement report, the communication link between the UE and the serving base station — 2115

Transmit a measurement request to the UE indicating the quality of experience variables to include in the set of quality of experience variables, where the measurement report indicating the set of quality of experience variables is received in response to the measurement request — 2120

2100

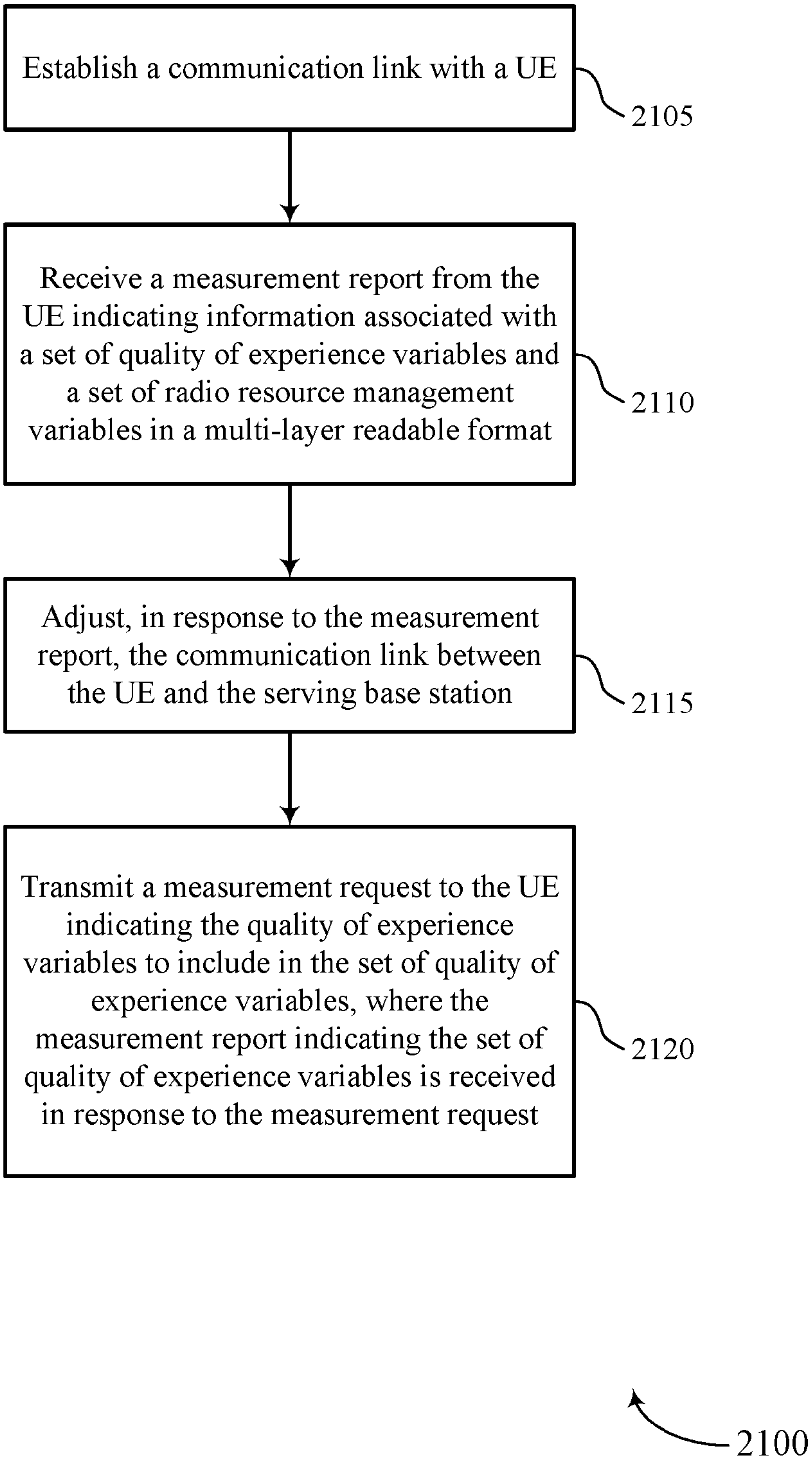

FIG. 21

Receive a resource status request from a serving base station of a UE, the resource status request indicating a quality of experience constraint of the UE and a set of quality of experience variables of the UE

2205

Determine, based on the set of quality of experience variables, whether the target base station can satisfy the quality of experience constraint of the UE

2210

Transmit a resource status response to the serving base station indicating an ability to support the quality of experience constraint of the UE

2215

2200

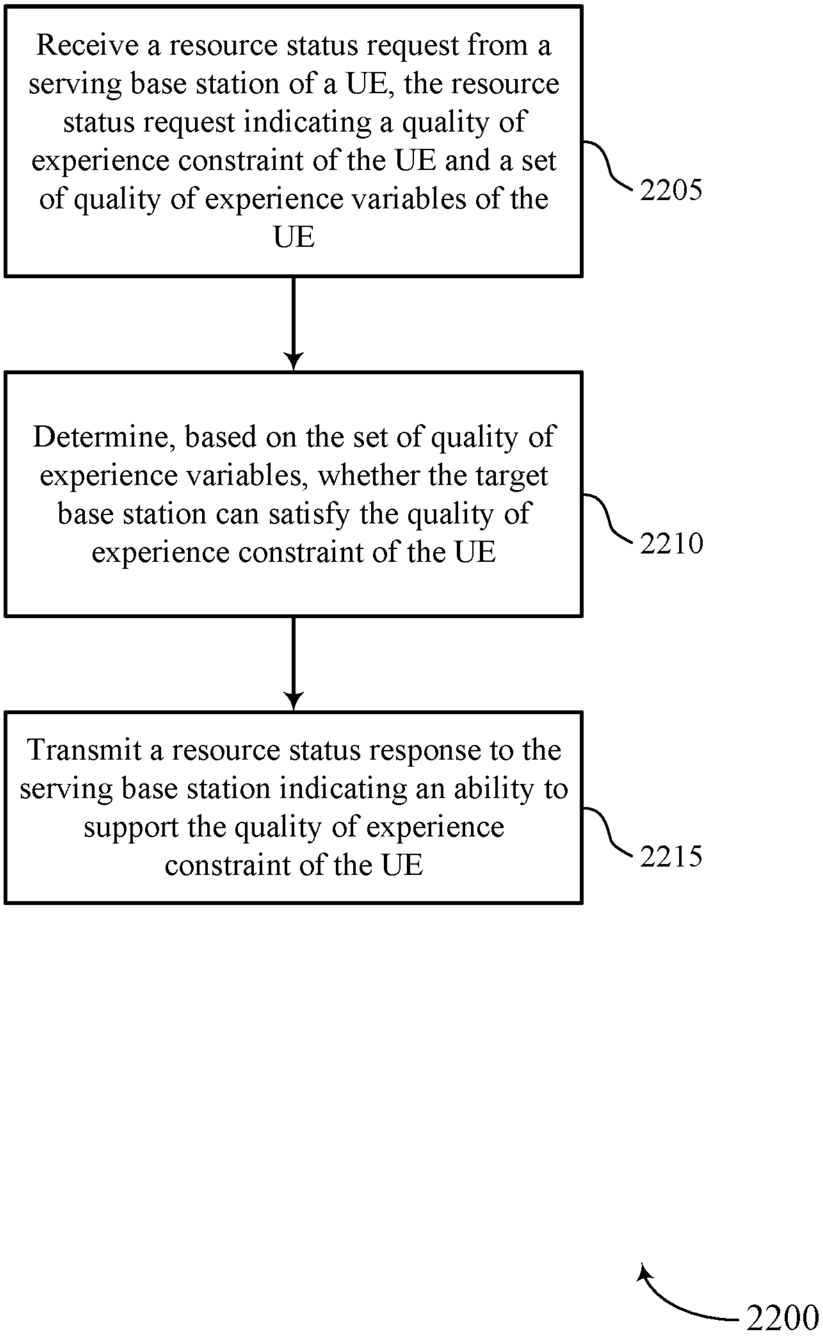

FIG. 22

QUALITY OF EXPERIENCE MEASUREMENTS FOR MOBILITY ROBUSTNESS

CROSS REFERENCE

The present application for patent is a Divisional of U.S. patent application Ser. No. 17/382,688 by KUMAR et al., entitled "QUALITY OF EXPERIENCE MEASUREMENTS FOR MOBILITY ROBUSTNESS" filed Jul. 22, 2021, which claims the benefit of U.S. Provisional Patent Application No. 63/059,150 by KUMAR et al., entitled "QUALITY OF EXPERIENCE MEASUREMENTS FOR MOBILITY ROBUSTNESS," filed Jul. 30, 2020, each of which is assigned to the assignee hereof, and each of which is expressly incorporated by reference in its entirety herein.

FIELD OF TECHNOLOGY

The following relates to wireless communications, including quality of experience measurements for mobility robustness.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support quality of experience (QoE) measurements for mobility robustness. Generally, the described techniques provide for a user equipment (UE) to convert, at least to some degree, QoE variables (e.g., measurements of one or more QoE variables) at a layer, such as the application layer, into a format that is readable by a second layer, such as a access stratum of the UE and/or radio access network (RAN) layer of a base station. In some aspects, the UE may obtain a generic QoE score based on the application layer QoE measurement or identify a subset of the application layer QoE measurement for RAN optimization, send these QoE variables to the access stratum of the UE, thereafter the access stratum may transmit it to the RAN of a base station. The UE may have an active communication link established with the UE's serving base station. The UE may measure, observe, or otherwise identify a set of RAN aware QoE variables, for example, at the application layer of the UE. The UE may also measure, observe, or otherwise identify a set of radio resource management (RRM) variables, for example, at the access stratum of the UE, e.g., reference signal received power (RSRP), reference signal strength indicator (RSSI, channel state information (CSI), etc. The RRM variables may relate to the communication link between the UE and its serving base station as well as or alternatively for communication link(s) between the UE and target base station(s) of the UE (e.g., neighboring base stations that may be able to support wireless communication link(s) with the UE). The UE may transmit or otherwise provide a measurement report to its serving base station indicating information associated with a set of QoE variables (RAN aware QoE) in addition to the set of RRM variables. In some aspects, the UE may transmit the measurement report in a multi-layer readable format, e.g., in a format readable by the application layer and the access stratum of the UE, among other examples. For example, the UE may convert the QoE variables into a format readable by the access stratum and transfer the converted QoE variables or generic metrics to the access stratum. In another example, the UE may generate a summary of the QoE variables, package the summary in a transparent container, and provide the indication of the summary of the QoE variables to the access stratum (e.g., package the summary of the QoE variables in a format readable by the access stratum of the UE and/or a base station) via the transparent container.

In some aspects, the UE or serving base station or both may update or otherwise adjust the communication link (e.g., the active communication link) based on the set of RRM variables and/or the set of QoE variables or generic QoE metrics. As one example when the communication link is performing at an acceptable level (e.g., various parameters are within a threshold), this may include adjusting or otherwise updating various communication parameters used for the communication link (e.g., adjusting a modulation and coding scheme (MCS), adjusting a bandwidth for the communication link, or the like) based on the set of RRM variables and/or set of QoE variables or generic QoE metrics. As another example when the communication link is performing at an unacceptable level (e.g., various parameters meet or exceed a threshold), this may include performing a handover procedure of the UE from the serving base station to a target base station in order for the UE to establish a new communication link with the target base station. For example, the measurement report may include the RRM variables for neighboring base station(s) together with the set of QoE variable or generic QoE metrics that may be able to establish the new communication link with the UE.

In this handover example, the serving base station may transmit a resource status request to the target base station(s) indicated in the measurement report. The resource status request may carry or otherwise convey an indication of a QoE constraint of the UE (e.g., the requested QoE level or threshold expected by the UE) and the set of QoE variables or generic QoE metrics of the UE. The target base station(s) may each determine whether their respective capability to satisfy the desired constraint of the UE and, if so, transmit a resource status response to the serving base station indicating the ability to support the QoE constraint of the UE. In some aspects, each resource status response may indicate the its capability to satisfy the desired QoE of the sending target base station (e.g., indicate the QoE level that the target base station can support). The serving base station may select the target base station to perform the handover procedure of the UE to based on the resource status response(s) received from the target base station(s), e.g., based on the QoE variables/RRM variables of the UE and/or each target base station capability to satisfy the UE QoE constraints, where the target base station may be capable of providing a relatively better (e.g., a best) QoE level to the UE. Accordingly, the serving base station may perform a handover request/response exchange with the target base station to initiate a handover procedure of the UE to the target base station to establish the new communication link. Accordingly, the described techniques permit the QoE variables identified at the application layer of the UE to be provided in a format readable by the RAN, which may utilize the QoE variables of the UE in conjunction with the RRM variables for communication link optimization and/or mobility, among other benefits.

A method for wireless communication at a UE is described. The method may include establishing a communication link between the UE and a serving base station, measuring, at an application layer of the UE, a set of QoE variables associated with different service types, measuring, at an access stratum of the UE, a set of RRM variables associated with the communication link between the UE and the serving base station and a communication link between the UE and a corresponding set of one or more neighboring base stations associated with the communication links, and transmitting a measurement report to the serving base station indicating information associated with the QoE variables and the RRM variables in a multi-layer readable format.

An apparatus for wireless communication at a UE is described. The apparatus may include a processor, memory coupled with the processor, and instructions stored in the memory. The instructions may be executable by the processor to cause the apparatus to establish a communication link between the UE and a serving base station, measure, at an application layer of the UE, a set of QoE variables associated with different service types, measure, at an access stratum of the UE, a set of RRM variables associated with the communication link between the UE and the serving base station and a communication link between the UE and a corresponding set of one or more neighboring base stations associated with the communication links, and transmit a measurement report to the serving base station indicating information associated with the QoE variables and the RRM variables in a multi-layer readable format.

Another apparatus for wireless communication at a UE is described. The apparatus may include means for establishing a communication link between the UE and a serving base station, means for measuring, at an application layer of the UE, a set of QoE variables associated with different service types, means for measuring, at an access stratum of the UE, a set of RRM variables associated with the communication link between the UE and the serving base station and a communication link between the UE and a corresponding set of one or more neighboring base stations associated with the communication links, and means for transmitting a measurement report to the serving base station indicating information associated with the QoE variables and the RRM variables in a multi-layer readable format.

A non-transitory computer-readable medium storing code for wireless communication at a UE is described. The code may include instructions executable by a processor to establish a communication link between the UE and a serving base station, measure, at an application layer of the UE, a set of QoE variables associated with different service types, measure, at an access stratum of the UE, a set of RRM variables associated with the communication link between the UE and the serving base station and a communication link between the UE and a corresponding set of one or more neighboring base stations associated with the communication links, and transmit a measurement report to the serving base station indicating information associated with the QoE variables and the RRM variables in a multi-layer readable format.

Some examples of the method, apparatuses, and non-transitory computer-readable medium described herein may further include operations, features, means, or instructions for transferring, from the application layer of the UE to the access stratum of the UE, the set of QoE variables in a format readable by the RAN, where transmitting the measurement report includes transmitting, from the access stratum of the UE, the set of QoE variables and the set of RRM variables to the serving base station.

Some examples of the method, apparatuses, and non-transitory computer-readable medium described herein may further include operations, features, means, or instructions for generating a summary of the set of QoE variables or a generic score of an overall satisfaction level to obtain a summary QoE report, configuring, at the application layer of the UE, the measurement report to indicate the summary QoE report and the set of RRM variables in a format readable by the access stratum of the UE and the serving base station, where transmitting the measurement report includes, and transmitting, from the access stratum of the UE, the summary QoE report and the set of RRM variables to the serving base station in the measurement report.

Some examples of the method, apparatuses, and non-transitory computer-readable medium described herein may further include operations, features, means, or instructions for transmitting a UE capability message indicating support for generating a RAN aware summary QoE report.

Some examples of the method, apparatuses, and non-transitory computer-readable medium described herein may further include operations, features, means, or instructions for receiving a measurement request from the base station indicating the QoE variables to include in the set of QoE variables, where identifying the set of QoE variables may be based on the measurement request, where the measurement report may be transmitted based on the measurement request.

Some examples of the method, apparatuses, and non-transitory computer-readable medium described herein may further include operations, features, means, or instructions for adjusting, in response to the measurement report, the communication link between the UE and the serving base station.

In some examples of the method, apparatuses, and non-transitory computer-readable medium described herein, adjusting the communication link may include operations, features, means, or instructions for performing, based on the set of QoE variables, a handover procedure of the UE from the serving base station to establish a new communication link with a target base station from the set of target base stations.

Some examples of the method, apparatuses, and non-transitory computer-readable medium described herein may further include operations, features, means, or instructions for determining that the set of QoE variables fail to satisfy a threshold, where transmitting the measurement report may be based on the determining and receiving, based on transmitting the measurement report, a connection reconfiguration message identifying the target base station to perform the handover procedure to establish the new communication link.

In some examples of the method, apparatuses, and non-transitory computer-readable medium described herein, adjusting the communication link may include operations, features, means, or instructions for adjusting one or more communication parameters configured for the communication link between the UE and the serving base station and one or more handover parameters for a handover procedure of the UE from the serving base station to establish a new communication link with a target base station from the set of one or more target base stations.

Some examples of the method, apparatuses, and non-transitory computer-readable medium described herein may further include operations, features, means, or instructions for identifying at least a portion of the QoE variables, at the access stratum of the UE, where the set of QoE variables indicated in the measurement report may be based on the portion of the QoE variables.

Some examples of the method, apparatuses, and non-transitory computer-readable medium described herein may further include operations, features, means, or instructions for identifying, at the access stratum of the UE, a summary QoE report based on the set of QoE variables, where the set of QoE variables indicated in the measurement report includes the summary QoE report.

In some examples of the method, apparatuses, and non-transitory computer-readable medium described herein, the QoE variables in the set of QoE variables include one or more of a cell identifier of the serving base station, or a service type for a service being communicated over the communication link, or an average application layer throughput rate, or an average application layer round-trip-time measurement, or an average application layer jitter, or an average application layer packet drop rate, or a failure rate of the application layer throughput rate, or a failure rate of the application layer round-trip-time variable, or a failure rate of the application layer jitter, or a failure rate of the application layer packet drop rate.

A method for wireless communication at a serving base station is described. The method may include establishing a communication link with a UE, receiving a measurement report from the UE indicating information associated with a set of QoE variables and a set of RRM variables in a multi-layer readable format, and adjusting, in response to the measurement report, the communication link between the UE and the serving base station.

An apparatus for wireless communication at a serving base station is described. The apparatus may include a processor, memory coupled with the processor, and instructions stored in the memory. The instructions may be executable by the processor to cause the apparatus to establish a communication link with a UE, receive a measurement report from the UE indicating information associated with a set of QoE variables and a set of RRM variables in a multi-layer readable format, and adjust, in response to the measurement report, the communication link between the UE and the serving base station.

Another apparatus for wireless communication at a serving base station is described. The apparatus may include means for establishing a communication link with a UE, means for receiving a measurement report from the UE indicating information associated with a set of QoE variables and a set of RRM variables in a multi-layer readable format, and means for adjusting, in response to the measurement report, the communication link between the UE and the serving base station.

A non-transitory computer-readable medium storing code for wireless communication at a serving base station is described. The code may include instructions executable by a processor to establish a communication link with a UE, receive a measurement report from the UE indicating information associated with a set of QoE variables and a set of RRM variables in a multi-layer readable format, and adjust, in response to the measurement report, the communication link between the UE and the serving base station.

Some examples of the method, apparatuses, and non-transitory computer-readable medium described herein may further include operations, features, means, or instructions for transmitting a measurement request to the UE indicating the QoE variables to include in the set of QoE variables, where the measurement report indicating the set of QoE variables may be received in response to the measurement request.

In some examples of the method, apparatuses, and non-transitory computer-readable medium described herein, adjusting the communication link may include operations, features, means, or instructions for performing, based on the set of QoE variables, a handover procedure of the UE from the serving base station to a target base station for the UE to establish a new communication link with the target base station.

Some examples of the method, apparatuses, and non-transitory computer-readable medium described herein may further include operations, features, means, or instructions for determining that the set of QoE variables fail to satisfy a threshold, transmitting a resource status request to a set of target base stations including the target base station indicated in the measurement report, the resource status request indicating a QoE constraint of the UE and the set of QoE variables of the UE, receiving a resource status response from the target base station indicating support of the QoE constraint of the UE, and transmitting, based on the resource status response, a connection reconfiguration message to the UE identifying the target base station to perform the handover procedure to establish the new communication link.

Some examples of the method, apparatuses, and non-transitory computer-readable medium described herein may further include operations, features, means, or instructions for receiving multiple resource status responses from at least a portion of respective target base stations of the set of one or more target base stations, each resource status response indicating a respective ability of the target base station in satisfying the UE quality of service constraints, selecting a subset of available target base stations from the portion of the respective target base stations of the set of one or more target base stations based on the ability in satisfying the QoE constraint of the UE, and selecting the target base station from the subset of available base stations based on the ability to satisfy the QoE constraints of the target base station and one or more RRM variables of the UE for the target base station.

Some examples of the method, apparatuses, and non-transitory computer-readable medium described herein may further include operations, features, means, or instructions for transmitting a handover request to the target base station based on selecting the target base station, the handover request indicating that the handover procedure of the UE may be to be performed to the target base station and receiving a handover response from the target base station, where the handover procedure of the UE may be performed with the target base station based on the handover response.

In some examples of the method, apparatuses, and non-transitory computer-readable medium described herein, adjusting the connection may include operations, features, means, or instructions for adjusting one or more communication parameters configured for the communication link between the UE and the serving base station.

A method for wireless communication at a target base station is described. The method may include receiving a resource status request from a serving base station of a UE, the resource status request indicating a QoE constraint of the UE and a set of QoE variables of the UE, determining, based on the set of QoE variables, whether the UE QoE constraints can be satisfied at the target base station, and transmitting a resource status response to the serving base station indicating an ability to support the QoE constraint of the UE.

An apparatus for wireless communication at a target base station is described. The apparatus may include a processor, memory coupled with the processor, and instructions stored in the memory. The instructions may be executable by the processor to cause the apparatus to receive a resource status request from a serving base station of a UE, the resource status request indicating a QoE constraint of the UE and a set of QoE variables of the UE, determine, based on the set of QoE variables, whether the UE QoE constraints can be satisfied at the target base station, and transmit a resource status response to the serving base station indicating an ability to support the QoE constraint of the UE.

Another apparatus for wireless communication at a target base station is described. The apparatus may include means for receiving a resource status request from a serving base station of a UE, the resource status request indicating a QoE constraint of the UE and a set of QoE variables of the UE, means for determining, based on the set of QoE variables, whether the UE QoE constraints can be satisfied at the target base station, and means for transmitting a resource status response to the serving base station indicating an ability to support the QoE constraint of the UE.

A non-transitory computer-readable medium storing code for wireless communication at a target base station is described. The code may include instructions executable by a processor to receive a resource status request from a serving base station of a UE, the resource status request indicating a QoE constraint of the UE and a set of QoE variables of the UE, determine, based on the set of QoE variables, whether the UE QoE constraints can be satisfied at the target base station, and transmit a resource status response to the serving base station indicating an ability to support the QoE constraint of the UE.

Some examples of the method, apparatuses, and non-transitory computer-readable medium described herein may further include operations, features, means, or instructions for determining the ability of the target base station in satisfying the UE quality of service constraints.

Some examples of the method, apparatuses, and non-transitory computer-readable medium described herein may further include operations, features, means, or instructions for receiving a handover request from the serving base station based on the resource status response indicating support for the QoE requirement of the UE.

Some examples of the method, apparatuses, and non-transitory computer-readable medium described herein may further include operations, features, means, or instructions for transmitting a handover response to the serving base station, where the handover procedure of the UE may be performed with the target base station based on the handover response.

BRIEF DESCRIPTION OF THE DRAWINGS

FIGS. 17 through 22 show flowcharts illustrating methods that support QoE measurements for mobility robustness in accordance with aspects of the present disclosure.

DETAILED DESCRIPTION

Figure 1:
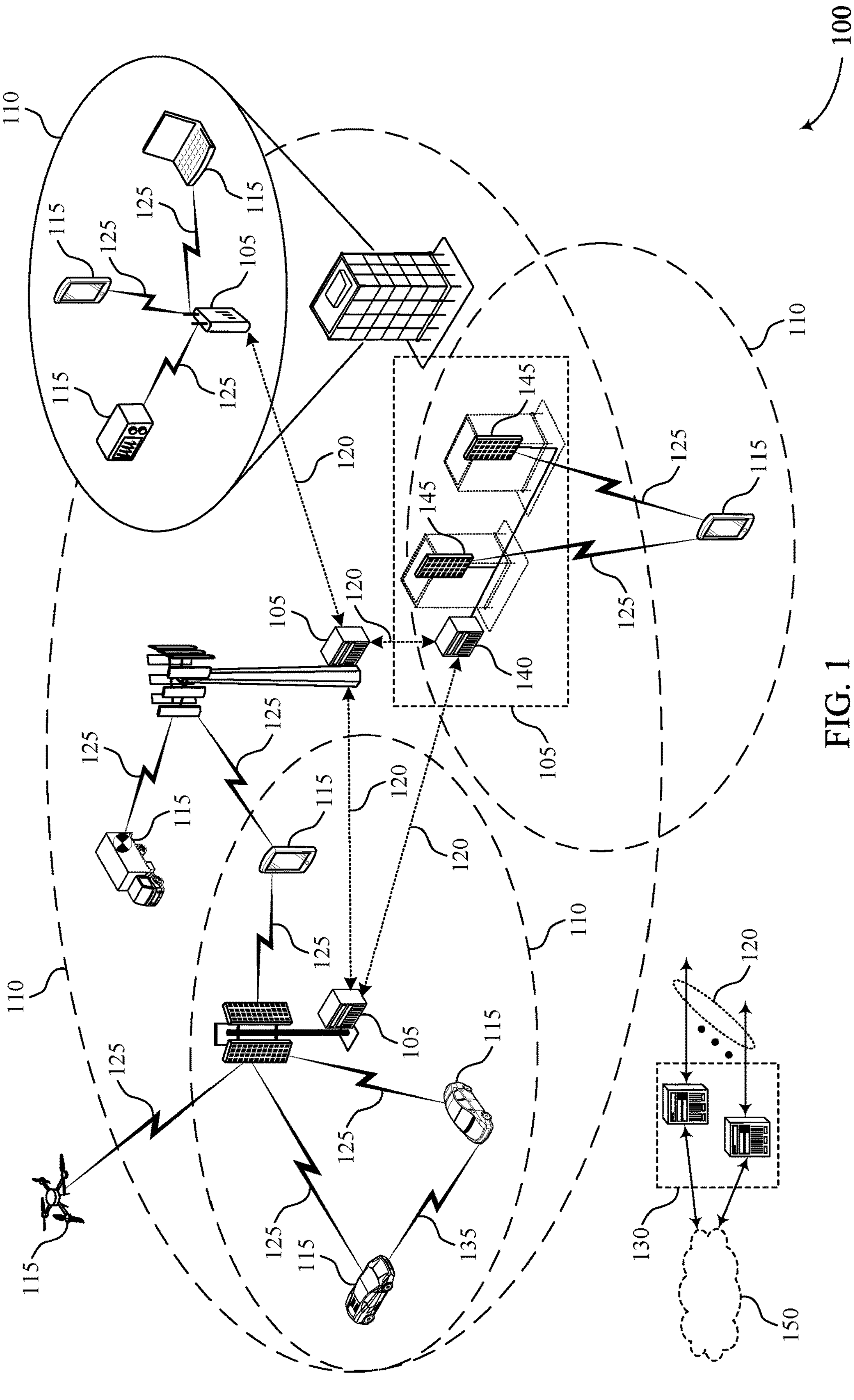
FIG. 1 illustrates an example of a system for wireless communications that supports quality of experience (QoE) measurements for mobility robustness in accordance with aspects of the present disclosure.

Some wireless communications systems may support quality of experience (QoE) variables being measured or otherwise determined, for example, at an application layer of a user equipment (UE). Such QoE variables may include, but are not limited to, an observed throughput rate at the application layer averaged over a time period, a jitter rate, packet drop rate, etc. and may be observed, for example, at the application layer and may be determined and averaged over a duration, or the like. The QoE variables may be exchanged between the peer entities, for example, between the application layer level and the access stratum of the UE and used to adjust parameters, for example, application layer parameters for improved user experience (e.g., to optimize the observed QoE variables). For example, the data corresponding to the QoE variables may be packetized into a packet format by the application layer and then provided to the access stratum of the UE for transmission. Broadly, the access stratum of the UE may include one or more sublayers that receive or otherwise obtain the packets from the application layer, perform various processes on the packets (e.g., sequence number addition for packet tracking/assembly, header(s) addition, ciphering, integrity protection, encoding, mapping to logical channels, etc.) before being provided to a physical layer (e.g., the lowest sublayer of the access stratum) for modulation and transmission over time, frequency, spatial, etc., physical resources of the communication link. In other different techniques, the packets provided to the access stratum for transmission are opaque from the perspective of the access stratum (e.g., the data being conveyed in the packets is not in a format that the sublayers of the access stratum can read as the packet passes through each sublayer), which includes the QoE variables identified at the application layer. Accordingly, such wireless communications systems and related other different techniques do not provide a mechanism where the access stratum of the UE can consider the QoE variables for communication link optimizations and/or handover.

Aspects of the present disclosure are initially described in the context of wireless communications systems. Generally, the described techniques provide for a UE to convert, at least to some degree, QoE variables (e.g., measurements of the QoE variables) at, for example, the application layer into a format that is readable by a second layer, for example, an access stratum of the UE. The application layer of the UE may obtain RAN aware QoE variables (a subset of QoE variables or generic QoE metrics) and provide it to the access stratum of the UE. The UE may have an active communication link established with its serving base station. The UE may measure, observe, or otherwise identify a set of QoE variables as the RAN aware QoE metric or obtain a set of generic metrics, for example, at the application layer of the UE. The UE may also measure, observe, or otherwise identify a set of radio resource management (RRM) variables at, for example, an access stratum of the UE, e.g., reference signal received power (RSRP), reference signal strength indicator (RSSI, channel state information (CSI), etc. The RRM variables may be for the communication link between the UE and its serving base station as well as communication link(s) between the UE and target base station(s) of the UE (e.g., neighboring base stations that may be able to support wireless communication link(s) with the UE). The UE may transmit or otherwise provide a measurement report to its serving base station indicating information associated with the set of QoE variables in addition to the set up RRM variables. In some aspects, the UE may transmit the measurement report in a multi-layer readable format, e.g., in a format readable by the application layer and the access stratum of the UE and RAN. For example, the UE may convert the QoE variables into a format readable by the access stratum and transfer the converted QoE variables to the access stratum. In another example, the UE may generate a summary of the QoE variables, package the summary in a transparent container, and provide the indication of the summary of the QoE variables to the access stratum (e.g., package the summary of the QoE variables in a format readable by the access stratum of the UE) via the transparent container.

In some aspects, the UE and/or serving base station may update or otherwise adjust the communication link (e.g., the active communication link) based on the set of RRM variables and/or the set of QoE variables. As one example when the communication link is performing at an acceptable level (e.g., various parameters are within a threshold), this may include adjusting or otherwise updating various communication parameters used for the communication link (e.g., adjusting a modulation and coding scheme (MCS), adjusting a bandwidth for the communication link, or the like) based on the set of RRM variables and/or set of QoE variables. As another example when the communication link is performing at an unacceptable level (e.g., various parameters meet or exceed a threshold), this may include performing a handover procedure of the UE from the serving base station to a target base station in order for the UE to establish a new communication link with the target base station. For example, the measurement report may indicate RRM variables for target base station(s) and QoE variables that may be able to establish the new communication link with the UE.

In this handover example, the serving base station may transmit a resource status request to the target base station(s) indicated in the measurement report. The resource status request may carry or otherwise convey an indication of the QoE constraint of the UE (e.g., the requested QoE level of the UE) and the set of QoE variables of the UE. The target base station(s) may each determine whether their respective capability to satisfy the QoE constraint of the UE and, if so, transmit a resource status response to the serving base station indicating the ability to support the QoE constraint of the UE. In some aspects, each resource status response may indicate its capability to satisfy the UE QoE constraints of the sending target base station (e.g., indicate the QoE level that the target base station can support). The serving base station may select the target base station(s) to perform the handover procedure of the UE to based on the resource status response(s) received from the target base station(s), e.g., based on the QoE variables/RRM variables of the UE and each target base station capability to satisfy the UE QoE constraints, where the target base station is capable of providing the best QoE level to the UE. Accordingly, the serving base station may perform a handover request/response exchange with the target base station(s) to initiate a handover procedure of the UE to the target base station(s) to establish the new communication link. Accordingly, the described techniques permit the QoE variables identified at the application layer of the UE to be provided in a format readable by the RAN, which may utilize the QoE variables of the UE in conjunction with the RRM variables for communication link optimization and/or mobility.

Aspects of the disclosure are further illustrated by and described with reference to apparatus diagrams, system diagrams, and flowcharts that relate to QoE measurements for mobility robustness.

FIG. 1 illustrates an example of a wireless communications system 100 that supports QoE measurements for mobility robustness in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may establish a communication link between the UE 115 and a serving base station (e.g., a base station 105 serving the UE 115). The UE 115 may obtain measurements of a set of quality of experience variables associated with the service type over communication link between the UE 115 and the serving base station, at the application layer of the UE 115. A few examples of service types can be streaming video, Virtual Reality (VR), Multimedia Telephony Service for IMS (MTSI), or Multicast Broadcast Services (MBS). The UE 115 may obtain, at an access stratum of the UE 115, a set of radio resource management variables associated with the communication link between the UE 115 and the serving base station and radio measurements of the neighboring base stations. The UE 115 may transmit a measurement report to the serving base station indicating information associated with the quality of experience variables and the radio resource management variables in a multi-layer readable format.

A base station 105 (e.g., when the base station 105 is a serving base station of a UE 115) may establish a communication link with a UE 115. The base station 105 may receive a measurement report from the UE 115 indicating information associated with a set of QoE variables and a set of RRM variables in a multi-layer readable format. The base station 105 may adjust, in response to the measurement report, the communication link between the UE 115 and the serving base station.

A base station 105 (e.g., when the base station 105 is a target base station of a UE 115) may receive a resource status request from a serving base station of a UE 115, the resource status request indicating a QoE constraint of the UE 115 and a set of QoE variables of the UE 115. The base station 105 may determine, based at least in part on the set of QoE variables, whether the target base station(s) can satisfy the QoE constraint of the UE 115. The base station 105 may transmit a resource status response to the serving base station indicating an ability to support the QoE constraint of the UE 115.

Figure 2:
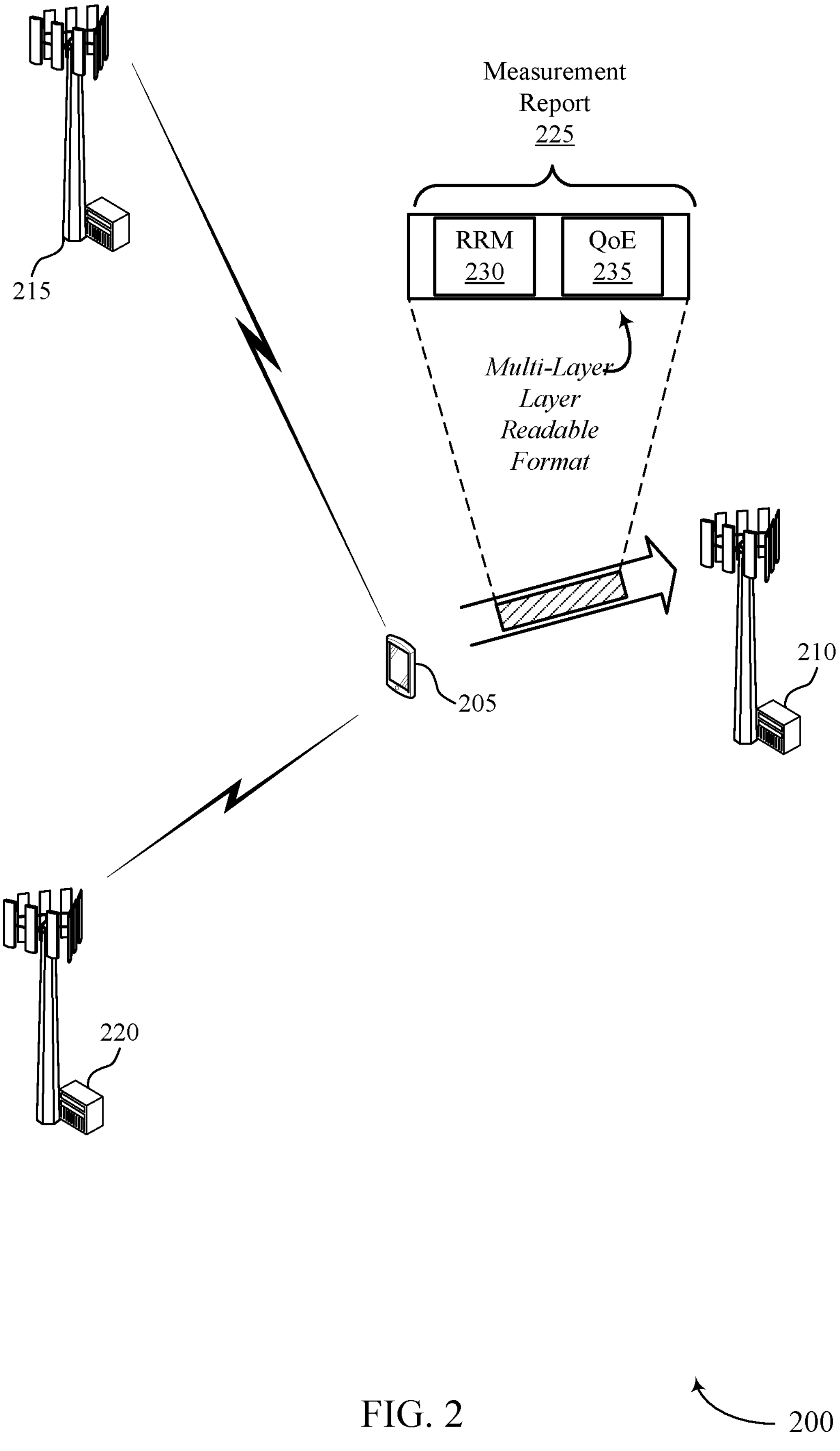
FIG. 2 illustrates an example of a wireless communications system that supports QoE measurements for mobility robustness in accordance with aspects of the present disclosure.

FIG. 2 illustrates an example of a wireless communications system 200 that supports QoE measurements for mobility robustness in accordance with aspects of the present disclosure. In some examples, wireless communications system 200 may implement aspects of wireless communications system 100. Wireless communications system 200 may include UE 205, base station 210, base station 215, a base station 220, which may be examples of corresponding devices described herein. In some aspects, base station 210 may be a serving base station of UE 205. In some aspects, base station 215 and base station 220 may be target base stations of UE 205.

In some aspects, UE 205 may have a communication link established with base station 210. For example, UE 205 may have performed an access procedure with base station 210 to establish the communication link, with base station 210 being the serving base station of UE 205. UE 205 may measure, observe, identify, or otherwise obtain RRM variables for the communication link between UE 205 and base station 210. For example, UE 205 may identify RRM variables, such as RSRP, RSSI, CSI, channel quality information (CQI), interference level(s), etc., using various transmissions from base station 210. Such transmissions may include synchronization signal transmissions, reference signal transmissions, or the like. Such RRM variables are typically obtained by various sublayers of the access stratum of the UE, e.g., the physical sublayer, the RLC sublayer, the RRC sublayer, etc. RRM variables are typically exchanged between the various sublayers of the access stratum and used for communication link optimization. For example, various communication parameters used for the communication link may be optimized based on the RRM variables. For example, the MCS may be updated, the bandwidth for the communication link may be updated, an aggregation level (AL) of the communication link may be updated, an ARQ function of the communication link may be activated/deactivated, or the like, based on the RRM variables to optimize performance of the communication link. For example, UE 205 may transmit a measurement report 225 to base station 210 carrying or otherwise conveying an indication of the RRM variables 230.

In some aspects, QoE variables may be measured, observed, identified, or otherwise obtained at the application layer of UE 205. The QoE variables may generally correspond to variables indicative of the quality of the overall user experience at the application layer. In some aspects, the QoE variables may capture an average application layer QoE performance (e.g., the QoE measurements). One example of a QoE variable may include the application layer measuring, monitoring, or otherwise determining a throughput rate at the application layer. That is, the application layer may determine the rate at which packets are communicated from the application layer of a transmitting device to the corresponding application layer of the receiving device. The throughput rate (e.g., AvgAppLayThrough) may be instantaneous and/or averaged over a time period.

Another example of a QoE variable may include the application layer measuring, monitoring, or otherwise determining, a round trip time (RTT) at the application layer. That is, the application layer may determine the time that it takes for a packet to be transmitted from the application layer of a transmitting device until a responsive packet is received from the receiving device at the application layer of the transmitting device. The RTT (e.g., AvgAppLayerRTT) may be instantaneous and/or averaged over a time period.

Another example of a QoE variable may include the application layer measuring, monitoring, or otherwise determining, a jitter (e.g., a jitter rate) at the application layer. That is, the application layer may measure the jitter rate observed at the application layer. The jitter (e.g., AvgAppLayerJitter) may be instantaneous and/or averaged over a time period.

Another example of a QoE variable may include the cell identifier, e.g., an identifier associated with base station 210. That is, the application layer may identify the cell identifier of base station 210.

Another example of a QoE variable may include a service type. That is, the application layer may have a number of applications in operation, with at least some of those operations including the application communicating via the communication link. Accordingly, each application may have a corresponding application type indicative of, or otherwise associated with, the type of service being provided for the application. A few examples of service types can be streaming video, Virtual Reality (VR), Multimedia Telephony Service for IMS (MTSI), or Multicast Broadcast Services (MBS). Accordingly, the service type associated with each application of the application layer may dictate the QoE variable for that application.

Accordingly, in some aspects UE 205 may have a QoE constraint. Broadly, the QoE constraint of UE 205 may correspond to a requested QoE variable satisfying a particular threshold. For example, a QoE constraint may include a QoE capability of providing large amounts of data streamed for a certain time period. The QoE measurements can demonstrates whether the QoE constraints of UE 205 are satisfied. As part of the application layer optimizations, UE 205 may obtain a large set of QoE variables, however, many of these QoE variable may have limited significance for RAN optimization purpose. A subset of these QoE variable per service type or generic overall satisfaction level can be obtained by the application layer of UE 205 for RAN optimizations and send it to the access stratum of the UE 205. The subset of the QoE variable or the generic score may correspond to UE QoE constraints.

In some aspects, the QoE variables may capture the percentage of time that a QoE metric (e.g., a QoE variable) is violated. For example, a QoE variable may be violated when the QoE constraint of that QoE variable is not being satisfied at the application layer. Accordingly, another example of a QoE variable may include the application layer measuring, monitoring, or otherwise determining, the time in which the QoE constraint for the instant and/or averaged throughput rate is being observed at the application layer and the time in which the QoE constraint for the instant and/or averaged throughput rate is not being observed at the application layer. More particularly, the application layer may determine the percentage of the total time that the minimum, needed, requested, etc., QoE variable corresponding to the instant and/or averaged throughput rate is not being satisfied by the corresponding instant and/or averaged throughput rate observed by the application layer. An example may include an exception application layer throughput rate (e.g., ExcAppLayThrough).

Another example of a QoE variable may include the application layer measuring, monitoring, or otherwise determining, the time in which the QoE constraint for the instant and/or averaged RTT is being observed at the application layer and the time in which the QoE constraint for the instant and/or averaged RTT is not being observed at the application layer. More particularly, the application layer may determine the percentage of the total time that the minimum, needed, requested, etc., QoE variable corresponding to the RTT is not being satisfied by the corresponding instant and/or averaged RTT observed by the application layer. An example may include an exception application layer RTT (e.g., ExcAppLayerRTT).

Another example of a QoE variable may include the application layer measuring, monitoring, or otherwise determining, the time in which the QoE constraint for the instant and/or averaged packet drop rate is being observed at the application layer and the time in which the QoE constraint for the instant and/or averaged packet drop rate is not being observed at the application layer. More particularly, the application layer may determine the percentage of the total time that the minimum, needed, requested, etc., QoE variable corresponding to the instant and/or averaged packet drop rate is not being satisfied by the corresponding instant and/or averaged packet drop rate observed by the application layer. An example may include an exception application layer packet drop rate (e.g., ExcAppLayerPacketDrop).

Similar to how RRM variables are used for optimization of the communication link by the RAN, the QoE variables are used for application layer optimizations. For example, various application layer parameters are updated for the communication link based on the QoE variables observed by the application layers at each transmitting/receiving device.

However, in some wireless communications systems the set of QoE variables is typically unknown by other layers. For example, the data corresponding to the QoE variables is packetized into a packet format by the application layer and then provided to the access stratum for transmission. Broadly, the access stratum includes various sublayers that receive or otherwise obtain packets from the application layer, perform various processes on the packets (e.g., sequence number addition for packet tracking/assembly, header(s) addition, ciphering, integrity protection, encoding, mapping to logical channels, etc.) before being provided to the physical layer (e.g., the lowest sublayer of the access stratum) for modulation, mapping of the logical channels to physical channels, and transmission over time, frequency, spatial, etc., physical resources of the communication link. At the receiving device, the access stratum receives the transmissions at the physical layer, which passes the packets through the sublayers of the access stratum. These sublayers perform various processes on the packets (e.g., mapping to logical channels, decoding, integrity verification, deciphering, packet reassembly, ARQ, etc.) before being provided to the application layer for recovery of the information carried or otherwise conveyed in the packets.

Generally, the packets provided to the access stratum for transmission are opaque from the perspective of the RAN (e.g., the data being conveyed in the packets is not in a format that the sublayers of the access stratum can read as the packet passes through each sublayer), which includes the QoE variables measured at the application layer. Accordingly, such wireless communications systems do not provide a mechanism where the RAN can consider the QoE variables for communication link optimizations and/or handover.

In some situations a good radio signal (e.g., the RRM variables satisfying or, in some cases, exceeding RRM performance threshold levels) may not necessarily result in a good user experience (e.g., the QoE variables may fail to satisfy corresponding QoE performance threshold or constraint even though the RRM thresholds satisfy their RRM performance thresholds). For example, other factors may impact the QoE performance of a communication link beyond the quality of the radio link, e.g., the radio access technology (RAT) of the communication link, the total system bandwidth, the load/congestion levels of the network, packet delay/loss rate of the network, the jitter rate of the network, etc. Accordingly, such wireless communications systems may not leverage QoE variables at the RAN for link optimizations and/or handover.

Accordingly, aspects of the described techniques provide for UE 205 to convert, at least to some degree, QoE variables (e.g., measurements of the QoE variables) at the application layer into a format that is readable by the access stratum of UE 205 and RAN. UE 205 may have an active communication link established with its serving base station, e.g., base station 210. UE 205 may measure the QoE variables (e.g., a set of QoE variables) at the application layer of UE 205. UE 205 may also measure the RRM variables (e.g., a set of RRM variables) at the access stratum of UE 205, e.g., RSRP, RSSI, CSI, CQI, signal-to-interference-to-noise ratio (SINR), etc. The RRM variables may be for the communication link between UE 205 and its serving base station (e.g., base station 210) as well as communication link(s) between UE 205 and neighboring base station(s) of the UE (e.g., base station 215 and/or base station 220 that may be able to support wireless communication link(s) with UE 205).

UE 205 may transmit or otherwise provide the measurement report 225 to its serving base station (e.g., to base station 210) indicating information associated with the set of QoE variables 235 in addition to the set of RRM variables 230. In some aspects, UE 205 may transmit the measurement report 225 in a multi-layer readable format, e.g., in a format readable by the application layer and the access stratum. For example, UE 205 may obtain and convert a subset QoE variables into a format or obtain generic score readable by the access stratum and transfer the converted QoE variables to the RAN, which forwards the QoE variables to base station 210. That is, UE 205 may convert the RAN readable QoE measurements. UE 205 may transfer the set of QoE variables from the application layer to the access stratum in a format readable by the RAN. In this situation, the UE may transmit the measurement report 225 indicating the set of RRM variables 230 and the set of QoE variables 235. In some aspects of this example, this may be based on the capability of UE 205. For example, if UE 205 is capable of obtaining the RAN aware QoE measurements, the network may configure UE 205 with optional QoE measurement parameters (e.g., using RRC signaling) or within application layer QoE container.

In another example, UE 205 may generate a summary of the QoE variables 235, package the summary in a transparent container, and provide the indication of the summary of the QoE variables 235 to the access stratum (e.g., package the summary of the QoE variables in a format readable by the RAN) via the transparent container. That is, UE 205 may send the QoE measurements in an extensible markup language (XML format), and base station 210 may convert the measurements into the RAN readable format for processing/application. Accordingly, UE 205 may generate a summary of the set of QoE variables 235 to obtain the summary QoE report. The measurement report 225 may be configured at the application and/or access stratum to indicate the summary report (e.g., as the set of QoE variables 235). In some aspects of this example, this may be based on the capability of UE 205. For example, if UE 205 is capable of obtaining the summary of QoE measurements at the access stratum in the RAN readable format, then the network may extract the transparent container to recover the summary of QoE measurements.

In another example, if UE 205 is unable to obtain the QoE measurements in a format readable by the RAN, the network (edge cloud or QoE server) can convert the QoE measurement into the RAN readable format and provide the QoE measurements to the RAN or serving base station.

In some aspects, UE 205 and/or base station 210 may update or otherwise adjust the communication link (e.g., the active communication link) based on the set of RRM variables 230 and/or the set of QoE variables 235. Generally, the QoE variables captured at the application layer may include various fields (e.g., individual QoE variable(s)) that are irrelevant to other layers, such as the access stratum. However, some QoE variable(s) may be relevant to the RAN optimizations, which may improve communication link optimizations and/or mobility. For example, throughput rates, delays, RTTs, packet drop rates, application layer buffer status or the like, observed at the access stratum may be quite different than the throughput rates, delays, RTTs, packet drop rates, or the like, observed at the application layer. Accordingly, the described techniques where the set of QoE variables 235 are provided in a multi-layer readable format (e.g., in a format readable by the application layer and the RAN) may permit the set of QoE variables 235 to be utilized by the RAN for communication link optimization and mobility.

As one example when the communication link is performing at an acceptable level, this may include adjusting or otherwise updating various communication parameters used for the communication link (e.g., various RAN parameters, such as adjusting a MCS, adjusting a bandwidth for the communication link, adjusting a resource allocation, or the like) based on the set of RRM variables and/or set of QoE variables. For example, UE 205 and/or base station 210 may increase a resource allocation for the communication link based on an averaged (or excepted) throughput rate observed at the application layer. In another example, UE 205 and/or base station 210 may schedule communications based on a packet drop rate observed at the application layer. In another example, UE 205 and/or base station 210 may schedule communications based on an RTT observed that the application layer in order to satisfy latency requirements.

In another example when the communication link is performing at an unacceptable level, adjusting the communication link this may include performing a handover procedure of UE 205 from the serving base station (e.g., base station 210) to a target base station (e.g., base station 215 or base station 220) in order for UE 205 to establish a new communication link with the target base station. For example, the measurement report 225 may include the set of RRM variables 230 for target base station(s) that may be able to establish the new communication link with UE 205.

For example, base station 210 may configure UE 205 to perform QoE measurements (e.g., to identify the set of QoE variables) for mobility purposes. Base station 210 may use QoE measurements triggered by an operations and administration management (OAM) function of the network for mobility purposes. That is, base station 210 may transmit a configuration signal (e.g., a measurement request) indicating which QoE variables that UE 205 is to measure and report to base station 210. Accordingly, UE 205 may identify the QoE variables indicated in the measurement request, and includes those in the set of QoE variables.

In some aspects, a handover procedure may be event trigger-based. For example, handover procedures may be performed in response to various events being triggered (e.g., such as A2, A3, A4, A5, A6, B1, B2, etc., event triggered measurements). That is, various events are defined such that, if UE 205 determines that an event has been triggered (e.g., a RRM variable fails to satisfy a threshold performance quality and/or reaches a low performance quality threshold), UE 205 will perform certain measurements related to the RRM variable(s) and transmit the results of the measurements in the measurement report 225, e.g., in the set of RRM variables 230 together with QoE measurements 235.

In some aspects, a new event is described herein (e.g., a Q1 triggering event) to initiate a handover procedure upon satisfying a particular QoE constraint. For example, UE 205 may monitor various QoE variable(s) (e.g., perform QoE measurements) and compare the results to corresponding QoE constraint(s) (e.g., threshold(s)). If the measured QoE variable(s) fail to satisfy the corresponding QoE constraint, this may trigger the corresponding Q1 event to begin the process of determining whether a handover is warranted, and performed if so.

In some aspects, the Q1 event trigger may send an indication to access stratum of the UE 205 to obtain the RRM measurements. Upon such indication UE 205 performs RRM measurements. In some aspects, the Q1 event trigger may be defined by the RRC layer as below:

5.5.4.15 Event Q1 (QoE Becomes Worse than Threshold)

The UE shall:

1> consider the entering condition for this event to be satisfied when condition Q1-1, as specified below, is fulfilled;

1> consider the leaving condition for this event to be satisfied when condition Q1-2, as specified below, is fulfilled;

1> for this measurement, consider the NR serving cell corresponding to the associated measObjectNR associated with this event.

Inequality Q1-1 (Entering Condition)

$$Ms(x)-Hys(x)<\text{Thresh}(x)$$

Inequality Q1-2 (Leaving Condition)

$$Ms(x)+Hys(x)>\text{Thresh}(x)$$

Where x indicates the different QoE metric. There can be two choices for trigger this event Choice 1:—trigger when all of the QoE fall below threshold—hysteresis, i.e., Q1-1 become ∀x.

Choice 2:—trigger when any of the QoE fall below threshold.

The variables in the formula are defined as follows:

Ms(x) is the QoE measurement result of metric "x" at the serving cell, not taking into account any offsets.

Hys(x) is the hysteresis parameter of metric "x" for this event (i.e. hysteresis as defined within reportConfigNR for this event).

Thresh(x) is the threshold parameter of metric "x" for this event (i.e. ql-Threshold as defined within reportConfigNR for this event).

Ms(x) is expressed in the respective unit of QoE metric

Hys(x) is expressed in the respective unit of QoE metric

Thresh(x) is expressed in the same unit as Ms(x).

Accordingly, upon a determination that one or more of the QoE variables in the set of QoE variables fails to satisfy the corresponding QoE constraint, this may trigger the Q1 event response (as is described above). The response may include performing various RRM measurements for the communication link between UE 205 and base station 210 and between UE 205 and base station 215 and/or base station 220 (e.g., target base stations). The response may include performing various QoE measurements for the communication link between UE 205 and base station 210.

Accordingly, UE 205 may transmit the measurement report 225 indicating the set of RRM variables 230 and/or the set of QoE variables 235. In some aspects, the measurement report 225 may be configured to indicate information associated with the set of RRM variables 230 and/or the set of QoE variables 235. For example, base station 210 may transmit an RRC configuration signal to UE 205 indicating a format for the measurement report 225 including information associated with the set of QoE variables 235 for RAN optimizations. In one example, this may include base station 210 transmitting a report configuration NR (ReportConfigNR) information element (IE). One example of the report configuration NR IE may include:

```
-- ASN1START
-- TAG-REPORTCONFIGNR-START
ReportConfigNR ::=          SEQUENCE {
   reportType          CHOICE {
      periodical          PeriodicalReportConfig,
      eventTriggered          EventTriggerConfig,
      ...,
      reportCGI              ,
      reportSFTD             ReportSFTD-NR,
      condTriggerConfig-r16              ,
      cli-Periodical-r16             CLI-PeriodicalReportConfig-r16,
      cli-EventTriggered-r16             CLI-EventTriggerConfig-r16,
   }
}
ReportSFTD-NR ::=          SEQUENCE {
   reportSFTD-Meas          BOOLEAN,
   reportRSRP          BOOLEAN,
   ...,
   [[
   reportSFTD-NeighMeas       ENUMERATED {true}             OPTIONAL, -- Need R
   drx-SFTD-NeighMeas       ENUMERATED {true}             OPTIONAL, -- Need R
   cellsForWhichToReportSFTD    SEQUENCE (SIZE (1..maxCellSFTD)) OF
PhysCellId OPTIONAL -- Need R
   ]]
}
CondTriggerConfig-r16 ::=       SEQUENCE {
   condEventId          CHOICE {
      condEventA3          SEQUENCE {
         a3-Offset          MeasTriggerQuantityOffset,
         hysteresis          ,
         time ToTrigger
      },
      condEventA5          SEQUENCE {
         a5-Threshold1          MeasTriggerQuantity,
         a5-Threshold2          MeasTriggerQuantity,
         hysteresis          ,
         timeToTrigger
      },
      ...
   },
   rsType-r16          NR-RS-Type,
   ...
},
EventTriggerConfig ::=          SEQUENCE {
   eventId             CHOICE {
      eventA1             SEQUENCE {
         a1-Threshold             MeasTriggerQuantity,
         reportOnLeave             BOOLEAN,
         hysteresis             ,
         time ToTrigger
      },
      eventA2             SEQUENCE {
         a2-Threshold             MeasTriggerQuantity,
         reportOnLeave             BOOLEAN,
         hysteresis             ,
         time To Trigger
      },
      eventA3             SEQUENCE {
         a3-Offset             MeasTriggerQuantityOffset,
         reportOnLeave             BOOLEAN,
         hysteresis             ,
         timeTo Trigger             ,
         use WhiteCellList             BOOLEAN
      },
      eventA4             SEQUENCE {
         a4-Threshold             MeasTriggerQuantity,
         reportOnLeave             BOOLEAN,
         hysteresis             ,
         timeTo Trigger             ,
         use WhiteCellList             BOOLEAN
      },
      eventA5             SEQUENCE {
         a5-Threshold1             MeasTriggerQuantity,
         a5-Threshold2             MeasTriggerQuantity,
         reportOnLeave             BOOLEAN,
         hysteresis             ,
         time To Trigger             ,
         use WhiteCellList             BOOLEAN
      },
```

-continued

```
        eventA6              SEQUENCE {
           a6-Offset              MeasTriggerQuantityOffset,
           reportOnLeave              BOOLEAN,
           hysteresis                ,
           timeTo Trigger                ,
           use WhiteCellList              BOOLEAN
        },
        ...,
                  [[
                  eventQ1
                  SEQUENCE {
                        q1-Threshold              MeasTriggerQuantityQoE,
        reportOnLeave BOOLEAN,
        hysteresis              ,
        timeToTrigger
                  },
                  ]]
     },
     rsType              NR-RS-Type,
     reportInterval           ,
     reportAmount              ENUMERATED {r1, r2, r4, r8, r16, r32, r64, infinity},
     reportQuantityCell              MeasReportQuantity,
     maxReportCells              INTEGER (1..maxCellReport),
     report QuantityRS-Indexes       MeasReportQuantity                        OPTIONAL, --
Need R
     maxNrofRS-IndexesToReport    INTEGER (1..maxNrofIndexesToReport)
OPTIONAL, -- Need R
     include BeamMeasurements    BOOLEAN,
     reportAddNeighMeas       ENUMERATED {setup}       OPTIONAL, -- Need R
     ...,
     [[
     measRSSI-ReportConfig-r16              OPTIONAL, -- Need R
     useT312-r16              BOOLEAN                          OPTIONAL, -- Need M
     includeCommonLocationInfo-r16 ENUMERATED {true}
              OPTIONAL, -- Need R
     includeBT-Meas-r16          BT-NameListConfig-r16                          OPTIONAL,
-- Need R
     include WLAN-Meas-r16       WLAN-NameListConfig-r16
              OPTIONAL, -- Need R
     includeSensor-Meas-r16       Sensor-NameListConfig-r16                  OPTIONAL
-- Need R
     ]],
                [[
                measReportQoE-r17                              MeasReportQoE-r17
                                    OPTIONAL -- Need R
                ]]
}
PeriodicalReportConfig ::= SEQUENCE {
     rsType              NR-RS-Type,
     reportInterval        ,
     reportAmount        ENUMERATED {r1, r2, r4, r8, r16, r32, r64, infinity},
     reportQuantityCell          MeasReportQuantity,
     maxReportCells          INTEGER (1..maxCellReport),
     reportQuantityRS-Indexes       MeasReportQuantity       OPTIONAL, -- Need R
     maxNrofRS-IndexesToReport       INTEGER (1..maxNrofIndexesToReport)
OPTIONAL, -- Need R
     includeBeamMeasurements       BOOLEAN,
     use WhiteCellList           BOOLEAN,
     ...,
     [[
     measRSSI-ReportConfig-r16       OPTIONAL, -- Need R
     includeCommonLocationInfo-r16 ENUMERATED {true}           OPTIONAL, --
Need R
     includeBT-Meas-r16       BT-NameListConfig-r16           OPTIONAL, -- Need R
     include WLAN-Meas-r16       WLAN-NameListConfig-r16           OPTIONAL, -- Need
R
     includeSensor-Meas-r16       Sensor-NameListConfig-r16       OPTIONAL, -- Need R
     ul-DelayValueConfig-r16       SetupRelease { UL-Delay ValueConfig-r16} OPTIONAL -
- Need R
     ]],
            [[
            measReportQoE-r17                                    MeasReportQoE-r17
                              OPTIONAL    -- Need R
            ]]
}
```

-continued

```
NR-RS-Type ::=               ENUMERATED {ssb, csi-rs}
MeasTriggerQuantity ::=              CHOICE {
   rsrp          RSRP-Range,
   rsrq          RSRQ-Range,
   sinr          SINR-Range
}
MeasTriggerQuantityQoE ::                          CHOICE {
               throughput
               Throughput-Range,
               appLayerRTT
               AppLayerRTT-Range,
               appLayetPacketDrop
               AppLayerPacketDrop-Range,
               appLayerJitter
               AppLayerJitter-Range,
               satisfactionCategory
               SatisfactionCategory-Range
}
MeasTriggerQuantityOffset ::=          CHOICE {
   rsrp INTEGER          (-30..30),
   rsrq INTEGER          (-30..30),
   sinr INTEGER          (-30..30)
}
MeasReportQuantity ::=             SEQUENCE {
   rsrp             BOOLEAN,
   rsrq             BOOLEAN,
   sinr             BOOLEAN
}
MeasRSSI-ReportConfig-r16 ::=          SEQUENCE {
   channelOccupancyThreshold-r16          INTEGER (1..ffs Value)          OPTIONAL, --
Need R
   ...
}
CLI-EventTriggerConfig-r16 ::=          SEQUENCE {
   eventId-r16             CHOICE {
      eventI1-r16             SEQUENCE {
         i1-Threshold-r16             MeasTriggerQuantityCLI-r16,
         reportOnLeave-r16             BOOLEAN,
         hysteresis-r16             Hysteresis,
         timeToTrigger-r16             TimeToTrigger
      },
   ...
   },
   reportInterval-r16             ReportInterval,
   reportAmount-r16             ENUMERATED {r1, r2, r4, r8, r16, r32, r64, infinity},
   maxReportCLI-r16             INTEGER (1..maxCLI-Report-r16),
   ...
}
CLI-PeriodicalReportConfig-r16 ::=      SEQUENCE {
   reportInterval-r16          ReportInterval,
   reportAmount-r16          ENUMERATED {r1, r2, r4, r8, r16, r32, r64, infinity},
   reportQuantityCLI-r16          MeasReportQuantityCLI-r16,
   maxReportCLI-r16          INTEGER (1..maxCLI-Report-r16),
   ...
}
MeasTriggerQuantityCLI-r16 ::=             CHOICE {
   srs-RSRP-r16             SRS-RSRP-Range-r16,
   cli-RSSI-r16             CLI-RSSI-Range-r16
}
MeasReportQuantityCLI-r16 ::=          ENUMERATED {srs-rsrp, cli-rssi}
-- TAG-REPORTCONFIGNR-STOP
-- ASN1STOP
```

Corresponding field descriptions for the report configuration NR IE may include:

| CondTriggerConfig field descriptions |
|---|
| a3-Offset<br>Offset value(s) to be used in NR conditional configuration triggering condition for cond event a3. The actual value is field value * 0.5 dB.<br>a5-Threshold1/a5-Threshold2<br>Threshold value associated to the selected trigger quantity (e.g., RSRP, RSRQ, SINR) per RS Type (e.g., SS/PBCH block, CSI-RS) to be used in NR conditional configuration triggering condition for event number a5. In the same eventA5, the network configures the same quantity for the MeasTriggerQuantity of the a5-Threshold1 and for the MeasTriggerQuantity of the a5-Threshold2.<br>condEventId<br>Choice of NR conditional reconfiguration event triggered criteria.<br>timeToTrigger<br>Time during which specific criteria for the event needs to be met in order to execute the conditional configuration evaluation. |

| ReportConfigNR field descriptions |
| --- |
| reportType<br>Type of the configured measurement report. In EN-DC, network does not configure report of type reportCGI using SRB3.<br>The condTriggerConfig is used for CHO or CPC configuration. |

| ReportCGIfield descriptions |
| --- |
| useAutonomousGaps<br>Indicates whether or not the UE is allowed to use autonomous gaps in acquiring system information from the NR neighbour cell. When the field is included, the UE applies the corresponding value for T321. |

| EventTriggerConfig field descriptions |
| --- |
| a3-Offset/a6-Offset<br>Offset value(s) to be used in NR measurement report triggering condition for event a3/a6. The actual value is field value * 0.5 dB.<br>aN-ThresholdM<br>Threshold value associated to the selected trigger quantity (e.g., RSRP, RSRQ, SINR) per RS Type (e.g., SS/PBCH block, CSI-RS) to be used in NR measurement report triggering condition for event number aN. If multiple thresholds are defined for event number aN, the thresholds are differentiated by M. The network configures aN-Threshold1 only for events A1, A2, A4, A5 and a5-Threshold2 only for event A5. In the same eventA5, the network configures the same quantity for the MeasTriggerQuantity of the a5-Threshold1 and for the MeasTriggerQuantity of the a5-Threshold2.<br>channelOccupancyThreshold<br>RSSI threshold which is used for channel occupancy evaluation.<br>eventId<br>Choice of NR event triggered reporting criteria.<br>maxNrofRS-IndexesToReport<br>Max number of RS indexes to include in the measurement report for A1-A6 and Q1 events.<br>maxReportCells<br>Max number of non-serving cells to include in the measurement report.<br>reportAddNeighMeas<br>Indicates that the UE shall include the best neighbour cells per serving frequency.<br>reportAmount<br>Number of measurement reports applicable for eventTriggered as well as for periodical report types.<br>reportOnLeave<br>Indicates whether or not the UE shall initiate the measurement reporting procedure when the leaving condition is met for a cell in cellsTriggeredList, as specified in 5.5.4.1.<br>reportQuantityCell<br>The cell measurement quantities to be included in the measurement report.<br>reportQuantityRS-Indexes<br>Indicates which measurement information per RS index the UE shall include in the measurement report.<br>timeToTrigger<br>Time during which specific criteria for the event needs to be met in order to trigger a measurement report.<br>ul-DelayValueConfig<br>If the field is present, the UE shall perform the actual PDCP queueing delay measurement per DRB as specified in TS 38.314 [53] and the UE shall ignore the fields reportQuantityCell and maxReportCells. The applicable values for the corresponding reportInterval are (one of the) {ms120, ms240, ms480, ms640, ms1024, ms2048, ms5120, ms10240, ms20480, ms40960, min1, min6, min12, min30}. The reportInterval indicates the periodicity for reporting of UL PDCP Delay per DRB measurement as specified in TS 38.314 [53].<br>useT312 |

-continued

| EventTriggerConfig field descriptions |
| --- |
| If value TRUE is configured, the UE shall use the timer T312 with the value t312 as specified in the corresponding measObjectNR. If value FALSE is configured, the timer T312 is considered as disabled. Network configures value TRUE only if reportType is set to eventTriggered.<br>useWhiteCellList<br>Indicates whether only the cells included in the white-list of the associated measObject are applicable as specified in 5.5.4.1. |

| CLI-EventTriggerConfig field descriptions |
| --- |
| i1-Threshold<br>Threshold value associated to the selected trigger quantity (e.g., SRS-RSRP, CLI-RSSI) to be used in CLI measurement report triggering condition for event i1.<br>eventId<br>Choice of CLI event triggered reporting criteria.<br>maxReportCLI<br>Max number of CLI measurement resource to include in the measurement report.<br>reportAmount<br>Number of measurement reports.<br>reportOnLeave<br>Indicates whether or not the UE shall initiate the measurement reporting procedure when the leaving condition is met for a CLI measurement resource in srsTriggeredList or rssiTriggeredList, as specified in 5.5.4.1.<br>timeToTrigger<br>Time during which specific criteria for the event needs to be met in order to trigger a measurement report. |

| CLI-PeriodicalReportConfig field descriptions |
| --- |
| maxReportCLI<br>Max number of CLI measurement resource to include in the measurement report.<br>reportAmount<br>Number of measurement reports.<br>reportQuantityCLI<br>The CLI measurement quantities to be included in the measurement report. |

| PeriodicalReportConfig field descriptions |
| --- |
| maxNrofRS-IndexesToReport<br>Max number of RS indexes to include in the measurement report.<br>maxReportCells<br>Max number of non-serving cells to include in the measurement report.<br>reportAmount<br>Number of measurement reports applicable for eventTriggered as well as for periodical report types<br>reportQuantityCell<br>The cell measurement quantities to be included in the measurement report.<br>reportQuantityRS-Indexes<br>Indicates which measurement information per RS index the UE shall include in the measurement report.<br>useWhiteCellList<br>Indicates whether only the cells included in the white-list of the associated measObject are applicable as specified in 5.5.4.1. |

| ReportSFTD-NR field descriptions |
| --- |
| cellForWhichToReportSFTD<br>Indicates the target NR neighbour cells for SFTD measurement between PCell and NR neighbour cells. |
| drx-SFTD-NeighMeas<br>Indicates that the UE shall use available idle periods (i.e. DRX off periods) for the SFTD measurement in NR standalone. The network only includes drx-SFTD-NeighMeas field when reprtSFTD-NeighMeas is set to true. |
| reportSFTD-Meas<br>Indicates whether UE is required to perform SFTD measurement between PCell and NR PSCell in NR-DC. |
| reportSFTD-NeighMeas<br>Indicates whether UE is required to perform SFTD measurement between PCell and NR neighbour cells in NR standalone. The network does not include this field if reportSFTD-Meas is set to true. |
| reportRSRP<br>Indicates whether UE is required to include RSRP result of NR PSCell in SFTD measurement result, derived based on SSB. If it is set to true, the network should ensure that ssb-ConfigMobility is included in the measurement object for NR PSCell. |

Accordingly, UE 205 may receive the report configuration NR IE and configure the measurement report 225 accordingly. Again, the measurement report 225 may include RRM variables for target base stations of UE 205, which may include base station 215 and/or base station 220.

In this handover example, base station 210 may transmit a resource status request to the target base station(s) (e.g., to base station 215 and/or base station 220) indicated in the measurement report 225. The resource status request may carry or otherwise convey an indication of the QoE constraint of UE 205 (e.g., the requested QoE level of the UE) and the set of QoE variables of UE 205. In some aspects, the resource status request may include a handover preparation information message. The handover preparation information message is used to transfer the NR RRC information used by the target gNB (e.g., base station 215 and/or base station 220) during handover preparation or UE context retrieval, e.g., in case of resume or re-establishment, including UE capability information (e.g., UE 205 capability information). The handover preparation information message is also used for transferring the information between the central unit (CU) and distributed unit(s) (DU)(s). The direction of the handover preparation message is from the source gNB/source RAN (e.g., base station 210) to target gNB (e.g., target base station 215 and/or base station 220) or CU to DU. An example of the handover preparation information message may include:

```
-- ASNISTART
-- TAG-HANDOVER-PREPARATION-INFORMATION-START
/* Ommited
AS-Context ::=          SEQUENCE {
   reestablishmentInfo                    OPTIONAL,
   configRestrictInfo        ConfigRestrictInfoSCG            OPTIONAL,
   ...,
   [[ ran-NotificationAreaInfo            OPTIONAL
   ]],
   [[ ueAssistanceInformation   OCTET STRING (CONTAINING
UEAssistanceInformation) OPTIONAL -- Cond HO2
   ]],
   [[
   selectedBandCombinationSN       BandCombinationInfoSN          OPTIONAL
   ]],
   [[
   configRestrictInfoDAPS-r16          OPTIONAL,
   sidelinkUEInformationNR-r16         OCTET STRING          OPTIONAL,
   sidelinkUEInformationEUTRA-r16          OCTET STRING          OPTIONAL,
   ueAssistanceInformationEUTRA-r16          OCTET STRING          OPTIONAL
   ]],
   [[
            measReportQoE-r17                   OCTET STRING
OPTIONAL
            ]]
}
/* Ommited
```

The target base station(s) may each determine whether their respective capability to satisfy the QoE constraint of UE 205 and, if so, transmits a resource status response to the serving base station (e.g., to base station 210) indicating the ability to support the QoE constraint of UE 205. In some aspects, each resource status response may indicate sending target base station capability to satisfy the required UE QoE (e.g., indicate the QoE level that the target base station can support). The serving base station (e.g., base station 210) may select the target base station(s) to perform the handover procedure for UE 205 based on the resource status response(s) received from the target base station(s), e.g., based on the QoE variables/RRM variables of UE 205 and the each target base station capability of satisfying the UE QoE constraint, where the target base station is capable of providing the best QoE level to UE 205. Accordingly, the serving base station may perform a handover request/response exchange with the target base station to initiate a handover procedure of UE 205 to the target base station to establish the new communication link. Accordingly, the described techniques permit the QoE variables measured at the application layer of UE 205 for the RAN optimizations to be provided in a format readable by the RAN, which may utilize the QoE variables in conjunction with the RRM variables for communication link optimization and/or mobility.

Figure 3:
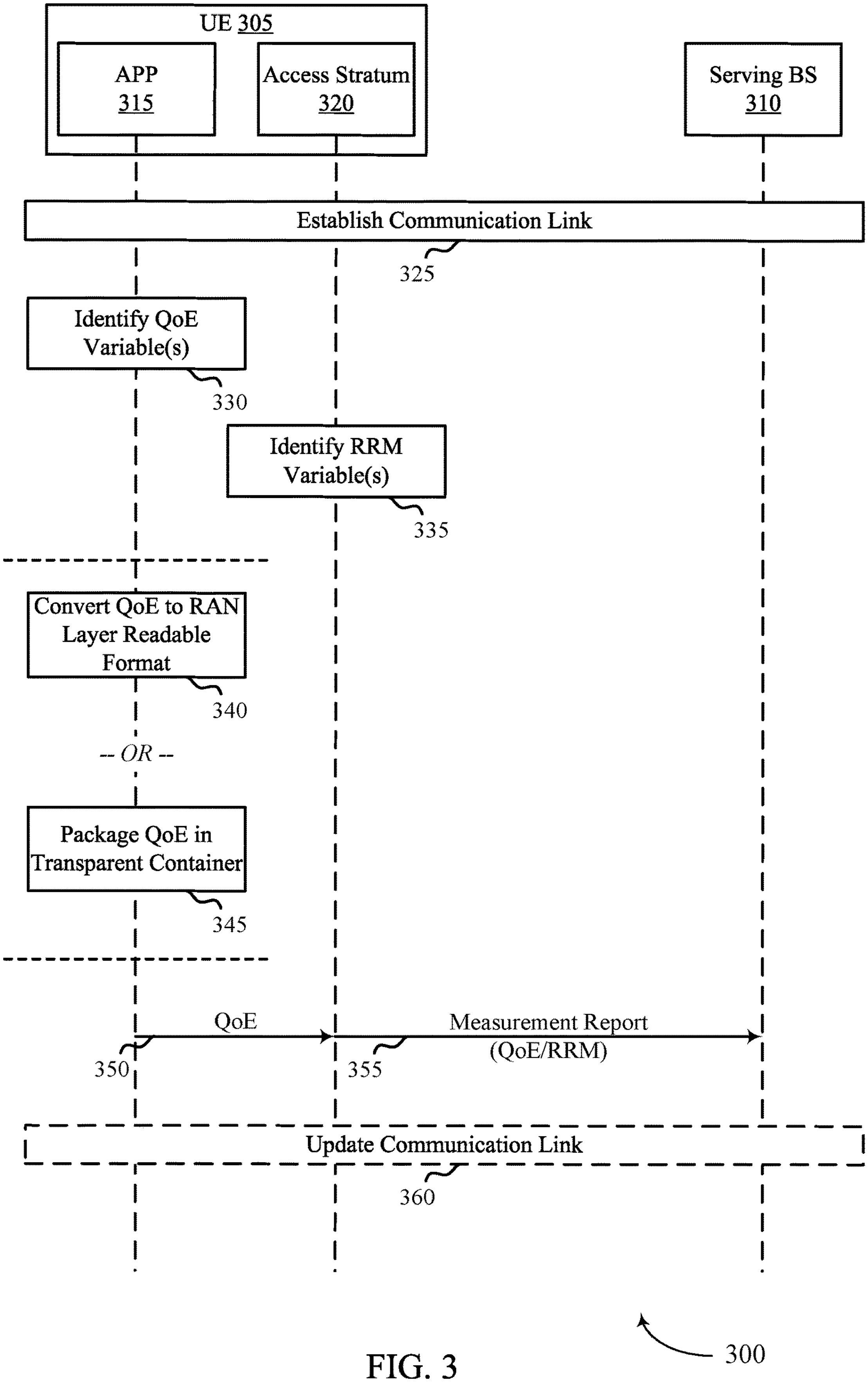
FIG. 3 illustrates an example of a process that supports QoE measurements for mobility robustness in accordance with aspects of the present disclosure.

FIG. 3 illustrates an example of a process 300 that supports QoE measurements for mobility robustness in accordance with aspects of the present disclosure. In some examples, process 300 may be implemented by or may implement aspects of wireless communications systems 100 and/or 200. Aspects of process 300 may be implemented by UE 305 and/or serving base station 310, which may be examples of corresponding devices described herein. UE 305 may include an application layer 315 and an access stratum 320, which may also be examples of corresponding devices described herein.

At 325, UE 305 and serving base station 310 may establish a communication link. The communication link may be established during a procedure, such as an initial access procedure, a cell reselection procedure, or the like. The communication link may be configured with various time, frequency, spatial, code, etc., resources used for performing communications between UE 305 and serving base station 310.

At 330, UE 305 may measure a set of QoE variables at the application layer 315. The set of QoE variables may be used for the optimization of the communication link between UE 305 and serving base station 310. Examples of the QoE variables may include, but are not limited to, a cell identifier of serving base station 310, a service type for service be communicated over the communication link (e.g., type of service(s) being utilized by application(s) operating at the application layer 315), an average application layer throughput rate, an average application layer RTT measurement, an average application layer jitter, an average application layer to operate, and/or failure rates for the application layer throughput rate, RTT measurement, jitter rate, packet drop rate, etc. For example, application layer 315 may monitor such variables for instantaneous and/or averaged measurements to satisfy a QoE constraint of UE 305 (e.g., a QoE need or requested QoE usage of UE 305).

At 335, UE 305 may measure a set of RRM variables at the access stratum 320. The set of RRM variables identified at the access stratum 320 may be associated with the communication link between UE 305 and serving base station 310. Additionally or alternatively, the set of RRM variables identified at the access stratum 320 may be associated with communication links between UE 305 and a set of one or more target base stations available for UE 305 to potentially connect to in order to establish a new communication link should the communication link between UE 305 and serving base station 310 fall below an acceptable performance threshold. Example RRM variables in the set of RRM variables may include, but are not limited to, RSRP, RSSI, SINR, CQI, a throughput rate observed at the access stratum 320, an RTT observed at the access stratum 320, a jitter rate observed at the access stratum 320, a packet drop rate observed at the access stratum 320, or the like.

In some aspects, corresponding variables between the set of QoE variables and the set of RRM variables may have different values. For example, an instantaneous and/or averaged throughput rate observed at the application layer 315 may be different than the instantaneous and/or averaged throughput rate observed at the access stratum 320. As another example, an instantaneous and/or averaged RTT measurement, jitter rate, packet drop rate, or the like, observed at the application layer 315 may be different than the instantaneous and/or averaged RTT measurement, jitter rate, packet drop rate, or the like, observed at the access stratum 320.

Broadly, process 300 includes techniques for conversion of the QoE measurements (e.g., the set of QoE variables) into a format readable by the access stratum 320 (e.g., into a multi-layer readable format). One option for such conversion is illustrated at 340 where the application layer 315 converts the QoE variables in the set of QoE variables into a RAN readable format. That is, UE 305 may convert the RAN readable QoE measurements.

Generally, conversion of the QoE variables in the set of QoE variables into a RAN readable format may include the actual QoE measurements of the RAN aware QoE variables into corresponding RRM measurement report (e.g., include a QoE throughput rate into RRM report). In some examples, conversion of the QoE variables in the set of QoE variables into the RAN readable format may include converting the actual QoE measurements of the QoE variables into information indicative of the measurement(s) (e.g., convert a service type QoE variable into a QoE constraint applicable to the various sub layers of the access stratum 320).

In some examples, conversion of the QoE measurements of the QoE variables into a RAN readable format may include conversion of the QoE variables and/or information indicative of the QoE variables, into a format readable by particular sublayers of the access stratum 320. For example, some QoE variables measured at the application layer 315 may be converted into a format readable by the physical sublayer, an RLC sublayer, an RRC sublayer, or the like.

UE 305 may maintain (e.g., be configured with which QoE measurements/variables are to be reported to serving base station 310) QoE variables to obtain, such as cell ID, service type, average application layer QoE performance, the percentage of time the QoE metrics (e.g., QoE constraints) are violated, or the like. When the QoE application client (e.g., a QoE management client (QMC)) implemented at, or otherwise associated with, application layer 315 performs QoE measurements, the QoE application client notifies these parameters to access stratum 320 for reporting to serving base station 310. For example, application layer 315 of UE 305 may transfer the set of QoE variables to the access stratum 320 in a format readable by the access stratum 320. In this option, the access stratum 320 may transmit the measurement report (discussed below) to serving base station 310 that indicates the set of QoE variables and the set of RRM variables and/or information indicative of/or otherwise associated with the set of QoE variables and the set of RRM variables.

Another option for such conversion is illustrated at 345 where the application layer 315 packages the QoE variables in the set of QoE variables into a transparent container for transmission to serving base station 310. For example, UE 305 may send the QoE measurements in an XML format to serving base station 310 in the measurement report, and serving base station 310 converts the QoE measurements into a RAN readable format that can be utilized by serving base station 310 for RAN optimizations. Thus, instead of UE 305 maintaining the QoE variables, UE 305 may generate and store a summary of the QoE measurements in a transparent container for RAN optimization. Accordingly, the application layer 315 of UE 305 may generate a summary of the set of QoE variables to create or otherwise obtain a summary QoE report.

In some aspects, either option for such conversion may be combined. For example, the application layer 315 of UE 305 may convert the set of QoE variables into a format readable by the access stratum 320 and also generate the summary QoE report. For example, UE 305 may provide the set of QoE variables to the access stratum 320 in a RAN readable format and indicate the summary QoE report in the measurement report to serving base station 310.

Accordingly, at 350 the application layer 315 of the UE 305 may provide an indication of the set of QoE variables to the access stratum 320. The indication of the set of QoE variables may be provided in a format readable by the access stratum 320 and/or may be provided in a summary QoE report. At 355, the access stratum 320 may transmit or otherwise provide the measurement report to serving base station 310 indicating information associated with the set of QoE variables and the RRM variables in a multi-layer readable format. That is, the measurement report may carry or otherwise indicate the set of QoE variables and/or the summary QoE report in addition to the set of RRM variables.

At 360, UE 305 and the serving base station 310 may adjust or otherwise modify the communication link between UE 305 and serving base station 310. For example, this may include adjusting various communication parameters configured for the communication link (e.g., such as MCS, bandwidth, transmit power level(s), latency adjustments, reliability adjustments, etc., to provide link optimizations). In some aspects, this may include adjusting various handover procedure parameters (e.g., adjusting the levels of QoE and/or RRM variables that trigger a handover procedure of UE 305 to a target base station to establish a new communication link).

In some aspects, this adjusting may include performing the handover procedure of UE 305 from serving base station 310 to establish a new communication link with a target base station. For example, UE 305 and/or base station 310 may determine that the set of QoE variables fail to satisfy a threshold (e.g., fail to satisfy a QoE constraint). For example, an instantaneous and/or averaged throughput rate QoE variable may fail to satisfy a corresponding instantaneous and/or averaged throughput rate QoE constraint. In this situation, the measurement report may be transmitted in response to the determination that the set of QoE variable(s) failed to satisfy the threshold. Accordingly, serving base station 310 may transmit (and UE 305 may receive) a connection reconfiguration message in response to the measurement report that identifies the target base station to perform the handover procedure to. Accordingly, UE 305 may perform the handover procedure with the target base station to establish a new communication link.

Figure 4:
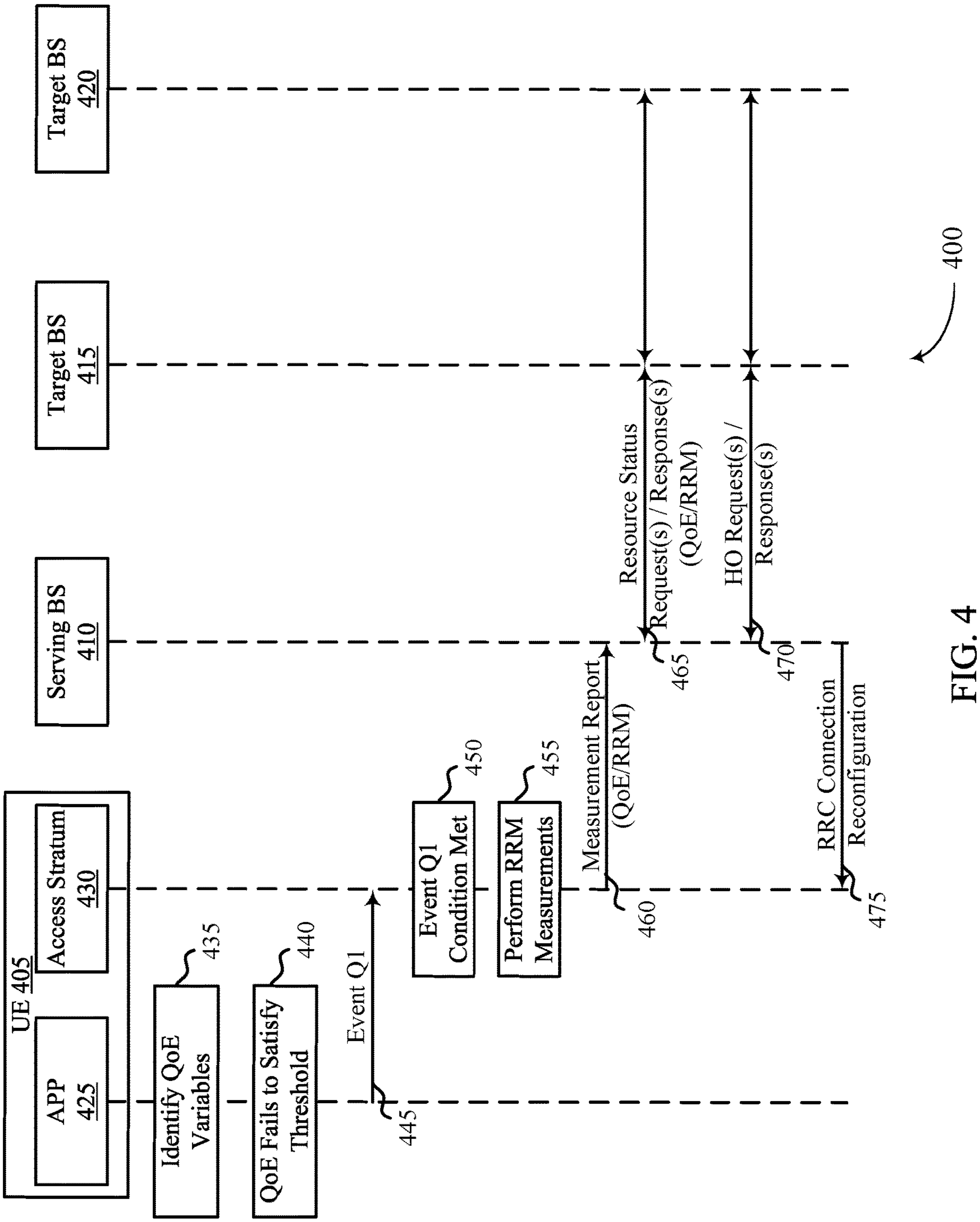
FIG. 4 illustrates an example of a process that supports QoE measurements for mobility robustness in accordance with aspects of the present disclosure.

FIG. 4 illustrates an example of a process 400 that supports QoE measurements for mobility robustness in accordance with aspects of the present disclosure. In some examples, process 400 may be implemented by or may implement aspects of wireless communications systems 100 and/or 200 and/or process 300. Aspects of process 400 may be implemented by UE 405, serving base station 410, target base station 415, and/or target base station 420, which may be examples of corresponding devices described herein.

UE 405 may include an application layer 425 and an access stratum 430, which may also be examples of corresponding devices described herein. Target base station 415 and/or target base station 420 may be examples of a set of one or more target base stations, with two target base stations being shown by way of example only.

Generally, UE 405 and serving base 410 may establish a communication link. The communication link may be established during an initial access procedure, a cell reselection procedure, or the like. The communication link may be configured with various time, frequency, spatial, code, etc., resources used for performing communications between UE 405 and serving base station 410.

At 435, UE 405 may measure a set of QoE variables at the application layer 425. The set of QoE variables may be associated with the communication link between UE 405 and serving base station 410. Examples of the QoE variables may include, but are not limited to, a cell identifier of serving base station 410, a service type for service be communicated over the communication link (e.g., type of service(s) being utilized by application(s) operating at application layer 425), an average application layer throughput rate, an average application layer RTT measurement, an average application layer jitter, an average application layer to operate, and/or failure rates for the application layer throughput rate, RTT measurement, jitter rate, packet drop rate, etc. For example, application layer 425 may monitor such variables for instantaneous and/or averaged measurements to satisfy a QoE constraint of UE 405 (e.g., a QoE need or requested QoE service of UE 405).

In some aspects, UE 405 may also measure a set of RRM variables at the access stratum of UE 405. The set of RRM variables identified at the access stratum may be associated with the communication link between UE 405 and serving base station 410. Additionally or alternatively, the set of RRM variables measured at the access stratum may be associated with communication links between UE 405 and a set of one or more target base stations available for UE 405 to potentially connect with in order to establish a new communication link should the communication link between UE 405 and serving base station 410 fall below an acceptable performance threshold, such as target base station 415 and/or target base station 420. Example RRM variables in the set of RRM variables may include, but are not limited to, RSRP, RSSI, SINR, CQI, a throughput rate observed at the access stratum, an RTT observed at the access stratum, a jitter rate observed at the access stratum, a packet drop rate observed at the access stratum, or the like.

In some aspects, corresponding variables between the set of QoE variables and the set of RRM variables may have different values. For example, an instantaneous and/or averaged throughput rate observed at the application layer 425 may be different than the instantaneous and/or averaged throughput rate observed at the RAN. As another example, an instantaneous and/or averaged RTT measurement, jitter rate, packet drop rate, or the like, observed at the application layer 425 may be different than the instantaneous and/or averaged RTT measurement, jitter rate, packet drop rate, or the like, observed at the RAN. As discussed above, in some examples the application layer 425 may convert to the set of QoE variables into a format readable by the RAN to link optimizations and mobility robustness.

Broadly, process 400 includes techniques for utilizing the converted QoE variables for link optimizations and mobility robustness. For example, serving base station 410 may configure UE 405 to measure and report the set of QoE variables for mobility purposes. Serving base station 410 may transmit a measurement request to UE 405 that indicates or otherwise identifies the QoE variables to include in the set of QoE variables, with the identified QoE variables being measured and reported by UE 405 for link management and mobility. The QoE measurements may be utilized for the selection of target base stations, for admission control of the target base stations, as the handover trigger in a conditional handover (CHO) scenario, or the like.

As discussed above, in some examples this may include a Q1 event trigger being defined to initiate a handover procedure in order to meet or otherwise achieve a desirable QoE (e.g., to satisfy a QoE constraint). The Q1 event trigger may be configured by serving base station 410 to UE 405 using RRC signaling (e.g., conveying a ReportConfigNR IE). Broadly, the Q1 event trigger may be based on one or more QoE variable(s) becoming worse than a threshold (e.g., failing to satisfy corresponding QoE constraint). Generally, this may include UE 405 considering the entering and/or leaving conditions for the Q1 event being satisfied, and may consider the NR serving cell corresponding to the associated measObjectNR IE associated with the Q1 event. For example, UE 405 may compare a measurement result of a QoE variable (e.g., Ms(x)) minus a hysteresis parameter (Hys(x)) to a threshold (e.g., a corresponding QoE constraint, such as a requested QoE service level). UE 405 may determine that the Q1 event has been triggered when one, some, or all of the QoE variables (e.g., (x)) in the set of QoE variables fall below the threshold.

Accordingly at 440, UE 405 may (e.g., at application layer 425) determine that one or more QoE variables failed to satisfy a threshold (e.g., a corresponding QoE constraint). This may be for one, some, or all of the QoE variables in the set of QoE variables. Based on this determination that the QoE variable(s) have failed to satisfy the threshold, UE 405 may provide a signal to the access stratum 430 indicating that the Q1 triggering event has occurred at 445. In some aspects, this indication may include the QoE measurement report (e.g., may include an indication of the set of QoE variables and/or the summary QoE report and/or generic QoE score).

Accordingly and at 450, the access stratum 430 may determine that the Q1 triggering event condition has been met. For example, the access stratum 430 may compare the set of QoE variable(s) indicated in the QoE measurement report to the corresponding thresholds, and determine the Q1 triggering event for the handover procedure has occurred based on the comparison.

In response and at 455, the access stratum 430 of UE 405 may transmit a measurement report to serving base station 410. That is, the access stratum 430 may determine that the Q1 triggering event has occurred based on an indication from the application layer 425. Accordingly, the application layer 425 and/or the access stratum of UE 405 may configure and transmit the measurement report to serving base station 410. In some aspects, the measurement report may carry or otherwise convey an indication of the set of QoE variables and the set of RRM variables. Accordingly, the QoE report (e.g., the measurement report) may be used by the serving base station 410 for a handover decision.

Accordingly, serving base station 410 may determine that the Q1 triggering event occurred for UE 405, and therefore initiate a handover procedure (e.g., a CHO) of UE 405 to a target base station in the set of one or more target base stations (e.g., to target base station 415 or target base station 420). For example, serving base station 410 may determine that the set of QoE variables failed to satisfy the threshold (e.g., the QoE constraint or QoE need of UE 405). For example, the measurement report received by serving base station 410 may carry or otherwise convey RRM variables for target base stations in the set of one or more target base stations. Serving base station 410 may identify the target base stations of UE 405 based on the measurement report.

In response and at 465, this may include serving base station 410 transmitting a resource status request to the target base station(s) in the set of one or more target base stations. For example, serving base station 410 may transmit a resource status request to target base station 415 and a resource status request to target base station 420. In some aspects, the resource status request message may carry or otherwise convey an indication of the QoE constraint of UE 405 (e.g., the threshold) in addition to the set of QoE variables and the set of RRM variables of UE 405.

One or more of the target base stations in the set of target base stations may respond to the resource status request with a corresponding resource status response. That is, serving base station 410 may receive multiple resource status responses from at least some of the target base stations of the set of one or more target base stations. Generally, each resource status response may carry or otherwise convey an indication whether the corresponding target base station can satisfy the UE QoE constraints. That is, target base station 415 and/or target base station 420 may receive the resource status request from serving base station 410 indicating the QoE constraint (e.g., the threshold associated with the QoE needs of UE 405) and the set of QoE and RRM variables. Each target base station may determine its own capability to satisfy the UE QoE constraints based on its own traffic load, UE density, network interference levels, collision levels, or the like. Accordingly, each target base station may determine the level of QoE service that it can provide to UE 405 based on the QoE constraint and the reported QoE/RRM variables.

As discussed herein, in some situations a good radio quality (e.g., optimal RRM variables) may not necessarily translate to a good user experience (e.g., poor QoE variables). Accordingly, each target base station may consider the RRM variables corresponding to the link between that target base station and UE 405 in addition to the QoE constraint and set of QoE variables of UE 405. If a target base station determines that it cannot satisfy the QoE constraint of UE 405 based on the resource status request, it may simply ignore the request and not respond to serving base station 410 or may respond to serving base station 410 with a resource status response indicating that it is unable to support establishing a new communication link with UE 405.

In some aspects, this may include the target base stations determining whether the source cell signal quality (e.g., the RRM variable(s) corresponding to serving base station 410) is comparable with the signal quality (e.g., the RRM capability) of the target base station, but that the QoE capability of a target base station is still poor. Traditionally, the target base station by determine that it is a suitable candidate for the handover procedure based on the RRM capability of a target base station. However, according to the described techniques the target base station may determine that, since its QoE capability is poor (e.g., may not meet, or may fail to satisfy the corresponding QoE constraint/threshold of UE 405), it cannot provide a suitable QoE to UE 405. For example, the target base station may use the QoE report indicated in the resource status request to determine various key performance indicators of UE 405 (e.g., delay, bandwidth, etc.) impacted by the QoE variables. Based on its current load and configuration, and the RRM variables for the link between the target base station and UE 405 (e.g., as indicated in the resource status request and/or handover request), the target base station may determine whether it can provide a better and/or satisfactory QoE to UE 405. Accordingly, the target base station may determine that it is, or is not, a suitable target base station for UE 405.

If the target base station determines that it can satisfy the QoE constraint of UE 405 based on the resource status request, it may respond with a resource status response indicating that is able to support establishing a new communication link with UE 405. In some aspects, each resource status response may indicate the target base station capability in satisfying UE QoE constraints by sending the response, as well as identifying information for that target base station.

Accordingly, serving base station 410 may identify the target base station(s) providing a resource status response. Serving base station 410 may identify or otherwise select the target base station to perform the handover procedure of UE 405 to based on the resource status response(s). For example, serving base station 410 may identify the target base station most suitable for providing QoE and RRM services to UE 405, e.g., based on the target base stations capability in satisfying the UE QoE constraints indicated in the resource status response. Serving base station 410 may select the target base station corresponding to the lowest load level, the best RRM variables, capable of offering the highest QoE service, or the like, based on the resource status responses. Once serving base station 410 selects a target base station to perform a handover procedure to, a handover request/response exchange may occur between the serving base station 410 in the selected target base station (e.g., target base station 415 and/or target base station 420).

Accordingly and at 470, serving base station 410 may transmit or otherwise convey a handover request to the selected target base station(s). The handover request may carry or otherwise convey an indication that the handover procedure of UE 405 is to be performed to the target base station. As discussed, the handover request may be transmitted to target base station 415 and/or target base station 420, depending on the resource status response received from each target base station and used to select the target base station to perform the handover procedure with. The selected target base station may provide a handover response indicating support for performing the handover procedure of UE 405 to establish a new communication link with the target base station. In some aspects, this may include serving base station 410 transmitting handover request to multiple target base stations, such as those offering the highest level of RRM and/or QoE services to UE 405. One or more of the target base stations receiving the handover request may respond with a corresponding handover response if they are capable and able to perform the handover procedure with UE 405. Serving base station 410 may select the target base station to perform the handover procedure with based on the handover response(s), e.g., in addition to, or rather than, selecting the target base station based on the resource status responses.

Accordingly, at 475 serving base station 410 may transmit or otherwise convey a connection reconfiguration message (e.g., an RRCConnectionReconfiguration message) to UE 405 that identifies the target base station to perform the handover procedure with to establish a new communication link. For example, the connection reconfiguration message may identify target base station 415 or target base station 420 that UE 405 is to perform a handover procedure with to establish the new communication link. Accordingly, UE 405 may perform a handover procedure with the target base station identified in the connection reconfiguration message to establish the new communication link in response to the QoE variable(s) failing to satisfy the corresponding threshold (e.g., QoE constraint).

Figure 5:
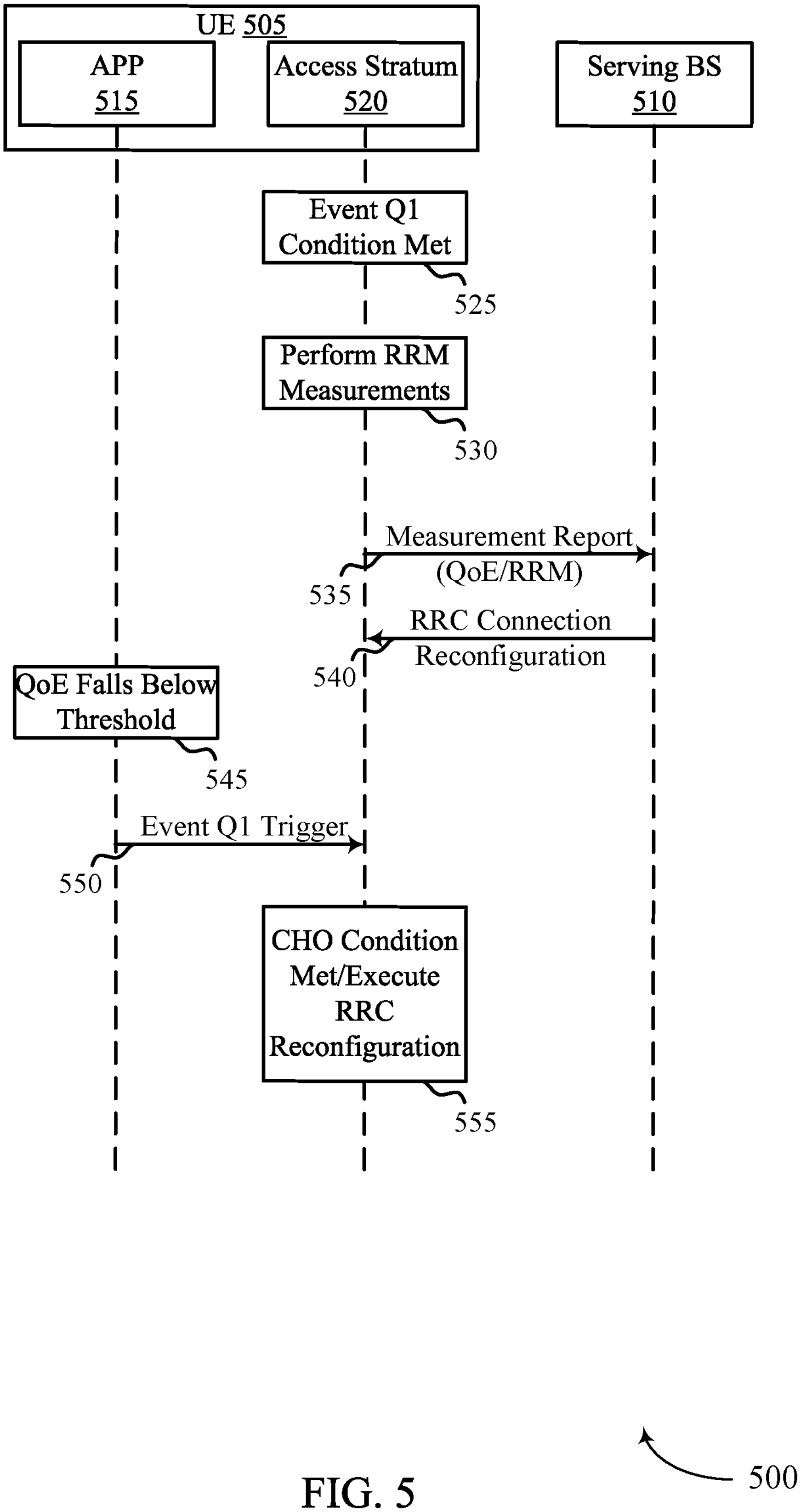
FIG. 5 illustrates an example of a process that supports QoE measurements for mobility robustness in accordance with aspects of the present disclosure.

FIG. 5 illustrates an example of a process 500 that supports QoE measurements for mobility robustness in accordance with aspects of the present disclosure. In some examples, process 500 may be implemented by or may implement aspects of wireless communications systems 100 and/or 200 and/or processes 300 and/or 400. Aspects of process 500 may be implemented by UE 505 and/or serving base station 510, which may be examples of corresponding devices described herein.

UE 505 may include an application layer 515 and an access stratum 520, which may also be examples of corresponding devices described herein. That is, the access stratum 520 may be implemented at the application layer 515 and/or may be in communication with, or otherwise associated with, the application layer 515.

Generally, UE 505 and serving base station 510 may establish a communication link. The communication link may be established during an initial access procedure, a cell reselection procedure, or the like. The communication link may be configured with various time, frequency, spatial, code, etc., resources used for performing communications between UE 505 and serving base station 510.

UE 505 may measure a set of QoE variables at the application layer 515. The set of QoE variables may be associated the performance of a service type over the communication link between UE 505 and serving base station 510. UE 505 may also identify a set of RRM variables at the access stratum of UE 505. The set of RRM variables measured at the access stratum may be associated with the communication link between UE 505 and serving base station 510. Additionally or alternatively, the set of RRM variables identified at the access stratum may be associated with communication links between UE 505 and a set of one or more neighboring base stations available for UE 505 to potentially connect to in order to establish a new communication link should the communication link between UE 505 and serving base station 510 fall below an acceptable performance threshold.

Broadly, process 500 includes techniques for utilizing the converted QoE variables for link optimizations and mobility robustness. For example, serving base station 510 may configure UE 505 to measure and report the set of QoE variables for mobility purposes. Serving base station 510 may transmit a measurement request to UE 505 that indicates or otherwise identifies the QoE variables to include in the set of QoE variables, with the identified QoE variables being measured and reported by UE 505 for link management and mobility. The QoE measurements may be utilized for the selection of target base stations, for admission control of the target base stations, as the handover trigger in a CHO scenario, or the like.

As discussed above, in some examples this may include a Q1 event trigger being defined to initiate a handover procedure in order to meet or otherwise achieve a desirable QoE (e.g., to satisfy a QoE constraint). The Q1 event trigger may be configured by serving base station 510 to UE 505 using RRC signaling (e.g., conveying a ReportConfigNR IE) or within the application layer container.

For example, UE 505 may (e.g., at application layer 515) determine that one or more QoE variables failed to satisfy a threshold (e.g., a corresponding QoE constraint). This may be for one, some, or all of the QoE variables in the set of QoE variables. Based on this determination that the QoE variable(s) have failed to satisfy the threshold, UE 505 may provide a signal to the access stratum 520 indicating that the Q1 triggering event has occurred. In some aspects, this indication may include the legacy QoE measurement report, or RAN aware QoE measurement including a subset of QoE measurements relevant for RAN optimization or generic QoE score (e.g., may include an indication of the set of QoE variables and/or the summary QoE report).

Accordingly and at 525, the access stratum 520 may determine that the Q1 triggering event condition has been met. For example, the access stratum 520 may compare the set of QoE variable(s) indicated in the QoE measurement report to the corresponding thresholds, and determine the Q1 triggering event for the handover procedure has occurred based on the comparison.

At 530, the access stratum 520 may perform RRM measurements to identify or otherwise determine that RRM variables for the communication link between UE 505 and serving base station 510 and/or for communication link(s)

between UE 505 and neighboring target base station(s). The RRM variables may indicate that the communication link between UE 505 and serving base station 510 satisfy or may not satisfy a performance threshold. The RRM variables may indicate that the communication link(s) between UE 505 and the neighboring target base station(s) satisfy or may not satisfy a performance threshold. The RRM variables for any communication links may be used in conjunction with the QoE variables to determine whether the handover procedure is to be performed. That is, rather than consider only the RRM measurements when making link optimization and/or handover decisions, the set of QoE variables provided by application layer 515 are also considered when making such decision. In some examples, this may include the access stratum 520 deciding to perform a handover procedure based on QoE variables failing to satisfy performance thresholds, even in the situation where some or all of the RRM variables for the communication link(s) satisfy corresponding performance thresholds. In response and at 535, the access stratum 520 of UE 505 may transmit a measurement report to serving base station 510. That is, the access stratum 520 may determine that the Q1 triggering event has occurred, and therefore provide an indication to the application layer 515 and/or the access stratum of UE 505 that the Q1 triggering event has occurred. Accordingly, the application layer 515 and/or the access stratum of UE 505 may configure and transmit the measurement report to serving base station 510. In some aspects, the measurement report may carry or otherwise convey an indication of the set of QoE variables and the set of RRM variables. Accordingly, the QoE report (e.g., the measurement report) may be used by the serving base station 410 for a handover decision.

Accordingly, serving base station 510 may determine that the Q1 triggering event occurred for UE 505, and therefore initiate a handover procedure (e.g., a CHO) of UE 505 to a target base station in the set of one or more target base stations. For example, serving base station 510 may perform a resource request/response exchange with the target base stations in the set of target base stations, which may result with a handover request/response exchange between serving base station 510 and target base station(s) having a capability satisfying the QoE constraint of UE 505, e.g., on the QoE constraint and set of QoE variables indicated to the target base station(s) in the resource and/or handover requests.

Accordingly, at 540 serving base station 510 may transmit or otherwise convey a connection reconfiguration message (e.g., an RRCConnectionReconfiguration message) to UE 505 that identifies the target base station to perform the handover procedure with to establish a new communication link. For example, the connection reconfiguration message may identify the specific target base station (e.g., indicate a cell identifier of the target base station) that UE 505 is to perform a handover procedure with to establish the new communication link. However, as the handover procedure is conditional to this point, aspects of the described techniques permit UE 505 to make the handover decision based on the connection reconfiguration message. For example, at 545 the application layer 515 may continue to report that the QoE variable(s) in the set of variables fail to satisfy the threshold. For example, the application layer 515 may determine that the QoE variable(s) continue to worsen, remain the same, or has improved since initially indicating the Q1 triggering event has occurred. If the application layer 515 determines that the QoE variable(s) have improved and are approaching or within a threshold of satisfying the threshold, application layer 515 may determine that the Q1 triggering event is no longer occurring. Conversely, if the application layer 515 determines that the QoE variable(s) are the same and/or have worsened, application layer 515 may determine that the Q1 triggering event is still occurring. In this situation, at 550 application layer 515 may transmit or otherwise provide an indication that the Q1 triggering event has occurred to access stratum 520.

At 555, the access stratum 520 may determine that, based on the indication of the Q1 triggering event occurring, that the handover procedure is warranted. Accordingly, UE 505 may execute the connection reconfiguration message received from serving base station 510 to begin performance of the handover procedure to establish a new communication link. Accordingly, UE 505 may perform a handover procedure with the target base station identified in the connection reconfiguration message to establish the new communication link in response to the QoE variable(s) continuing to fail to satisfy the corresponding threshold (e.g., QoE constraint).

Figure 6:
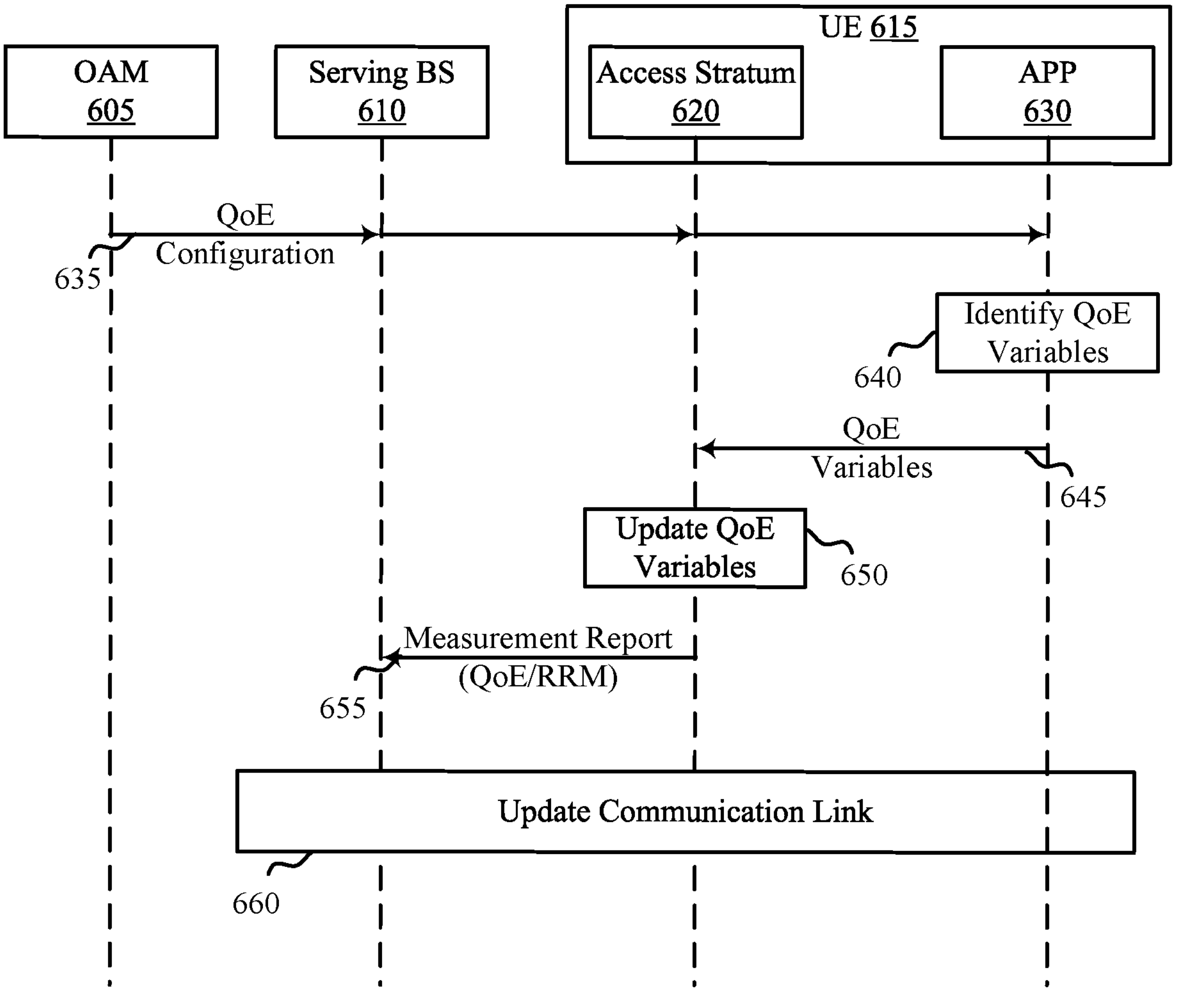
FIG. 6 illustrates an example of a process that supports QoE measurements for mobility robustness in accordance with aspects of the present disclosure.

FIG. 6 illustrates an example of a process 600 that supports quality of experience measurements for mobility robustness in accordance with aspects of the present disclosure. In some examples, process 600 may be implemented by or may implement aspects of wireless communications systems 100 and/or 200 and/or processes 300, 400, and/or 500. Aspects of process 600 may be implemented by OAM 605, serving base station 610, and/or UE 615, which may be examples of corresponding devices described herein. UE 615 may include an access stratum 620 and/or an application layer 630, which may also be examples of corresponding devices described herein.

UE 615 and serving base station 610 may establish a communication link. The communication link may be established during a procedure, such as an initial access procedure, a cell reselection procedure, or the like. The communication link may be configured with various time, frequency, spatial, code, etc., resources used for performing communications between UE 615 and serving base station 610.

At 605, OAM 605 may transmit or otherwise convey an indication of a QoE configuration to UE 615. For example, OAM 605 may identify various QoE variables to be obtained or otherwise identified and used for, in addition to various application layer optimizations, communication link optimizations and/or handover. For example, the QoE configuration may be transmitted or otherwise provided to serving base station 610 via a wireless link and/or a backhaul link between OAM 605 (e.g., the OAM function of the core network) and serving base station 610. Serving base station 610 may transmit or otherwise provide the QoE configuration to UE 615, which may provide the QoE configuration to the various sublayers/functions of UE 615.

At 640, UE 615 may measure a set of QoE variables at the application layer 630 based on the QoE configuration received from OAM. For example, the application layer 630 may measure the QoE variables used for application layer optimizations as well as QoE variables (e.g., a subset of the QoE variables that may be relevant for link optimization and/or handover) indicated in the QoE configuration. The set of QoE variables may be associated with the service type configured at the application layer of the UE. Examples of the QoE variables may include, but are not limited to, a cell identifier of serving base station 610, a service type of application being utilized by application(s) operating at the application layer 630), an average application layer throughput rate, an average application layer RTT measurement, an average application layer jitter, an average application layer to operate, and/or failure rates for the application layer throughput rate, RTT measurement, jitter rate, packet drop rate, etc. For example, application layer 630 may monitor such variables for instantaneous and/or averaged measurements to satisfy a QoE constraint of UE 615 (e.g., a QoE need or requested QoE usage of UE 615).

UE 615 may also measure a set of RRM variables at the access stratum 620 based on RRM configuration received from serving base station. The set of RRM variables identified at the RAN layer 620 may be associated with the communication link between UE 615 and serving base station 610. Additionally or alternatively, the set of RRM variables identified at the access stratum 620 may be associated with communication links between UE 615 and a set of one or more target base stations available for UE 615 to potentially connect to in order to establish a new communication link should the communication link between UE 615 and serving base station 610 falling below an acceptable performance threshold. Example RRM variables in the set of RRM variables may include, but are not limited to, a cell identifier of serving base station 610, a service type, RSRP, RSSI, SINR, CQI, a throughput rate observed at the access stratum 320, an RTT observed at the access stratum 320, a jitter rate observed at the access stratum 320, a packet drop rate observed at the access stratum 320, and the like.

In some aspects, corresponding variables between the set of QoE variables and the set of RRM variables may have different values. For example, an instantaneous and/or averaged throughput rate observed at the application layer 630 may be different than the instantaneous and/or averaged throughput rate observed at the access stratum 620. As another example, an instantaneous and/or averaged RTT measurement, jitter rate, packet drop rate, or the like, observed at the application layer 630 may be different than the instantaneous and/or averaged RTT measurement, jitter rate, packet drop rate, or the like, observed at the access stratum 620.

Broadly, process 600 includes techniques for conversion of the QoE measurements (e.g., the set of QoE variables) into a format readable by the access stratum of the UE 620, and RAN (e.g., into a multi-layer readable format). In the option illustrated in FIG. 6, the application layer 630 converts the QoE variables in the set of QoE variables into a RAN readable format. That is, UE 615 may convert the RAN readable QoE measurements.

Generally, conversion of the QoE variables in the set of QoE variables into a RAN readable format may include converting the actual QoE measurements of the QoE variables into corresponding RRC variables (e.g., convert a QoE throughput rate into a corresponding RRM throughput rate format). In some examples, conversion of the QoE variables in the set of QoE variables into the RAN readable format may include converting the actual QoE measurements of the QoE variables into information indicative of the measurement(s) (e.g., convert a service type QoE variable into a QoE constraint applicable to the various sub layers of the access stratum 630), or sending a subset of QoE variables to access stratum 620 from the application, or providing a generic score for the application QoE to the access stratum 620 of the UE.

In some examples, conversion of the QoE measurements of the QoE variables into a RAN readable format may include conversion of the QoE variables and/or information indicative of the QoE variables, into a format readable by particular sublayers of the access stratum 620. For example, some QoE variables identified at the application layer 630 may be converted into a format readable by the physical sublayer, an RLC sublayer, an RRC sublayer, or the like.

UE 615 may maintain (e.g., be configured with which QoE measurements/variables are to be identified by serving base station 610) QoE variables to obtain different QoE measurements, such as service type, average application layer QoE performance, the percentage of time the QoE metrics (e.g., QoE constraints) are violated, or the like, or overall satisfaction level of QoE at the application layer. For example, application layer 630 of UE 615 may transfer the set of QoE variables to the access stratum 620 in a format readable by the UE access stratum 620 and RAN. In this option, the access stratum 620 may transmit the measurement report (discussed below) to serving base station 610 that indicates the set of QoE variables and the set of RRM variables and/or information indicative of/or otherwise associated with the set of QoE variables and the set of RRM variables.

Accordingly, at 645 the application layer 630 of the UE 615 may provide an indication of the set of QoE variables to the access stratum 620. The indication of the set of QoE variables may be provided in a format readable by the access stratum 620. At 655, the access stratum 620 may transmit or otherwise provide the measurement report to serving base station 610 indicating information associated with the set of QoE variables and the RRM variables in a multi-layer readable format. That is, the measurement report may carry or otherwise indicate the set of QoE variables and/or the summary QoE report in addition to the set of RRM variables.

At 660, UE 615 and serving base station 610 may adjust or otherwise modify the communication link between UE 615 and serving base station 610. For example, this may include adjusting various communication parameters configured for the communication link (e.g., such as MCS, bandwidth, transmit power level(s), latency adjustments, reliability adjustments, etc., to provide link optimizations). In some aspects, this may include adjusting various handover procedure parameters (e.g., adjusting the levels of QoE and/or RRM variables that trigger a handover procedure of UE 615 to a target base station to establish a new communication link).

In some aspects, this adjusting may include performing a handover procedure of UE 615 from serving base station 610 to establish a new communication link with a target base station.

Figure 7:
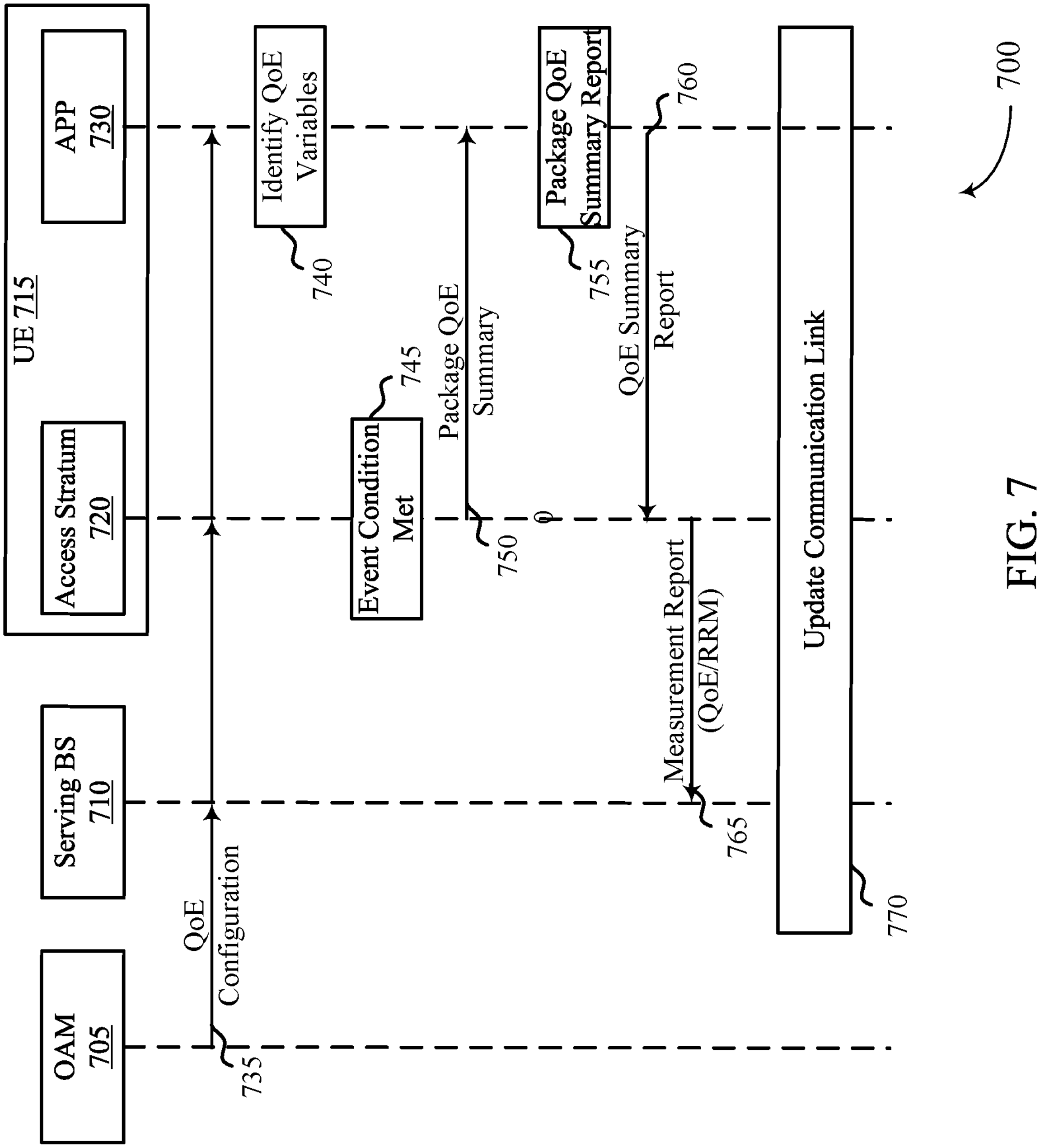
FIG. 7 illustrates an example of a process that supports QoE measurements for mobility robustness in accordance with aspects of the present disclosure.

FIG. 7 illustrates an example of a process 700 that supports quality of experience measurements for mobility robustness in accordance with aspects of the present disclosure. In some examples, process 700 may be implemented by or may implement aspects of wireless communications systems 100 and/or 200 and/or processes 300, 400, 500 and/or 600. Aspects of process 700 may be implemented by OAM 705, serving base station 710, and/or UE 715, which may be examples of corresponding devices described herein. UE 715 may include an access stratum 720 and/or an application layer 730, which may also be examples of corresponding devices described herein.

UE 715 and serving base station 710 may establish a communication link. The communication link may be established during a procedure, such as an initial access procedure, a cell reselection procedure, or the like. The communication link may be configured with various time, frequency, spatial, code, etc., resources used for performing communications between UE 715 and serving base station 710.

At 735, OAM 705 may transmit or otherwise convey an indication of a QoE configuration to UE 715. For example, OAM 705 may identify various QoE variables to be obtained or otherwise identified and used for, in addition to various application layer optimizations, communication link optimizations and/or handover. For example, the QoE configuration may be transmitted or otherwise provided to serving base station 710 via a wireless link and/or a backhaul link between OAM 705 (e.g., the OAM function of the core network) and serving base station 710. Serving base station 710 may transmit or otherwise provide the QoE configuration to UE 715, which may provide the QoE configuration to the various sublayers/functions of UE 715.

At 740, UE 715 may measure a set of QoE variables at the application layer 730 based on the QoE configuration received from OAM. For example, the application layer 730 may measure the QoE variables used for application layer optimizations as well as QoE variables (e.g., a subset of the QoE variables that may be relevant for link optimization and/or handover) indicated in the QoE configuration. The set of QoE variables may be associated with the communication link between UE 715 and serving base station 710. Examples of the QoE variables may include, but are not limited to, a service type (e.g., type of service(s) being utilized by application(s) operating at the application layer 730), an average application layer throughput rate, an average application layer RTT measurement, an average application layer jitter, an average application layer to operate, and/or failure rates for the application layer throughput rate, RTT measurement, jitter rate, packet drop rate, etc. For example, application layer 730 may monitor such variables for instantaneous and/or averaged measurements to satisfy a QoE constraint of UE 715 (e.g., a QoE need or requested QoE usage of UE 715).

UE 715 may also identify a set of RRM variables at the access stratum 720. The set of RRM variables identified at the access stratum 720 may be associated with the communication link between UE 715 and serving base station 710. Additionally or alternatively, the set of RRM variables identified at the access stratum 720 may be associated with communication links between UE 715 and a set of one or more neighboring base stations available for UE 715 to potentially connect to in order to establish a new communication link should the communication link between UE 715 and serving base station 710 falling below an acceptable performance threshold. Example RRM variables in the set of RRM variables may include, but are not limited to, a cell identifier of serving base station 710, a service type, RSRP, RSSI, SINR, CQI, a throughput rate observed at the access stratum 720, an RTT observed at the access stratum 720, a jitter rate observed at the access stratum 720, a packet drop rate observed at the access stratum 720, and the like.

In some aspects, corresponding variables between the set of QoE variables and the set of RRM variables may have different values. For example, an instantaneous and/or averaged throughput rate observed at the application layer 730 may be different than the instantaneous and/or averaged throughput rate observed at the access stratum 720. As another example, an instantaneous and/or averaged RTT measurement, jitter rate, packet drop rate, or the like, observed at the application layer 730 may be different than the instantaneous and/or averaged RTT measurement, jitter rate, packet drop rate, or the like, observed at the access stratum 720.

Broadly, process 700 includes techniques for conversion of the QoE measurements (e.g., the set of QoE variables) into a format readable by the access stratum 720 and RAN (e.g., into a multi-layer readable format). In the option illustrated in FIG. 7, the application layer 730 converts the QoE variables in the set of QoE variables into a summary report to be provided to the access stratum 720, e.g., in a RAN readable format. That is, UE 715 may convert the RAN readable QoE measurements.

Generally, conversion of the QoE variables in the set of QoE variables into a RAN readable format may include converting the actual QoE measurements of the QoE variables into corresponding RRC variables (e.g., convert a QoE throughput rate into a corresponding RRM throughput rate format). In some examples, conversion of the QoE variables in the set of QoE variables into the RAN readable format may include converting the actual QoE measurements of the QoE variables into information indicative of the measurement(s) (e.g., convert a service type QoE variable into a QoE constraint applicable to the various sub layers of the access stratum 720), or sending a subset of QoE variables to access stratum 620 from the application, or providing a generic score for the application QoE to the access stratum 620 of the UE.

In some examples, conversion of the QoE measurements of the QoE variables into a RAN readable format may include conversion of the QoE variables and/or information indicative of the QoE variables, into a format readable by particular sublayers of the access stratum 720. For example, some QoE variables identified at the application layer 730 may be converted into a format readable by the physical sublayer, an RLC sublayer, an RRC sublayer, or the like.

UE 715 may maintain (e.g., be configured with which QoE measurements/variables are to be identified by serving base station 710) QoE variables to obtain different QoE measurements, such as service type, average application layer QoE performance, the percentage of time the QoE metrics (e.g., QoE constraints) are violated, or the like. For example, application layer 730 of UE 715 may transfer the set of QoE variables to the access stratum 720 in a format readable by the access stratum 720. In this option, the access stratum 720 may transmit the measurement report (discussed below) to serving base station 710 that indicates the set of QoE variables and the set of RRM variables and/or information indicative of/or otherwise associated with the set of QoE variables and the set of RRM variables.

At 745, the access stratum 720 may determine that a triggering event has occurred. For example, the access stratum 720 may determine that the RRM variable(s) have deteriorated to a point where the RRM variable(s) fail to satisfy a performance threshold. Accordingly, at 750 the access stratum 720 may transmit, transfer, or otherwise provide a signal to the application layer 730 requesting the application layer 730 to package a QoE summary (RAN aware QoE) report. In response, at 755 the application layer 730 may generate or otherwise package a QoE summary report based on the QoE variables identified, monitored, or otherwise maintained at the application layer 730. This may include the application layer 730 identifying or otherwise selecting a subset of QoE variables indicated in the QoE configuration. The application layer 730 may generate the QoE summary report based on the QoE variable(s), e.g., may generate the QoE summary report based on information in the QoE variable(s).

Accordingly, at 760 the application layer 730 of the UE 715 may provide an indication of the QoE summary report to the access stratum 720. The indication of the QoE summary report may be provided in a format readable by the access stratum 720 at the UE and RAN (e.g. serving base station). At 765, the access stratum 720 may transmit or otherwise provide the measurement report to serving base station 710 indicating information associated with the set of QoE variables (e.g., based on the QoE summary report—

RAN aware QoE) and the RRM variables in a multi-layer readable format. That is, the measurement report may carry or otherwise indicate the set of QoE variables and/or the summary QoE report in addition to the set of RRM variables.

At 770, UE 715 and serving base station 710 may adjust or otherwise modify the communication link between UE 715 and serving base station 710. For example, this may include adjusting various communication parameters configured for the communication link (e.g., such as MCS, bandwidth, transmit power level(s), latency adjustments, reliability adjustments, etc., to provide link optimizations). In some aspects, this may include adjusting various handover procedure parameters (e.g., adjusting the levels of QoE and/or RRM variables that trigger a handover procedure of UE 715 to a target base station to establish a new communication link).

In some aspects, this adjusting may include performing a handover procedure of UE 715 from serving base station 710 to establish a new communication link with a target base station.

Figure 8:
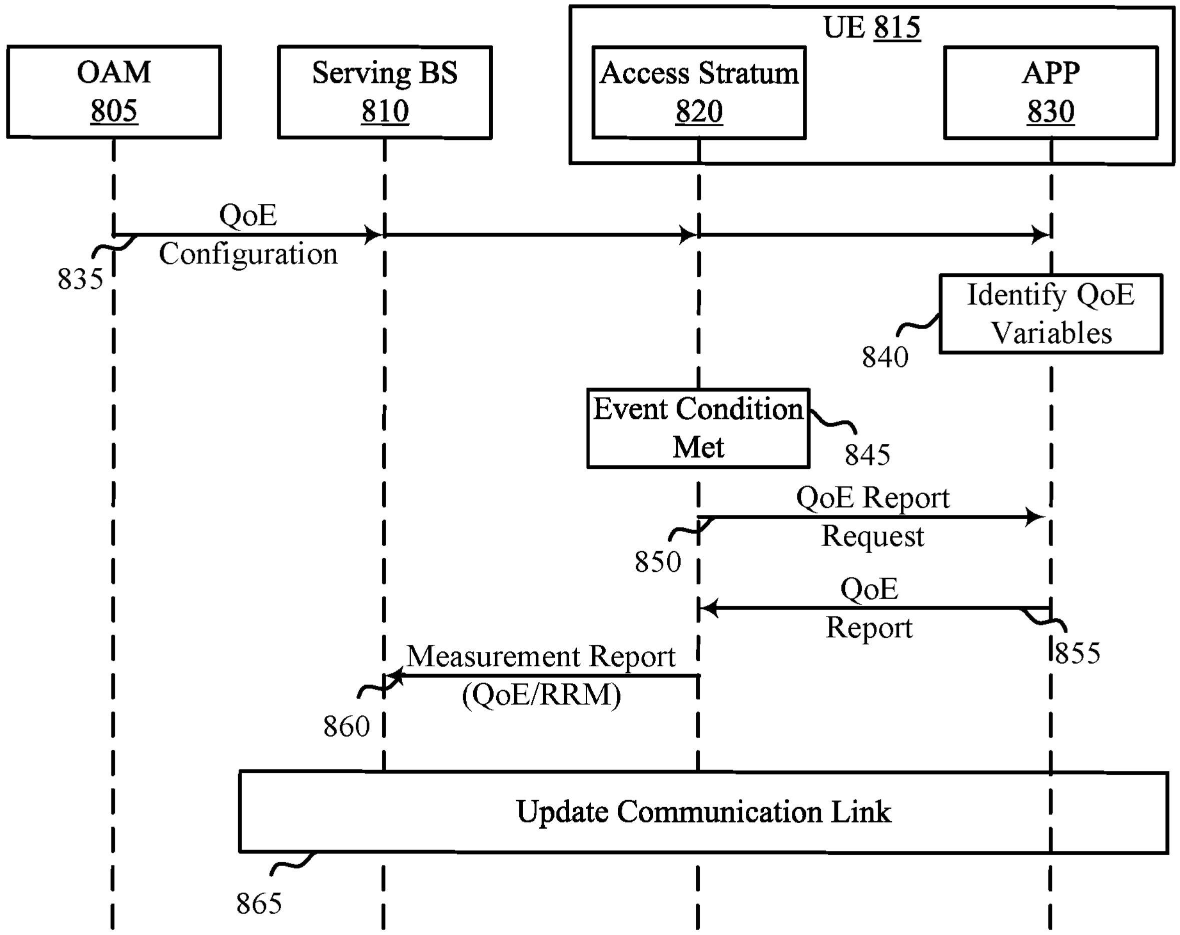
FIG. 8 illustrates an example of a process that supports QoE measurements for mobility robustness in accordance with aspects of the present disclosure.

FIG. 8 illustrates an example of a process 800 that supports quality of experience measurements for mobility robustness in accordance with aspects of the present disclosure. In some examples, process 800 may be implemented by or may implement aspects of wireless communications systems 100 and/or 200 and/or processes 300, 400, 500, 600 and/or 700. Aspects of process 800 may be implemented by OAM 805, serving base station 810, and/or UE 815, which may be examples of corresponding devices described herein. UE 815 may include an access stratum 820 and/or an application layer 830, which may also be examples of corresponding devices described herein.

UE 815 and serving base station 810 may establish a communication link. The communication link may be established during a procedure, such as an initial access procedure, a cell reselection procedure, or the like. The communication link may be configured with various time, frequency, spatial, code, etc., resources used for performing communications between UE 815 and serving base station 810.

At 835, OAM 805 may transmit or otherwise convey an indication of a QoE configuration to UE 815. For example, OAM 805 may identify various QoE variables to be obtained or otherwise identified and used for, in addition to various application layer optimizations, communication link optimizations and/or handover. For example, the QoE configuration may be transmitted or otherwise provided to serving base station 810 via a wireless link and/or a backhaul link between OAM 805 (e.g., the OAM function of the core network) and serving base station 810. Serving base station 810 may transmit or otherwise provide the QoE configuration to UE 815, which may provide the QoE configuration to the various sublayers/functions of UE 815.

At 840, UE 815 may measure a set of QoE variables at the application layer 830 based on the QoE configuration received from OAM. For example, the application layer 830 may measure the QoE variables used for application layer optimizations as well as QoE variables (e.g., a subset of the QoE variables that may be relevant for link optimization and/or handover) indicated in the QoE configuration. The set of QoE variables may be associated with a service type. Examples of the QoE variables may include, but are not limited to, a service type for service be communicated over the communication link (e.g., type of service(s) being utilized by application(s) operating at the application layer 830), an average application layer throughput rate, an average application layer RTT measurement, an average application layer jitter, an average application layer to operate, and/or failure rates for the application layer throughput rate, RTT measurement, jitter rate, packet drop rate, etc. For example, application layer 830 may monitor such variables for instantaneous and/or averaged measurements to satisfy a QoE constraint of UE 815 (e.g., a QoE need or requested QoE usage of UE 815).

UE 815 may also measure a set of RRM variables at the access stratum 820. The set of RRM variables identified at the access stratum 820 may be associated with the communication link between UE 815 and serving base station 810. Additionally or alternatively, the set of RRM variables identified at the access stratum 820 may be associated with communication links between UE 815 and a set of one or more target base stations available for UE 815 to potentially connect to in order to establish a new communication link should the communication link between UE 815 and serving base station 810 falling below an acceptable performance threshold. Example RRM variables in the set of RRM variables may include, but are not limited to, a cell identifier of serving base station 810, a service type, RSRP, RSSI, SINR, CQI, a throughput rate observed at the access stratum 820, an RTT observed at the access stratum 820, a jitter rate observed at the access stratum 820, a packet drop rate observed at the access stratum 820, and the like.

In some aspects, corresponding variables between the set of QoE variables and the set of RRM variables may have different values. For example, an instantaneous and/or averaged throughput rate observed at the application layer 830 may be different than the instantaneous and/or averaged throughput rate observed at the access stratum 820. As another example, an instantaneous and/or averaged RTT measurement, jitter rate, packet drop rate, or the like, observed at the application layer 830 may be different than the instantaneous and/or averaged RTT measurement, jitter rate, packet drop rate, or the like, observed at the access stratum 820.

Broadly, process 800 includes techniques for conversion of the QoE measurements (e.g., the set of QoE variables) into a format readable by the access stratum 820 of the UE and RAN (e.g., into a multi-layer readable format). In the option illustrated in FIG. 8, the application layer 830 converts the QoE variables in the set of QoE variables into a QoE report (e.g., a report indicating the set of QoE variables) to be provided to the access stratum 820, e.g., in a RAN readable format. That is, UE 815 may convert the RAN readable QoE measurements.

Generally, conversion of the QoE variables in the set of QoE variables into a RAN readable format may include converting the actual QoE measurements of the QoE variables into corresponding RRC variables (e.g., convert a QoE throughput rate into a corresponding RRM throughput rate format). In some examples, conversion of the QoE variables in the set of QoE variables into the RAN readable format may include converting the actual QoE measurements of the QoE variables into information indicative of the measurement(s) (e.g., convert a service type QoE variable into a QoE constraint applicable to the various sub layers of the access stratum 820), or sending a subset of QoE variables to access stratum 620 from the application, or providing a generic score for the application QoE to the access stratum 620 of the UE.

In some examples, conversion of the QoE measurements of the QoE variables into a RAN readable format may include conversion of the QoE variables and/or information indicative of the QoE variables, into a format readable by particular sublayers of the access stratum 820. For example, some QoE variables identified at the application layer 830 may be converted into a format readable by the physical sublayer, an RLC sublayer, an RRC sublayer, or the like.

UE 815 may maintain (e.g., be configured with which QoE measurements/variables are to be identified by serving base station 810) QoE variables to obtain different QoE measurements, such as service type, average application layer QoE performance, the percentage of time the QoE metrics (e.g., QoE constraints) are violated, or the like. For example, application layer 830 of UE 815 may transfer the set of QoE variables to the access stratum 820 in a format readable by the access stratum 820. In this option, the access stratum 820 may transmit the measurement report (discussed below) to serving base station 810 that indicates the set of QoE variables and the set of RRM variables and/or information indicative of/or otherwise associated with the set of QoE variables and the set of RRM variables.

At 845, the access stratum 820 may determine that a triggering event has occurred. For example, the access stratum 820 may determine that the RRM variable(s) have deteriorated to a point where the RRM variable(s) fail to satisfy a performance threshold. Accordingly, at 850 the access stratum 820 may transmit, transfer, or otherwise provide a signal to the application layer 830 requesting the application layer 830 to package a QoE report (e.g., a report indicating the set of QoE variables). In response, at 855 the application layer 830 may generate or otherwise package a QoE report based on the QoE variables identified, monitored, or otherwise maintained at the application layer 830. This may include the application layer 830 identifying or otherwise selecting a subset of QoE variables indicated in the QoE configuration. The application layer 830 may generate the QoE report based on the QoE variable(s), e.g., may generate the QoE report based on information in the QoE variable(s).

Accordingly, at 860 the application layer 830 of the UE 815 may provide an indication of the QoE report (e.g., may report the set of QoE variables) to the access stratum 820. The indication of the QoE report may be provided in a format readable by the access stratum 820. At 865, the access stratum 820 may transmit or otherwise provide the measurement report to serving base station 810 indicating information associated with the set of QoE variables (e.g., based on the QoE report) and the RRM variables in a multi-layer readable format. That is, the measurement report may carry or otherwise indicate the set of QoE variables in addition to the set of RRM variables.

At 870, UE 815 and serving base station 810 may adjust or otherwise modify the communication link between UE 815 and serving base station 810. For example, this may include adjusting various communication parameters configured for the communication link (e.g., such as MCS, bandwidth, transmit power level(s), latency adjustments, reliability adjustments, etc., to provide link optimizations). In some aspects, this may include adjusting various handover procedure parameters (e.g., adjusting the levels of QoE and/or RRM variables that trigger a handover procedure of UE 815 to a target base station to establish a new communication link).

In some aspects, this adjusting may include performing a handover procedure of UE 815 from serving base station 810 to establish a new communication link with a target base station.

Figure 9:
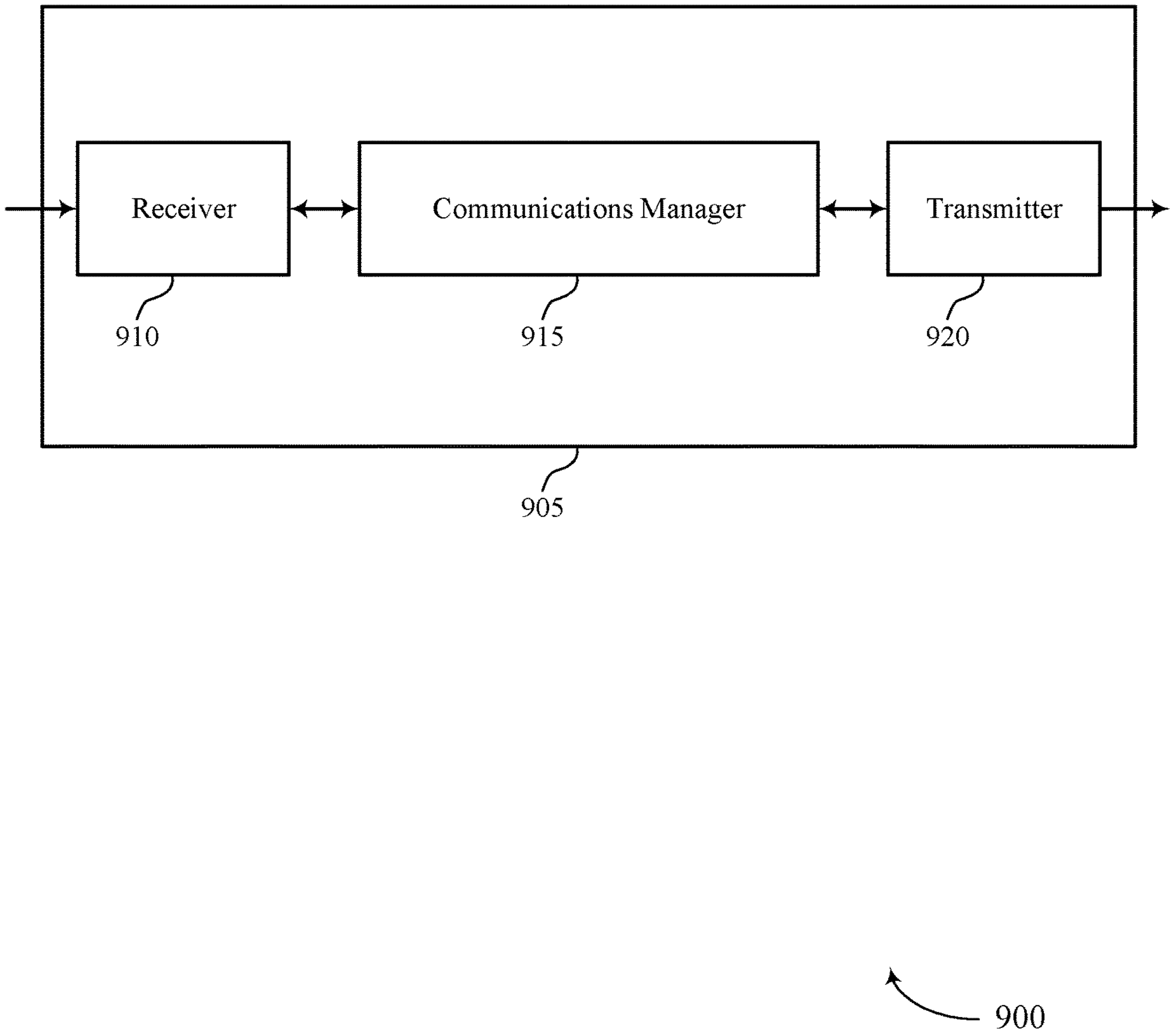
FIGS. 9 and 10 show block diagrams of devices that support QoE measurements for mobility robustness in accordance with aspects of the present disclosure.

FIG. 9 shows a block diagram 900 of a device 905 that supports QoE measurements for mobility robustness in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to QoE measurements for mobility robustness, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may establish a communication link between the UE and a serving base station. The communications manager 915 may identify, at an application layer of the UE, a set of QoE variables associated with a service type. The communications manager 915 may identify, at an access stratum of the UE, a set of RRM variables associated with the communication link between the UE and the serving base station and a communication link between the UE and a corresponding set of one or more target base stations associated with the communication links. The communications manager 915 may transmit a measurement report to the serving base station indicating information associated with the QoE variables and the RRM variables in a multi-layer readable format. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
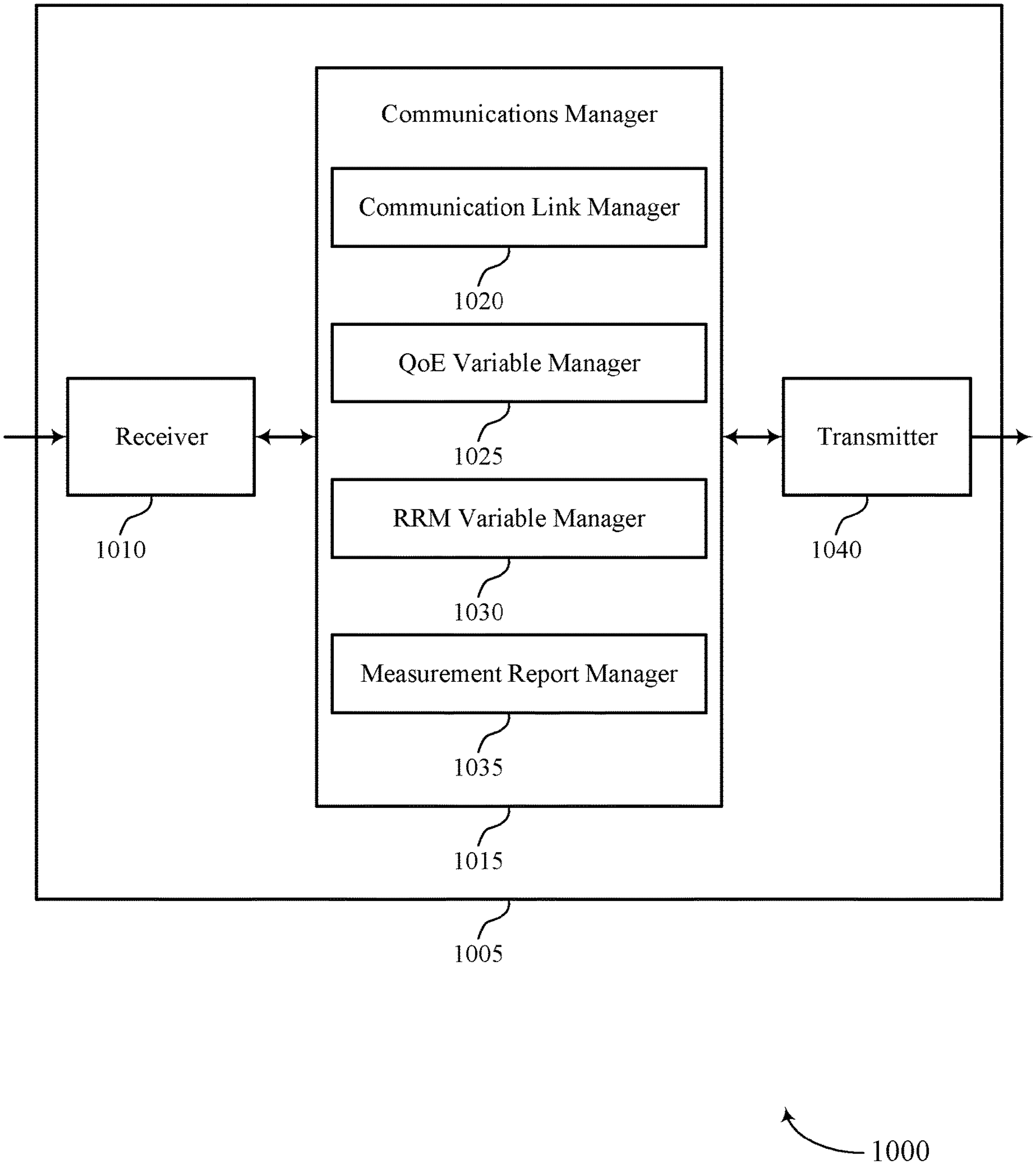

FIG. 10 shows a block diagram 1000 of a device 1005 that supports QoE measurements for mobility robustness in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to QoE measurements for mobility robustness, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a communication link manager 1020, a QoE variable manager 1025, an RRM variable manager 1030, and a measurement report manager 1035. The communications manager 1015 may be an example of aspects of the communications manager 1210 described herein.

The communication link manager 1020 may establish a communication link between the UE and a serving base station.

The QoE variable manager 1025 may identify, at an application layer of the UE, a set of QoE variables associated with different service types both for application layer optimizations and RAN optimizations.

The RRM variable manager 1030 may identify, at the access stratum of the UE, a set of RRM variables associated with the communication link between the UE and the serving base station and a communication link between the UE and a corresponding set of one or more target base stations associated with the communication links.

The measurement report manager 1035 may transmit a measurement report to the serving base station indicating information associated with the QoE variables and the RRM variables in a multi-layer readable format.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
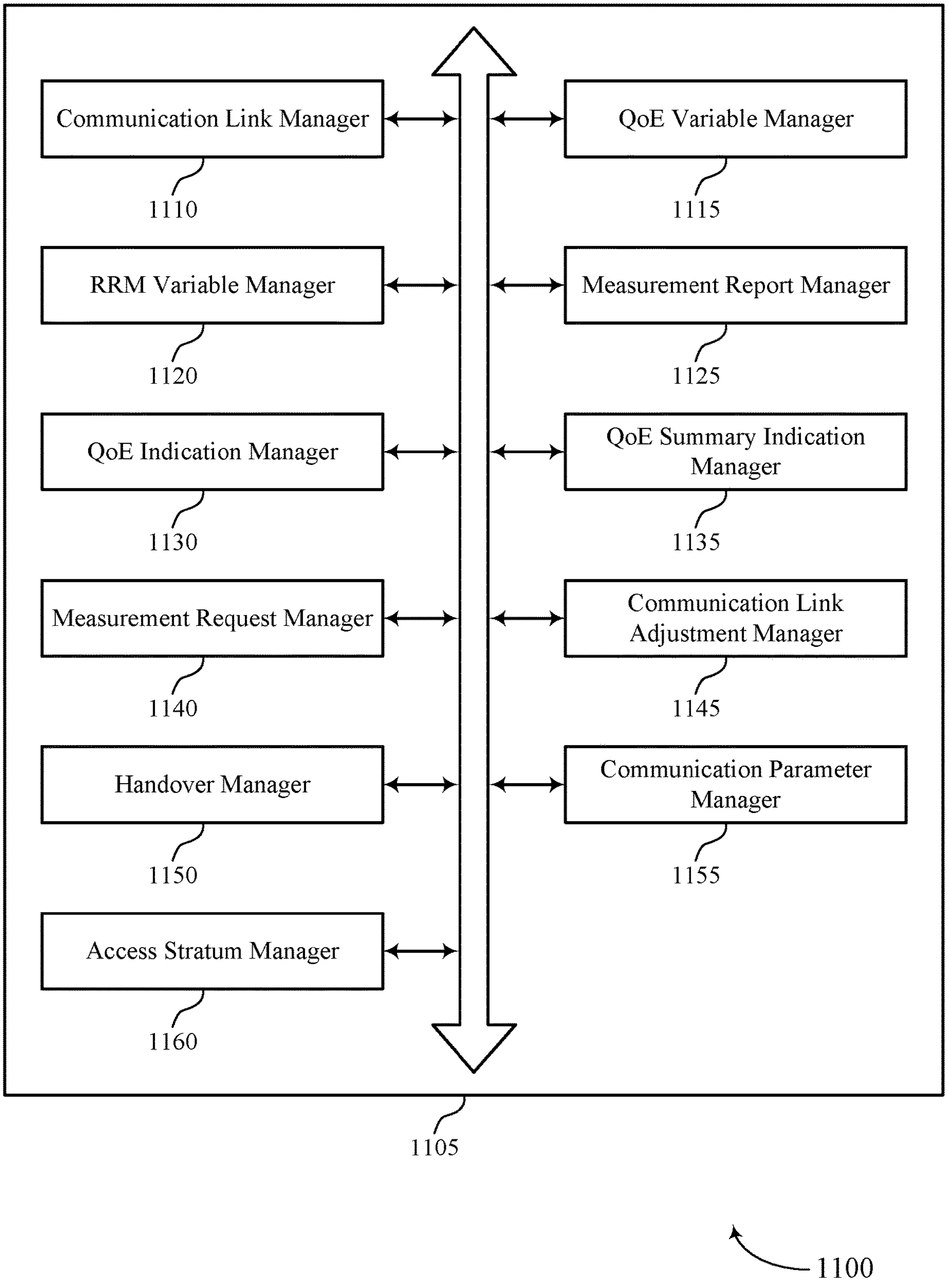
FIG. 11 shows a block diagram of a communications manager that supports QoE measurements for mobility robustness in accordance with aspects of the present disclosure.

FIG. 11 shows a block diagram 1100 of a communications manager 1105 that supports QoE measurements for mobility robustness in accordance with aspects of the present disclosure. The communications manager 1105 may be an example of aspects of a communications manager 915, a communications manager 1015, or a communications manager 1210 described herein. The communications manager 1105 may include a communication link manager 1110, a QoE variable manager 1115, an RRM variable manager 1120, a measurement report manager 1125, a QoE indication manager 1130, a QoE summary indication manager 1135, a measurement request manager 1140, a communication link adjustment manager 1145, a handover manager 1150, a communication parameter manager 1155, and an access stratum manager 1160. Each of these modules may communicate, directly or indirectly, with one another (e.g., via one or more buses).

The communication link manager 1110 may establish a communication link between the UE and a serving base station.

The QoE variable manager 1115 may identify, at an application layer of the UE, a set of QoE variables associated with different service types. In some cases, the QoE variables in the set of QoE variables include one or more of a cell identifier of the serving base station, or a service type for a service being communicated over the communication link, or an average application layer throughput rate, or an average application layer round-trip-time measurement, or an average application layer jitter, or an average application layer packet drop rate, or a failure rate of the application layer throughput rate, or a failure rate of the application layer round-trip-time variable, or a failure rate of the application layer jitter, or a failure rate of the application layer packet drop rate.

The RRM variable manager 1120 may identify, at the access stratum of the UE, a set of RRM variables associated with the communication link between the UE and the serving base station and a communication link between the UE and a corresponding set of one or more target base stations associated with the communication links.

The measurement report manager 1125 may transmit a measurement report to the serving base station indicating information associated with the QoE variables and the RRM variables in a multi-layer readable format.

The QoE indication manager 1130 may transfer, from the application layer of the UE to the access stratum of the UE, the set of QoE variables in a format readable by the access stratum and RAN.

The QoE summary indication manager 1135 may generate a summary of the set of QoE variables to obtain a summary QoE report (e.g., RAN aware QoE metrics) or obtain a generic score for the satisfaction of QoE. In some examples, configuring, at the application layer of the UE, the measurement report to indicate the summary QoE report (e.g., RAN aware QoE metrics) or obtain a generic score for the satisfaction of QoE and the set of RRM variables in a format readable by the access stratum of the UE and the serving base station.

The measurement request manager 1140 may receive a measurement request from the base station indicating the QoE variables to include in the set of QoE variables, where identifying the set of QoE variables is based on the measurement request, where the measurement report is transmitted based on the measurement request.

The communication link adjustment manager 1145 may adjust, in response to the measurement report, the communication link between the UE and the serving base station.

The handover manager 1150 may perform, based on the set of QoE variables, a handover procedure of the UE from the serving base station to establish a new communication link with a target base station from the set of target base stations. In some examples, the handover manager 1150 may determine that the set of QoE variables fail to satisfy a threshold, where transmitting the measurement report is based on the determining. In some examples, the handover manager 1150 may receive, based on transmitting the measurement report, a connection reconfiguration message identifying the target base station to perform the handover procedure to establish the new communication link.

The communication parameter manager 1155 may adjust one or more communication parameters configured for the communication link between the UE and the serving base station and one or more handover parameters for a handover procedure of the UE from the serving base station to establish a new communication link with a target base station from the set of one or more target base stations.

The access stratum manager 1160 may identify at least a portion of the quality of experience variables, at the access stratum of the UE, where the set of quality of experience variables indicated in the measurement report is based on the portion of the quality of experience variables. In some examples, identifying, at the access stratum of the UE, a summary quality of experience report (RAN aware QoE metrics) or obtain generic score for the satisfaction of QoE based on the set of quality of experience variables, where the set of quality of experience variables indicated in the measurement report includes the summary quality of experience report (RAN aware QoE metrics) or obtain generic score for the satisfaction of QoE.

Figure 12:
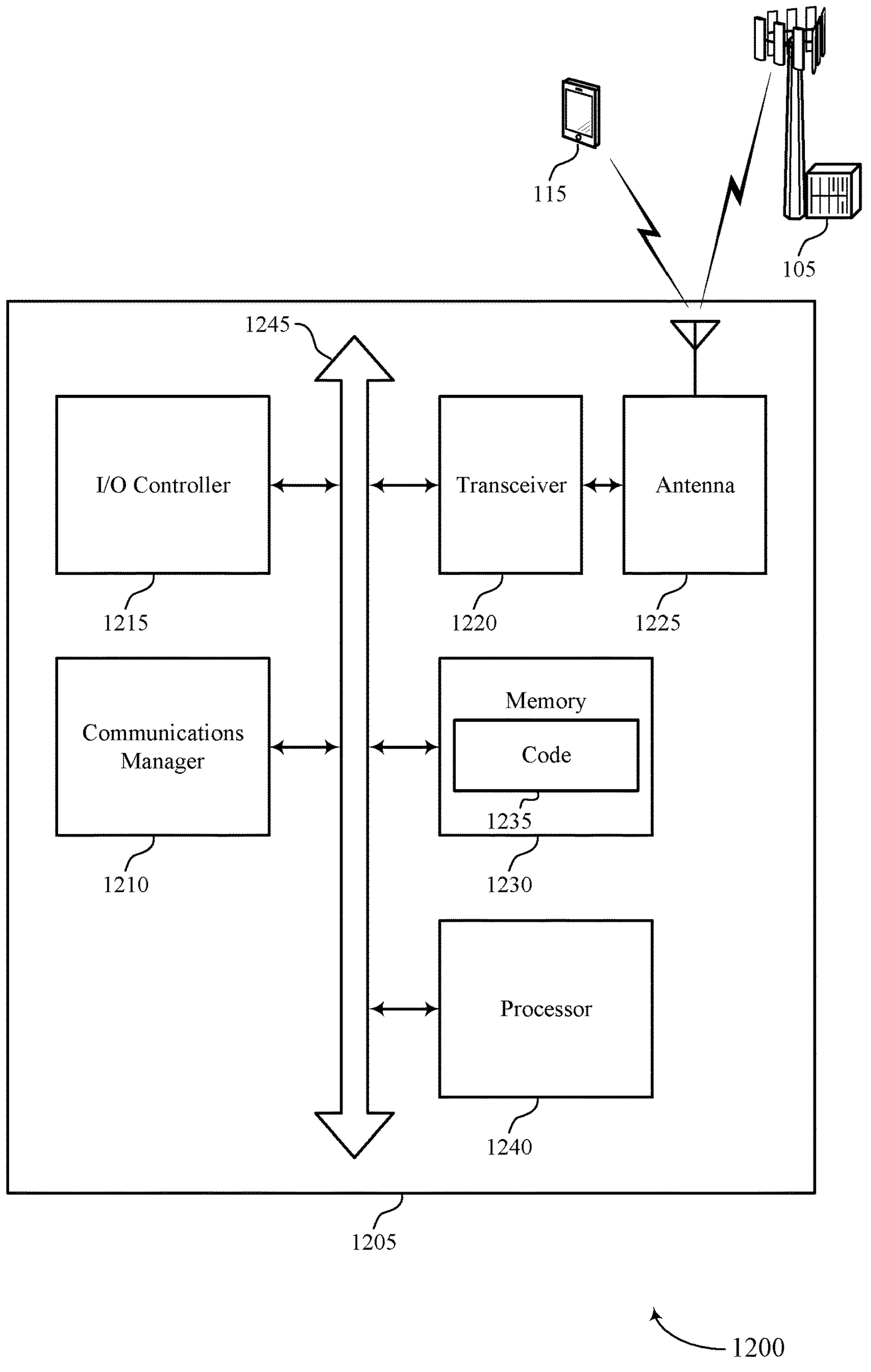
FIG. 12 shows a diagram of a system including a device that supports QoE measurements for mobility robustness in accordance with aspects of the present disclosure.

FIG. 12 shows a diagram of a system 1200 including a device 1205 that supports QoE measurements for mobility robustness in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may establish a communication link between the UE and a serving base station. The communications manager 1210 may identify, at an application layer of the UE, a set of QoE variables associated with different service types. The communications manager 1210 may identify, at the access stratum of the UE, a set of RRM variables associated with the communication link between the UE and the serving base station and a communication link between the UE and a corresponding set of one or more target base stations associated with the communication links. The communications manager 1210 may transmit a measurement report to the serving base station indicating information associated with the QoE variables and the RRM variables in a multi-layer readable format.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting QoE measurements for mobility robustness).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
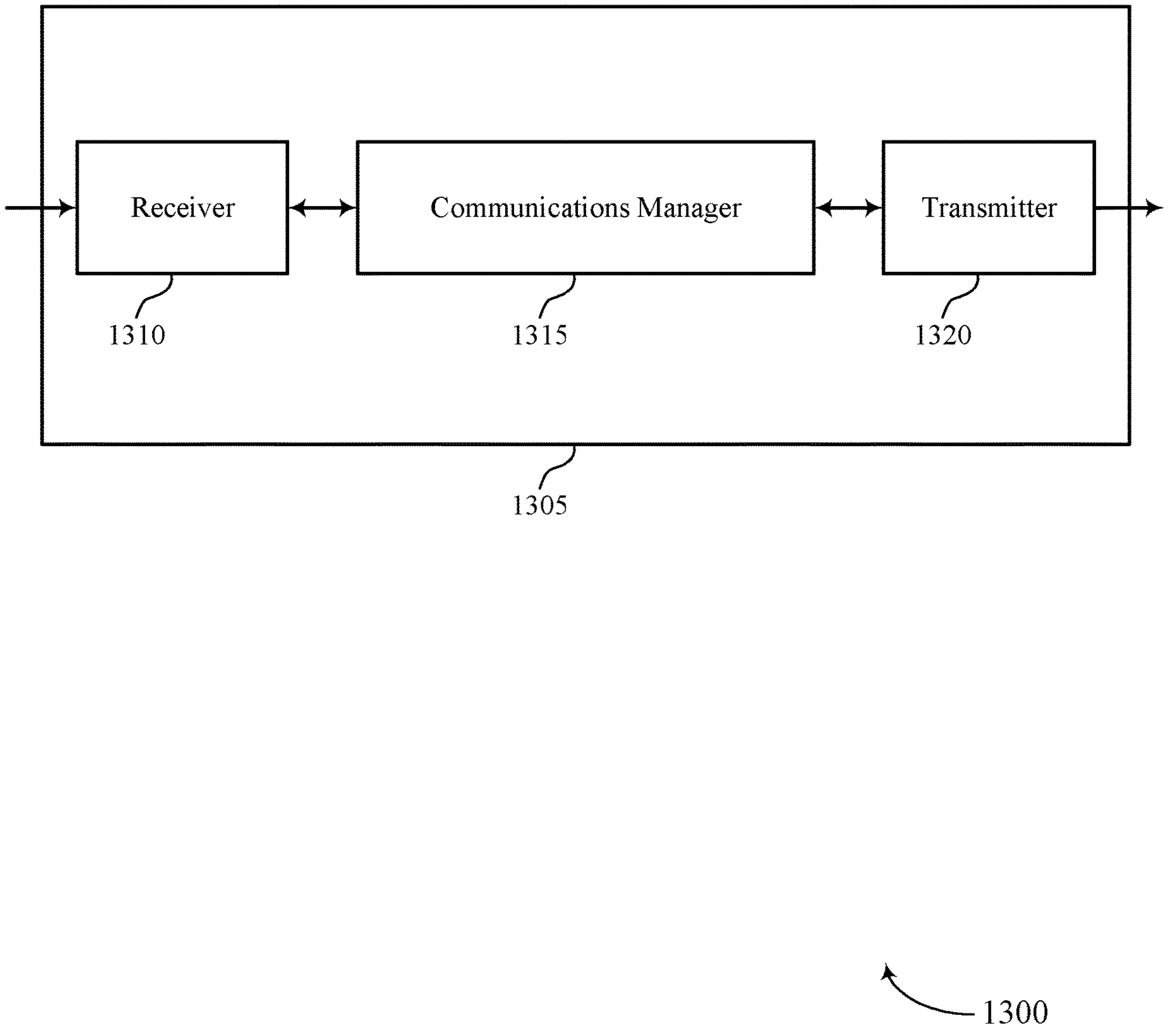
FIGS. 13 and 14 show block diagrams of devices that support QoE measurements for mobility robustness in accordance with aspects of the present disclosure.

FIG. 13 shows a block diagram 1300 of a device 1305 that supports QoE measurements for mobility robustness in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to QoE measurements for mobility robustness, etc.). Information may be passed on to other components of the device 1305. The receiver 1310 may be an example of aspects of the transceiver 1620 described with reference to FIG. 16. The receiver 1310 may utilize a single antenna or a set of antennas.

When device 1005 is a serving base station, the communications manager 1315 may establish a communication link with a UE, receive a measurement report from the UE indicating information associated with a set of QoE variables and a set of RRM variables in a multi-layer readable format, and adjust, in response to the measurement report, the communication link between the UE and the serving base station.

When device 1005 is a target base station, the communications manager 1315 may also receive a resource status request from a serving base station of a UE, the resource status request indicating a QoE constraint of the UE and a set of QoE variables of the UE, transmit a resource status response to the serving base station indicating an ability to support the QoE constraint of the UE, and determine, based on the set of QoE variables, that the target base station's capability in satisfying the QoE constraint of the UE. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
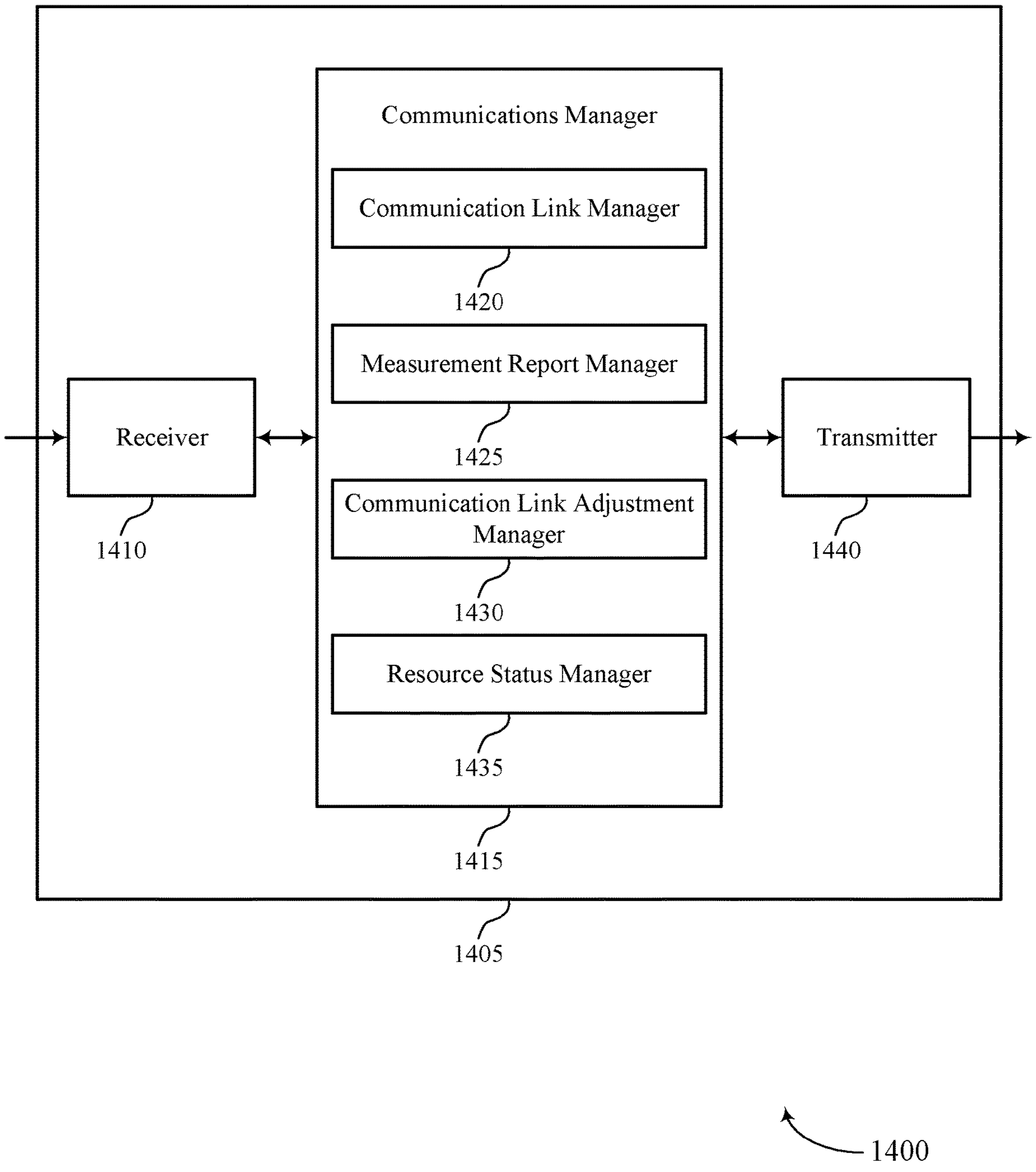

FIG. 14 shows a block diagram 1400 of a device 1405 that supports QoE measurements for mobility robustness in accordance with aspects of the present disclosure. The device 1405 may be an example of aspects of a device 1305, or a base station 105 as described herein. The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to QoE measurements for mobility robustness, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a communication link manager 1420, a measurement report manager 1425, a communication link adjustment manager 1430, and a resource status manager 1435. The communications manager 1415 may be an example of aspects of the communications manager 1610 described herein.

The communication link manager 1420 may establish a communication link with a UE.

The measurement report manager 1425 may receive a measurement report from the UE indicating information associated with a set of QoE variables and a set of RRM variables in a multi-layer readable format.

The communication link adjustment manager 1430 may adjust, in response to the measurement report, the communication link between the UE and the serving base station.

The resource status manager 1435 may receive a resource status request from a serving base station of a UE, the resource status request indicating a QoE constraint of the UE and a set of QoE variables of the UE and transmit a resource status response to the serving base station indicating an ability to support the QoE constraint of the UE.

The communication link manager 1420 may determine, based on the set of QoE variables, that the target base station's capability in satisfying the QoE constraint of the UE.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
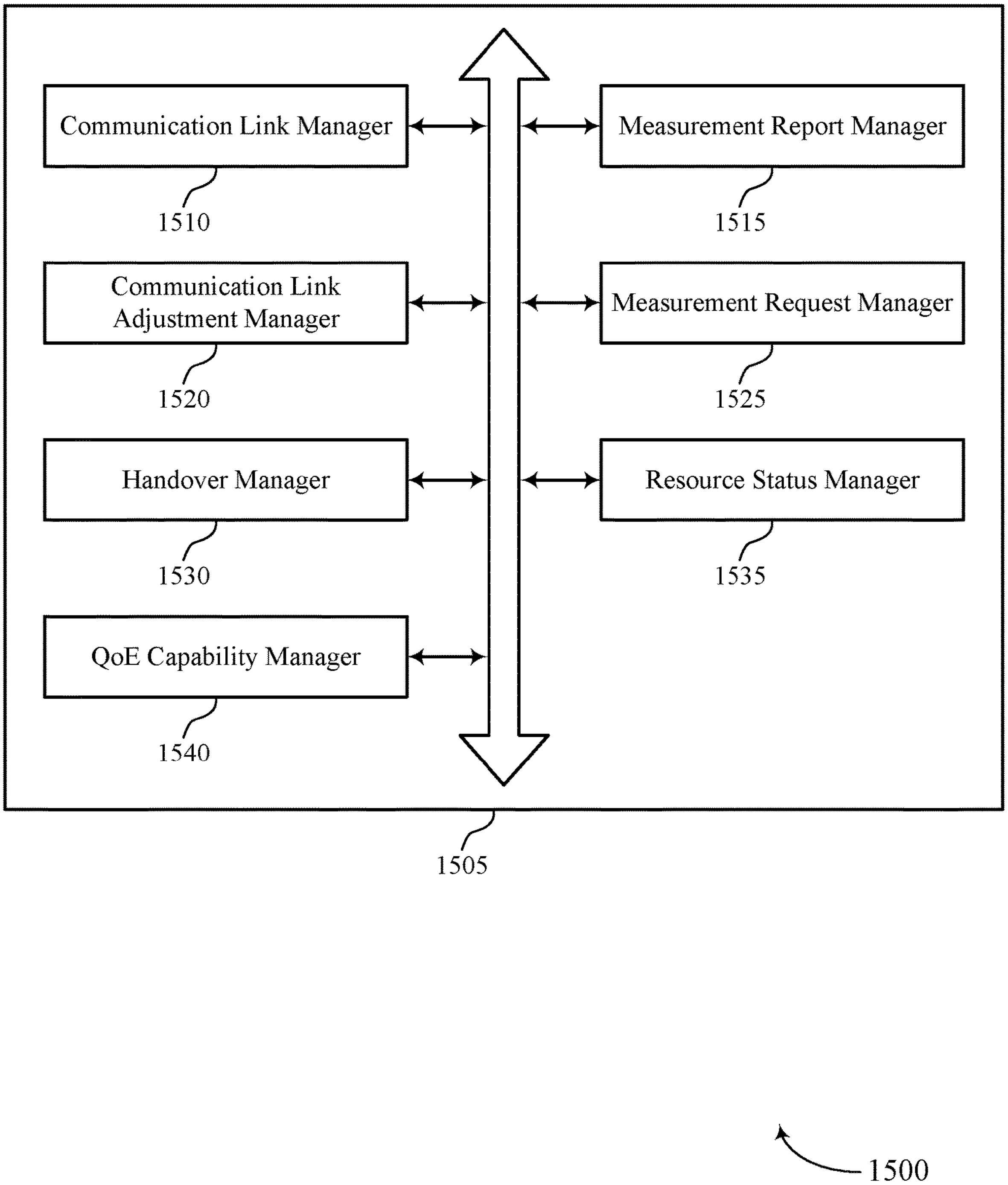
FIG. 15 shows a block diagram of a communications manager that supports QoE measurements for mobility robustness in accordance with aspects of the present disclosure.

FIG. 15 shows a block diagram 1500 of a communications manager 1505 that supports QoE measurements for mobility robustness in accordance with aspects of the present disclosure. The communications manager 1505 may be an example of aspects of a communications manager 1315, a communications manager 1415, or a communications manager 1610 described herein. The communications manager 1505 may include a communication link manager 1510, a measurement report manager 1515, a communication link adjustment manager 1520, a measurement request manager 1525, a handover manager 1530, a resource status manager 1535, and a QoE capability manager 1540. Each of these modules may communicate, directly or indirectly, with one another (e.g., via one or more buses).

The communication link manager 1510 may establish a communication link with a UE. In some examples, the communication link manager 1510 may determine, based on the set of QoE variables, that the target base station/s capability in satisfying the QoE constraint of the UE.

The measurement report manager 1515 may receive a measurement report from the UE indicating information associated with a set of QoE variables and a set of RRM variables in a multi-layer readable format.

The communication link adjustment manager 1520 may adjust, in response to the measurement report, the communication link between the UE and the serving base station. In some examples, the communication link adjustment manager 1520 may adjust one or more communication parameters configured for the communication link between the UE and the serving base station.

The resource status manager 1535 may receive a resource status request from a serving base station of a UE, the resource status request indicating a QoE constraint of the UE and a set of QoE variables of the UE. In some examples, the resource status manager 1535 may transmit a resource status response to the serving base station indicating an ability to support the QoE constraint of the UE.

The measurement request manager 1525 may transmit a measurement request to the UE indicating the QoE variables to include in the set of QoE variables, where the measurement report indicating the set of QoE variables is received in response to the measurement request.

The handover manager 1530 may perform, based on the set of QoE variables, a handover procedure of the UE from the serving base station to a target base station for the UE to establish a new communication link with the target base station. In some examples, the handover manager 1530 may determine that the set of QoE variables fail to satisfy a threshold. In some examples, the handover manager 1530 may transmit a resource status request to a set of target base stations including the target base station indicated in the measurement report, the resource status request indicating a QoE constraint of the UE and the set of QoE variables of the UE. In some examples, the handover manager 1530 may receive a resource status response from the target base station indicating support of the QoE constraint of the UE. In some examples, the handover manager 1530 may transmit, based on the resource status response, a connection reconfiguration message to the UE identifying the target base station to perform the handover procedure to establish the new communication link.

In some examples, the handover manager 1530 may receive multiple resource status responses from at least a portion of respective target base stations of the set of one or more target base stations, each resource status response indicating a respective ability to support UE QoE for the corresponding target base station. In some examples, the handover manager 1530 may select a subset of available target base stations from the portion of the respective target base stations of the set of one or more target base stations based on the respective ability to support the UE QoE constraint. In some examples, the handover manager 1530 may select the target base station from the subset of available base stations based on the ability to support the UE QoE constraints of the target base station and one or more RRM variables of the UE for the target base station. In some examples, the handover manager 1530 may transmit a handover request to the target base station based on selecting the target base station, the handover request indicating that the handover procedure of the UE is to be performed to the target base station. In some examples, the handover manager 1530 may receive a handover response from the target base station, where the handover procedure of the UE is performed with the target base station based on the handover response.

In some examples, the handover manager 1530 may receive a handover request from the serving base station based on the resource status response indicating support for the QoE requirement of the UE. In some examples, the handover manager 1530 may transmit a handover response to the serving base station, where the handover procedure of the UE is performed with the target base station based on the handover response.

The QoE capability manager 1540 may determine the ability to support UE quality of experience of the target base station, where determining that the ability to support quality of experience of the target base station is determined whether it can satisfy the quality of experience constraint of the UE.

Figure 16:
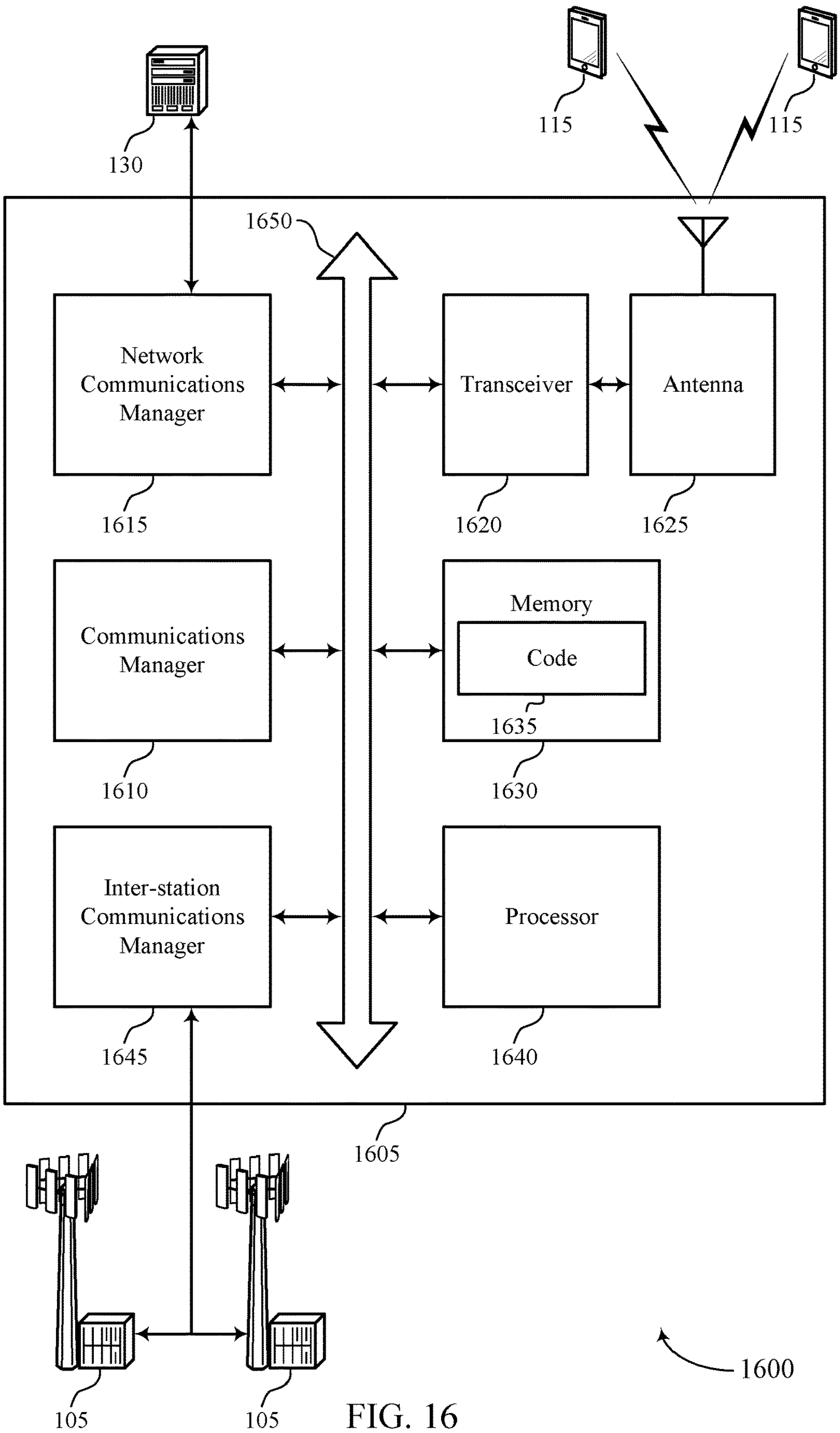
FIG. 16 shows a diagram of a system including a device that supports QoE measurements for mobility robustness in accordance with aspects of the present disclosure.

FIG. 16 shows a diagram of a system 1600 including a device 1605 that supports QoE measurements for mobility robustness in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

When device 1305 is a serving base station, the communications manager 1610 may establish a communication link with a UE, receive a measurement report from the UE indicating information associated with a set of QoE variables and a set of RRM variables in a multi-layer readable format, and adjust, in response to the measurement report, the communication link between the UE and the serving base station.

When device 1305 is a target base station, the communications manager 1610 may also receive a resource status request from a serving base station of a UE, the resource status request indicating a QoE constraint of the UE and a set of QoE variables of the UE, transmit a resource status response to the serving base station indicating an ability to support the QoE constraint of the UE, and determine, based on the set of QoE variables, that the ability of the target base station in satisfying the QoE constraint of the UE.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting QoE measurements for mobility robustness).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

FIG. 17 shows a flowchart illustrating a method 1700 that supports QoE measurements for mobility robustness in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may establish a communication link between the UE and a serving base station. The operations of 1705 may be performed according to the methods described herein. In some examples, aspects of the operations of 1705 may be performed by a communication link manager as described with reference to FIGS. 9 through 12.

At 1710, the UE may measure, at an application layer of the UE, a set of QoE variables associated with different service types. The operations of 1710 may be performed according to the methods described herein. In some examples, aspects of the operations of 1710 may be performed by a QoE variable manager as described with reference to FIGS. 9 through 12.

At 1715, the UE may measure, at an access stratum of the UE, a set of RRM variables associated with the communication link between the UE and the serving base station and a communication link between the UE and a corresponding set of one or more neighboring base stations associated with the communication links. The operations of 1715 may be performed according to the methods described herein. In some examples, aspects of the operations of 1715 may be performed by an RRM variable manager as described with reference to FIGS. 9 through 12.

At 1720, the UE may transmit a measurement report to the serving base station indicating information associated with the QoE variables and the RRM variables in a multi-layer readable format. The operations of 1720 may be performed according to the methods described herein. In some examples, aspects of the operations of 1720 may be performed by a measurement report manager as described with reference to FIGS. 9 through 12.

FIG. 18 shows a flowchart illustrating a method 1800 that supports QoE measurements for mobility robustness in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may establish a communication link between the UE and a serving base station. The operations of 1805 may be performed according to the methods described herein. In some examples, aspects of the operations of 1805 may be performed by a communication link manager as described with reference to FIGS. 9 through 12.

At 1810, the UE may measure, at an application layer of the UE, a set of QoE variables associated with different service types. The operations of 1810 may be performed according to the methods described herein. In some examples, aspects of the operations of 1810 may be performed by a QoE variable manager as described with reference to FIGS. 9 through 12.

At 1815, the UE may transfer, from the application layer of the UE to the access stratum of the UE, the set of QoE variables in a format readable by the RAN. The operations of 1815 may be performed according to the methods described herein. In some examples, aspects of the operations of 1815 may be performed by a QoE indication manager as described with reference to FIGS. 9 through 12.

At 1820, the UE may measure, at the access stratum of the UE, a set of RRM variables associated with the communication link between the UE and the serving base station and a communication link between the UE and a corresponding set of one or more neighboring base stations associated with the communication links. The operations of 1820 may be performed according to the methods described herein. In some examples, aspects of the operations of 1820 may be performed by an RRM variable manager as described with reference to FIGS. 9 through 12.

At 1825, the UE may transmit a measurement report to the serving base station indicating information associated with the QoE variables and the RRM variables in a multi-layer readable format. The operations of 1825 may be performed according to the methods described herein. In some examples, aspects of the operations of 1825 may be performed by a measurement report manager as described with reference to FIGS. 9 through 12.

Figure 19:
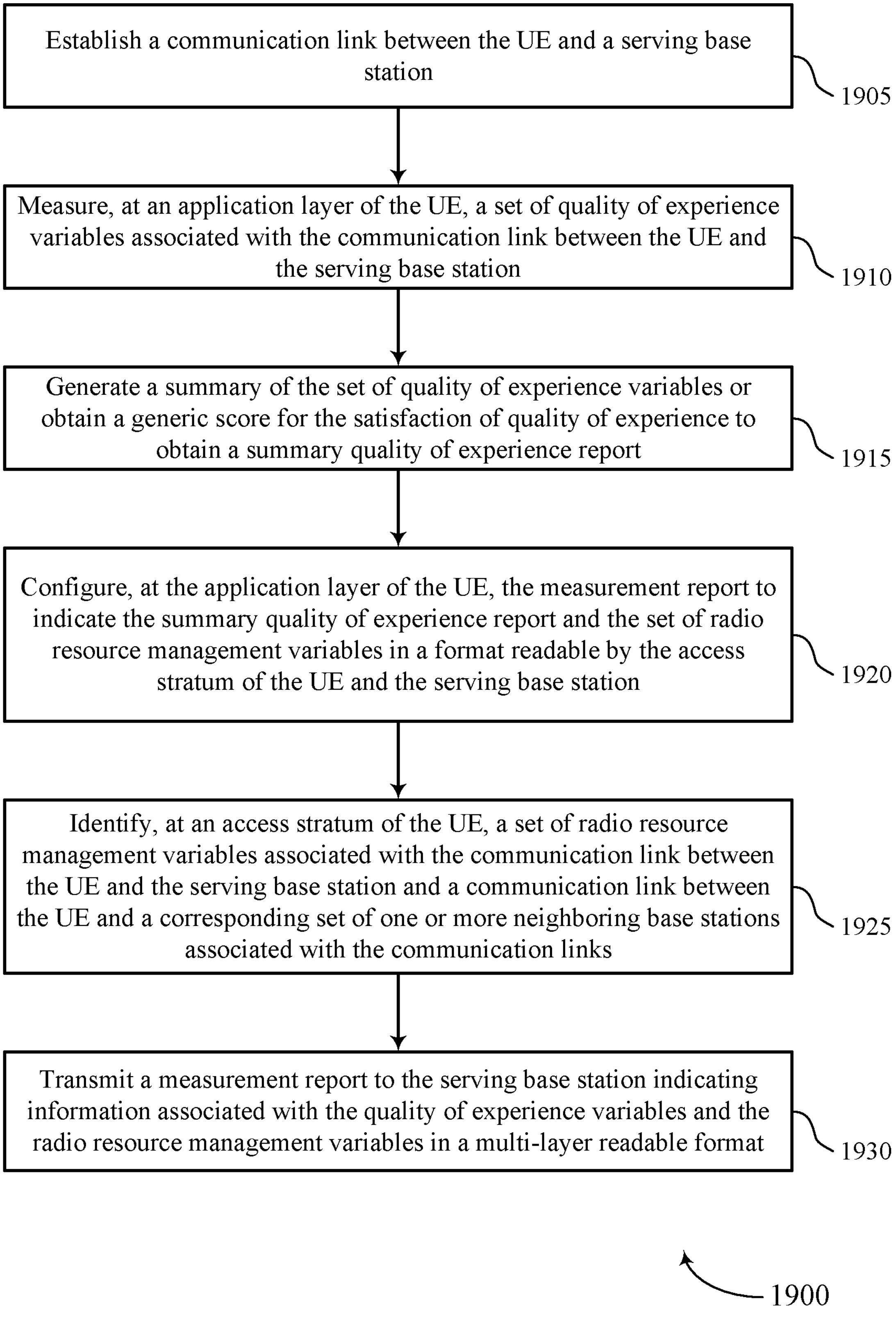

FIG. 19 shows a flowchart illustrating a method 1900 that supports QoE measurements for mobility robustness in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may establish a communication link between the UE and a serving base station. The operations of 1905 may be performed according to the methods described herein. In some examples, aspects of the operations of 1905 may be performed by a communication link manager as described with reference to FIGS. 9 through 12.

At 1910, the UE may measure, at an application layer of the UE, a set of QoE variables associated with the communication link between the UE and the serving base station. The operations of 1910 may be performed according to the methods described herein. In some examples, aspects of the operations of 1910 may be performed by a QoE variable manager as described with reference to FIGS. 9 through 12.

At 1915, the UE may generate a summary of the set of QoE variables (e.g., RAN aware QoE metrics) or obtain a generic score for the satisfaction of QoE to obtain a summary QoE report. The operations of 1915 may be performed according to the methods described herein. In some examples, aspects of the operations of 1915 may be performed by a QoE summary indication manager as described with reference to FIGS. 9 through 12.

At 1920, the UE may configure, at the application layer of the UE, the measurement report to indicate the summary QoE report and the set of RRM variables in a format readable by the access stratum of the UE and the serving base station. The operations of 1920 may be performed according to the methods described herein. In some examples, aspects of the operations of 1920 may be performed by a QoE summary indication manager as described with reference to FIGS. 9 through 12.

At 1925, the UE may identify, at the access stratum of the UE, a set of RRM variables associated with the communication link between the UE and the serving base station and a communication link between the UE and a corresponding set of one or more neighboring base stations associated with the communication links. The operations of 1925 may be performed according to the methods described herein. In some examples, aspects of the operations of 1925 may be performed by an RRM variable manager as described with reference to FIGS. 9 through 12.

At 1930, the UE may transmit a measurement report to the serving base station indicating information associated with the QoE variables and the RRM variables in a multi-layer readable format. The operations of 1930 may be performed according to the methods described herein. In some examples, aspects of the operations of 1930 may be performed by a measurement report manager as described with reference to FIGS. 9 through 12.

FIG. 20 shows a flowchart illustrating a method 2000 that supports QoE measurements for mobility robustness in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may establish a communication link with a UE. The operations of 2005 may be performed according to the methods described herein. In some examples, aspects of the operations of 2005 may be performed by a communication link manager as described with reference to FIGS. 13 through 16.

At 2010, the base station may receive a measurement report from the UE indicating information associated with a set of QoE variables and a set of RRM variables in a multi-layer readable format. The operations of 2010 may be performed according to the methods described herein. In some examples, aspects of the operations of 2010 may be performed by a measurement report manager as described with reference to FIGS. 13 through 16.

At 2015, the base station may adjust, in response to the measurement report, the communication link between the UE and the serving base station. The operations of 2015 may be performed according to the methods described herein. In some examples, aspects of the operations of 2015 may be performed by a communication link adjustment manager as described with reference to FIGS. 13 through 16.

FIG. 21 shows a flowchart illustrating a method 2100 that supports QoE measurements for mobility robustness in accordance with aspects of the present disclosure. The operations of method 2100 may be implemented by a base station 105 or its components as described herein. For example, the operations of method 2100 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2105, the base station may establish a communication link with a UE. The operations of 2105 may be performed according to the methods described herein. In some examples, aspects of the operations of 2105 may be performed by a communication link manager as described with reference to FIGS. 13 through 16.

At 2110, the base station may receive a measurement report from the UE indicating information associated with a set of QoE variables and a set of RRM variables in a multi-layer readable format. The operations of 2110 may be performed according to the methods described herein. In some examples, aspects of the operations of 2110 may be performed by a measurement report manager as described with reference to FIGS. 13 through 16.

At 2115, the base station may adjust, in response to the measurement report, the communication link between the UE and the serving base station. The operations of 2115 may be performed according to the methods described herein. In some examples, aspects of the operations of 2115 may be performed by a communication link adjustment manager as described with reference to FIGS. 13 through 16.

At 2120, the base station may transmit a measurement request to the UE indicating the QoE variables to include in the set of QoE variables, where the measurement report indicating the set of QoE variables is received in response to the measurement request. The operations of 2120 may be performed according to the methods described herein. In some examples, aspects of the operations of 2120 may be performed by a measurement request manager as described with reference to FIGS. 13 through 16.

FIG. 22 shows a flowchart illustrating a method 2200 that supports QoE measurements for mobility robustness in accordance with aspects of the present disclosure. The operations of method 2200 may be implemented by a base station 105 or its components as described herein. For example, the operations of method 2200 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2205, the base station may receive a resource status request from a serving base station of a UE, the resource status request indicating a QoE constraint of the UE and a set of QoE variables of the UE. The operations of 2205 may be performed according to the methods described herein. In some examples, aspects of the operations of 2205 may be performed by a resource status manager as described with reference to FIGS. 13 through 16.

At 2210, the base station may determine, based on the set of QoE variables, whether the target base station can satisfy the QoE constraint of the UE. The operations of 2210 may be performed according to the methods described herein. In some examples, aspects of the operations of 2210 may be performed by a communication link manager as described with reference to FIGS. 13 through 16.

At 2215, the base station may transmit a resource status response to the serving base station indicating an ability to support the QoE constraint of the UE. The operations of 2215 may be performed according to the methods described herein. In some examples, aspects of the operations of 2215 may be performed by a resource status manager as described with reference to FIGS. 13 through 16.

The following provides an overview of aspects of the present disclosure:

Aspect 1: A method for wireless communication at a UE, comprising: establishing a communication link between the UE and a serving base station; measuring, at an application layer of the UE, a set of QoE variables associated with different service types; measuring, at an access stratum of the UE, a set of RRM variables associated with the communication link between the UE and the serving base station and a communication link between the UE and a corresponding set of one or more neighboring base stations associated with the communication links; and transmitting a measurement report to the serving base station indicating information associated with the QoE variables and the RRM variables in a multi-layer readable format.

Aspect 2: The method of aspect 1, further comprising: transferring, from the application layer of the UE to the access stratum of the UE, the set of QoE variables in a format readable by the RAN, wherein transmitting the measurement report comprises; and transmitting, from the access stratum of the UE, the set of QoE variables and the set of RRM variables to the serving base station.

Aspect 3: The method of any of aspects 1 through 2, further comprising: generating a summary of the set of QoE variables or a generic score of an overall satisfaction level to obtain a summary QoE report; configuring, at the application layer of the UE, the measurement report to indicate the summary QoE report and the set of RRM variables in a format readable by the access stratum of the UE and the serving base station, wherein transmitting the measurement report comprises; and transmitting, from the access stratum of the UE, the summary QoE report and the set of RRM variables to the serving base station in the measurement report.

Aspect 4: The method of any of aspects 1 through 3, further comprising: transmitting a UE capability message indicating support for generating a RAN aware summary QoE report.

Aspect 5: The method of any of aspects 1 through 4, further comprising: receiving a measurement request from the base station indicating the QoE variables to include in the set of QoE variables, wherein identifying the set of QoE variables is based at least in part on the measurement request, wherein the measurement report is transmitted based at least in part on the measurement request.

Aspect 6: The method of any of aspects 1 through 5, further comprising: adjusting, in response to the measurement report, the communication link between the UE and the serving base station.

Aspect 7: The method of aspect 6, wherein adjusting the communication link comprises: performing, based at least in part on the set of QoE variables, a handover procedure of the UE from the serving base station to establish a new communication link with a target base station from the set of target base stations.

Aspect 8: The method of aspect 7, further comprising: determining that the set of QoE variables fail to satisfy a threshold, wherein transmitting the measurement report is based at least in part on the determining; and receiving, based at least in part on transmitting the measurement report, a connection reconfiguration message identifying the target base station to perform the handover procedure to establish the new communication link.

Aspect 9: The method of any of aspects 6 through 8, wherein adjusting the communication link comprises: adjusting one or more communication parameters configured for the communication link between the UE and the serving base station and one or more handover parameters for a handover procedure of the UE from the serving base station to establish a new communication link with a target base station from the set of one or more target base stations.

Aspect 10: The method of any of aspects 1 through 9, further comprising: identifying at least a portion of the QoE variables, at the access stratum of the UE, wherein the set of QoE variables indicated in the measurement report is based at least in part on the portion of the QoE variables.

Aspect 11: The method of any of aspects 1 through 10, further comprising: identifying, at the access stratum of the UE, a summary QoE report based at least in part on the set of QoE variables, wherein the set of QoE variables indicated in the measurement report comprises the summary QoE report.

Aspect 12: The method of any of aspects 1 through 11, wherein the QoE variables in the set of QoE variables comprise one or more of a cell identifier of the serving base station, or a service type for a service being communicated over the communication link, or an average application layer throughput rate, or an average application layer round-trip-time measurement, or an average application layer jitter, or an average application layer packet drop rate, or a failure rate of the application layer throughput rate, or a failure rate of the application layer round-trip-time variable, or a failure rate of the application layer jitter, or a failure rate of the application layer packet drop rate.

Aspect 13: A method for wireless communication at a serving base station, comprising: establishing a communication link with a UE; receiving a measurement report from the UE indicating information associated with a set of QoE variables and a set of RRM variables in a multi-layer readable format; and adjusting, in response to the measurement report, the communication link between the UE and the serving base station.

Aspect 14: The method of aspect 13, further comprising: transmitting a measurement request to the UE indicating the QoE variables to include in the set of QoE variables, wherein the measurement report indicating the set of QoE variables is received in response to the measurement request.

Aspect 15: The method of any of aspects 13 through 14, wherein adjusting the communication link comprises: performing, based at least in part on the set of QoE variables, a handover procedure of the UE from the serving base station to a target base station for the UE to establish a new communication link with the target base station.

Aspect 16: The method of aspect 15, further comprising: determining that the set of QoE variables fail to satisfy a threshold; transmitting a resource status request to a set of target base stations comprising the target base station indicated in the measurement report, the resource status request indicating a QoE constraint of the UE and the set of QoE variables of the UE; receiving a resource status response from the target base station indicating support of the QoE constraint of the UE; and transmitting, based at least in part on the resource status response, a connection reconfiguration message to the UE identifying the target base station to perform the handover procedure to establish the new communication link.

Aspect 17: The method of aspect 16, further comprising: receiving multiple resource status responses from at least a portion of respective target base stations of the set of one or more target base stations, each resource status response indicating a respective ability of the target base station in satisfying the UE quality of service constraints; selecting a subset of available target base stations from the portion of the respective target base stations of the set of one or more target base stations based at least in part on the ability in satisfying the QoE constraint of the UE; and selecting the target base station from the subset of available base stations based at least in part on the ability to satisfy the QoE constraints of the target base station and one or more RRM variables of the UE for the target base station.

Aspect 18: The method of any of aspects 16 through 17, further comprising: transmitting a handover request to the target base station based at least in part on selecting the target base station, the handover request indicating that the handover procedure of the UE is to be performed to the target base station; and receiving a handover response from the target base station, wherein the handover procedure of the UE is performed with the target base station based at least in part on the handover response.

Aspect 19: The method of any of aspects 13 through 18, wherein adjusting the connection comprises: adjusting one or more communication parameters configured for the communication link between the UE and the serving base station.

Aspect 20: A method for wireless communication at a target base station, comprising: receiving a resource status request from a serving base station of a UE, the resource status request indicating a QoE constraint of the UE and a set of QoE variables of the UE; determining, based at least in part on the set of QoE variables, whether the UE QoE constraints can be satisfied at the target base station; and transmitting a resource status response to the serving base station indicating an ability to support the QoE constraint of the UE.

Aspect 21: The method of aspect 20, further comprising: determining the ability of the target base station in satisfying the UE quality of service constraints.

Aspect 22: The method of any of aspects 20 through 21, further comprising: receiving a handover request from the serving base station based at least in part on the resource status response indicating support for the QoE requirement of the UE.

Aspect 23: The method of aspect 22, further comprising: transmitting a handover response to the serving base station, wherein the handover procedure of the UE is performed with the target base station based at least in part on the handover response.

Aspect 24: An apparatus for wireless communication at a UE, comprising a processor; memory coupled with the processor; and instructions stored in the memory and executable by the processor to cause the apparatus to perform a method of any of aspects 1 through 12.

Aspect 25: An apparatus for wireless communication at a UE, comprising at least one means for performing a method of any of aspects 1 through 12.

Aspect 26: A non-transitory computer-readable medium storing code for wireless communication at a UE, the code comprising instructions executable by a processor to perform a method of any of aspects 1 through 12.

Aspect 27: An apparatus for wireless communication at a serving base station, comprising a processor; memory coupled with the processor; and instructions stored in the memory and executable by the processor to cause the apparatus to perform a method of any of aspects 13 through 19.

Aspect 28: An apparatus for wireless communication at a serving base station, comprising at least one means for performing a method of any of aspects 13 through 19.

Aspect 29: A non-transitory computer-readable medium storing code for wireless communication at a serving base station, the code comprising instructions executable by a processor to perform a method of any of aspects 13 through 19.

Aspect 30: An apparatus for wireless communication at a target base station, comprising a processor; memory coupled with the processor; and instructions stored in the memory and executable by the processor to cause the apparatus to perform a method of any of aspects 20 through 23.

Aspect 31: An apparatus for wireless communication at a target base station, comprising at least one means for performing a method of any of aspects 20 through 23.

Aspect 32: A non-transitory computer-readable medium storing code for wireless communication at a target base station, the code comprising instructions executable by a processor to perform a method of any of aspects 20 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A serving network device, comprising:

one or more memories storing processor-executable code; and one or more processors coupled with the one or more memories and operable to execute the code to cause the serving network device to:

establish a first communication link with a user equipment (UE);

receive a measurement report from the UE indicating information associated with a set of quality of experience variables and a set of radio resource management variables in a multi-layer readable format, wherein the set of quality of experience variables is associated with at least two different service types and with an application layer at the UE, and wherein the set of radio resource management variables is associated with the first communication link between the UE and the serving network device and a second communication link between the UE and a neighboring network device and with an access stratum layer at the UE; and adjust, in response to the measurement report, the first communication link between the UE and the serving network device.

2. The serving network device of claim 1, wherein the one or more processors are further operable to execute the code to cause the serving network device to:

transmit a measurement request to the UE indicating quality of experience variables to include in the set of quality of experience variables, wherein the measurement report indicating the set of quality of experience variables is received in response to the measurement request.

3. The serving network device of claim 1, wherein, to adjust the first communication link, the one or more processors are operable to execute the code to cause the serving network device to:

perform, based at least in part on the set of quality of experience variables, a handover procedure of the UE from the serving network device to a target network device for the UE to establish a new communication link with the target network device.

4. The serving network device of claim 3, wherein the one or more processors are further operable to execute the code to cause the serving network device to:

determine that the set of quality of experience variables fail to satisfy a threshold;

transmit a resource status request to a set of one or more target network devices comprising the target network device indicated in the measurement report, the resource status request indicating a quality of experience constraint of the UE and the set of quality of experience variables of the UE;

receive a resource status response from the target network device indicating support of the quality of experience constraint of the UE; and transmit, based at least in part on the resource status response, a connection reconfiguration message to the UE identifying the target network device to perform the handover procedure to establish the new communication link.

5. The serving network device of claim 4, wherein the one or more processors are further operable to execute the code to cause the serving network device to:

receive multiple resource status responses from at least a portion of respective target network devices of the set of one or more target network devices, each resource status response indicating a respective ability of the target network device to satisfy the quality of experience constraint of the UE;

select a subset of available target network devices from the portion of the respective target network devices of the set of one or more target network devices based at least in part on the respective ability to satisfy the quality of experience constraint of the UE; and select the target network device from the subset of available target network devices based at least in part on the respective ability of the target network device to satisfy the quality of experience constraint of the UE and one or more radio resource management of the set of radio resource management variables.

6. The serving network device of claim 4, wherein the one or more processors are further operable to execute the code to cause the serving network device to:

transmit a handover request to the target network device based at least in part on selecting the target network device, the handover request indicating that the handover procedure of the UE is to be performed to the target network device; and receive a handover response from the target network device, wherein the handover procedure of the UE is performed with the target network device based at least in part on the handover response.

7. The serving network device of claim 1, wherein, to adjust the first communication link, the one or more processors are operable to execute the code to cause the serving network device to:

adjust one or more communication parameters configured for the first communication link between the UE and the serving network device.

8. The serving network device of claim 1, wherein the one or more processors are further operable to execute the code to cause the serving network device to:

receive a UE capability message indicating support for generating a radio access network aware summary quality of experience report.

9. The serving network device of claim 1, wherein the measurement report comprises a summary quality of experience report indicating the information associated with the set of quality of experience variables, the summary quality of experience report comprising a summary of the set of quality of experience variables or a generic score of an overall satisfaction level.

10. The serving network device of claim 1, wherein the set of quality of experience variables comprise one or more of a cell identifier of the serving network device, or a service type for a service being communicated over the first communication link, or an average application layer throughput rate, or an average application layer round-trip-time measurement, or an average application layer jitter, or an average application layer packet drop rate, or a failure rate of the average application layer throughput rate, or a failure rate of the average application layer round-trip-time measurement, or a failure rate of the average application layer jitter, or a failure rate of the average application layer packet drop rate.

11. A method for wireless communication at a serving network device, comprising:

establishing a first communication link with a user equipment (UE);

receiving a measurement report from the UE indicating information associated with a set of quality of experience variables and a set of radio resource management variables in a multi-layer readable format, wherein the set of quality of experience variables is associated with at least two different service types and with an application layer at the UE, and wherein the set of radio resource management variables is associated with the first communication link between the UE and the serving network device and a second communication link between the UE and a neighboring network device and with an access stratum layer at the UE; and adjusting, in response to the measurement report, the first communication link between the UE and the serving network device.

12. The method of claim 11, further comprising:

transmitting a measurement request to the UE indicating quality of experience variables to include in the set of quality of experience variables, wherein the measurement report indicating the set of quality of experience variables is received in response to the measurement request.

13. The method of claim 11, wherein adjusting the first communication link comprises:

performing, based at least in part on the set of quality of experience variables, a handover procedure of the UE from the serving network device to a target network device for the UE to establish a new communication link with the target network device.

14. The method of claim 13, further comprising:

determining that the set of quality of experience variables fail to satisfy a threshold;

transmitting a resource status request to a set of one or more target network devices comprising the target network device indicated in the measurement report, the resource status request indicating a quality of experience constraint of the UE and the set of quality of experience variables of the UE;

receiving a resource status response from the target network device indicating support of the quality of experience constraint of the UE; and transmitting, based at least in part on the resource status response, a connection reconfiguration message to the UE identifying the target network device to perform the handover procedure to establish the new communication link.

15. The method of claim 14, further comprising:

receiving multiple resource status responses from at least a portion of respective target network devices of the set of one or more target network devices, each resource status response indicating a respective ability of the target network device to satisfy the quality of experience constraint of the UE;

selecting a subset of available target network devices from the portion of the respective target network devices of the set of one or more target network devices based at least in part on the respective ability to satisfy the quality of experience constraint of the UE; and selecting the target network device from the subset of available target network devices based at least in part on the respective ability of the target network device to satisfy the quality of experience constraint of the UE and one or more radio resource management of the set of radio resource management variables.

16. The method of claim 14, further comprising:

transmitting a handover request to the target network device based at least in part on selecting the target network device, the handover request indicating that the handover procedure of the UE is to be performed to the target network device; and receiving a handover response from the target network device, wherein the handover procedure of the UE is performed with the target network device based at least in part on the handover response.

17. The method of claim 11, wherein adjusting the first communication link comprises:

adjusting one or more communication parameters configured for the first communication link between the UE and the serving network device.

18. The method of claim 11, further comprising:

receiving a UE capability message indicating support for generating a radio access network aware summary quality of experience report.

19. The method of claim 11, wherein the measurement report comprises a summary quality of experience report indicating the information associated with the set of quality of experience variables, the summary quality of experience report comprising a summary of the set of quality of experience variables or a generic score of an overall satisfaction level.

20. The method of claim 11, wherein the set of quality of experience variables comprise one or more of a cell identifier of the serving network device, or a service type for a service being communicated over the first communication link, or an average application layer throughput rate, or an average application layer round-trip-time measurement, or an average application layer jitter, or an average application layer packet drop rate, or a failure rate of the average application layer throughput rate, or a failure rate of the average application layer round-trip-time measurement, or a failure rate of the average application layer jitter, or a failure rate of the average application layer packet drop rate.

* * * * *